United States Patent
Bossman et al.

(10) Patent No.: US 7,814,072 B2
(45) Date of Patent: Oct. 12, 2010

(54) MANAGEMENT OF DATABASE STATISTICS

(75) Inventors: Patrick Dooling Bossman, Alexandria, VA (US); You-Chin Fuh, San Jose, CA (US); Shuanglin Guo, Cupertino, CA (US); Chan-hua Liu, San Jose, CA (US); Yoichi Tsuji, San Jose, CA (US); Changjiu Xian, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 1417 days.

(21) Appl. No.: 11/028,186

(22) Filed: Dec. 30, 2004

(65) Prior Publication Data

US 2006/0149695 A1 Jul. 6, 2006

(51) Int. Cl.
 *G06F 17/00* (2006.01)
(52) U.S. Cl. ...................................... 707/688; 707/689
(58) Field of Classification Search ..................... 707/2, 707/3, 200, 999.002, 999.003, 999.2, 688, 707/689
See application file for complete search history.

(56) References Cited

U.S. PATENT DOCUMENTS

| | | | |
|---|---|---|---|
| 5,754,841 A | 5/1998 | Cariño, Jr. .................. 395/603 |
| 5,794,250 A | 8/1998 | Cariño, Jr. et al. .......... 707/104 |
| 5,864,843 A | 1/1999 | Cariño, Jr. et al. ............. 707/4 |
| 5,873,083 A | 2/1999 | Jones et al. ..................... 707/4 |
| 5,899,986 A * | 5/1999 | Ziauddin ........................ 707/2 |
| 5,913,206 A | 6/1999 | Chaudhuri et al. ............. 707/2 |
| 5,913,207 A | 6/1999 | Chaudhuri et al. ............. 707/2 |
| 5,926,813 A | 7/1999 | Chaudhuri et al. ............. 707/5 |
| 5,930,786 A | 7/1999 | Cariño, Jr. et al. ............. 707/4 |
| 5,950,186 A | 9/1999 | Chaudhuri et al. ............. 707/2 |
| 6,085,223 A | 7/2000 | Cariño, Jr. et al. .......... 709/203 |
| 6,105,020 A | 8/2000 | Lindsay et al. |
| 6,243,703 B1 | 6/2001 | Couch et al. .................. 707/10 |
| 6,249,791 B1 * | 6/2001 | Osborn et al. ............... 707/200 |
| 6,353,818 B1 | 3/2002 | Carino, Jr. ..................... 707/2 |
| 6,363,371 B1 | 3/2002 | Chaudhuri et al. ............. 707/2 |
| 6,370,522 B1 | 4/2002 | Agarwal et al. ................ 707/2 |

(Continued)

OTHER PUBLICATIONS

Patrick Bossman, "Tuning SQL with Statistics" [online] Aug. 1999 [Retrieved on May 4, 2006] The IDUG Solutions Journal, Aug. 1999—vol. 6, No. 2, Retrieved from the Internet: <URL: http://arbaltxp-011870/member/journal/aug99/feature1.html> 5 pages.

(Continued)

*Primary Examiner*—Tony Mahmoudi
*Assistant Examiner*—Michele C Choi
(74) *Attorney, Agent, or Firm*—Janet M. Skafar; Ingrid M. Foerster; Elissa Y. Wang

(57) ABSTRACT

A method of, a computer program product for and a computer system for managing statistics in a database management system are provided. A value of a volatility of a statistic is determined. A value of a staleness of the statistic is determined using the value of the volatility. A statistics collection task is generated in response to, at least in part, the value of the staleness exceeding a value of a staleness threshold. The statistics collection task is executed to collect an additional value of the statistic. The additional value of the statistic is stored.

32 Claims, 31 Drawing Sheets

U.S. PATENT DOCUMENTS

| | | | |
|---|---|---|---|
| 6,397,207 B1 | 5/2002 | Bleizeffer et al. ............... | 707/2 |
| 6,401,083 B1 | 6/2002 | Agarwal et al. ................ | 707/2 |
| 6,401,087 B2 | 6/2002 | Yanagimoto ................... | 707/5 |
| 6,493,700 B2 | 12/2002 | Couch et al. .................... | 707/2 |
| 6,529,901 B1* | 3/2003 | Chaudhuri et al. ............. | 707/3 |
| 6,539,371 B1 | 3/2003 | Bleizeffer et al. ............... | 707/2 |
| 6,763,352 B2 | 7/2004 | Cochrane et al. | |
| 6,847,962 B1 | 1/2005 | Cochrane et al. | |
| 6,985,904 B1 | 1/2006 | Kaluskar et al. | |
| 6,990,484 B1 | 1/2006 | Ghazal et al. | |
| 7,080,062 B1 | 7/2006 | Leung et al. | |
| 7,302,422 B2 | 11/2007 | Bossman et al. | |
| 7,412,439 B2 | 8/2008 | Bossman et al. | |
| 2002/0049700 A1 | 4/2002 | Couch et al. .................... | 707/1 |
| 2003/0009446 A1 | 1/2003 | Agarwal et al. ................ | 707/2 |
| 2003/0115508 A1 | 6/2003 | Ali et al. ..................... | 717/177 |
| 2003/0158842 A1 | 8/2003 | Levy et al. | |
| 2003/0177137 A1 | 9/2003 | MacLeod et al. | |
| 2004/0181521 A1* | 9/2004 | Simmen ........................ | 707/3 |
| 2004/0243555 A1* | 12/2004 | Bolsius et al. ................. | 707/3 |
| 2005/0138015 A1* | 6/2005 | Dageville et al. ............. | 707/3 |

OTHER PUBLICATIONS

Office Action mailed May 4, 2007 for U.S. Appl. No. 10/752,915, titled "Method, system, and program for statistics management", final <11 pages>.

Office Action mailed Jul. 14, 2006 for U.S. Appl. No. 10/752,915, titled "Method, system, and program for statistics management", non-final <8 pages>.

Office Action mailed Sep. 12, 2007 for U.S. Appl. No. 10/752,915, titled "Method, system, and program for statistics management" <12 pages>.

Office Action mailed Oct. 16, 2006 for U.S. Appl. No. 10/824,856, titled "Query Workload Statistics Collection in a Database Management System" <10 pages>.

Office Action mailed Mar. 5, 2007 for U.S. Appl. No. 10/824,856, titled "Query Workload Statistics Collection in a Database Management System", final <8 pages>.

Notice of Allowance mailed Jul. 17, 2007 for U.S. Appl. No. 10/824,856, "Query Workload Statistics Collection in a Database Management System". <6 pages>.

Communication from USPTO mailed on Oct. 22, 2007 with listing of claims for U.S. Appl. No. 10/824,856, titled "Query Workload Statistics Collection in a Database Management System". <13 pages>.

Notice of Allowability and Examiner's Amendment from Notice of Allowance mailed on Mar. 18, 2008 for U.S. Appl. No. 10/752,915. <5 pages>.

312 Amendment submitted on Apr. 14, 2008 for U.S. Appl. No. 10/752,915. <6 pages>.

Supplemental Notice of Allowability mailed on May 8, 2008 for U.S. Appl. No. 10/752,915. <1 page>.

Response to Rule 312 Communication mailed on May 14, 2008 for U.S. Appl. No. 10/752,915. <2 pages>.

Office Action for U.S. Appl. No. 11/873,252, having a notification date of Feb. 4, 2010 <5 pages>.

* cited by examiner

Real-time tables

Collection task generated statistics tables

Profile database

| FIG. 11A |
| FIG. 11B |
| FIG. 11C |
| FIG. 11D |

MANAGEMENT OF DATABASE STATISTICS

CROSS-REFERENCE TO RELATED APPLICATIONS

In U.S. application Ser. No. 10/824,856 entitled "Query Workload Statistics Collection in a Database Management System," filed on Apr. 14, 2004, by Patrick Dooling Bossman, You-Chin Fuh, Shuanglin Guo, Chan-hua Liu and Yoichi Tsuji, assigned to the assignee of the present invention, Patent Application Publication No. U.S. 2005/0234900 A1 having a publication date of Oct. 20, 2005, and incorporated herein by reference in its entirety, various embodiments of collecting statistics in a database management system for a workload are described. Although not limited thereto, various embodiments of the present invention employ embodiments of collecting statistics in a database management system for a workload.

In U.S. application Ser. No. 10/752,915 entitled "Method, System, and Program for Statistics Management," filed on Jan. 7, 2004, by Patrick Dooling Bossman, You-Chin Fuh and Chan-Hua Liu, assigned to the assignee of the present invention, and incorporated herein by reference in its entirety, Patent Application Publication No. U.S. 2005/0149505 A1 having a publication date of Jul. 7, 2005, various techniques for statistics identification are described. Although not limited thereto, various embodiments of the present invention employ embodiments of the techniques for statistics identification.

BACKGROUND OF THE INVENTION

1. Field of the Invention

This invention relates to a database management system, and more particularly, to management of database statistics in a database management system.

2. Description of the Related Art

Relational database management systems allow large volumes of data to be stored and accessed efficiently and conveniently in a computer system. In a database management system, data is stored in database tables which organize the data into rows and columns. FIG. 1 depicts an exemplary database table 40 which has rows 42 and columns 44. To more quickly access the data in a database table, an index may be generated based on one or more specified columns of the database table.

The relational database management system responds to user commands to store and access the data. The user commands are typically Structured Query Language statements such as SELECT, INSERT, UPDATE and DELETE, to select, insert, update and delete, respectively, the data in the rows and columns. The SQL statements typically conform to a SQL standard as published by the American National Standards Institute (ANSI) or the International Standards Organization (ISO). The SQL statements are also referred to as queries.

In some relational database management systems, a query processor receives a query. A query optimizer evaluates various alternative access paths for the query. Some query optimizers utilize a cost based optimization technique to select the most efficient access path. The query processor executes the query using the selected access path. The query optimizer uses a set of database statistics to evaluate an access path. The database statistics comprise information about the state of the data in the relational database management system. The relational database management system typically provides one or more tools to collect the database statistics.

In cost based optimization, the optimizer estimates the cost of the available access paths and selects the access path with the lowest estimated cost, which may be in time, resources, or a combination thereof. One of the challenges for cost based optimization is obtaining an accurate estimate of the cost of the access paths. If the cost of the access paths cannot be estimated accurately, then sub-optimal and unstable access paths may be selected because the access path with the lowest actual cost may not have the lowest estimated cost. Sometimes efficient and inefficient access paths have very similar cost estimates, and minor changes to the input to the optimizer can result in dramatic changes in execution time.

In a relational database management system, timely statistics information can improve performance. INSERT, UPDATE and DELETE statements, in addition to various utilities, may change the data in the database. As the data changes in the database, the performance of the database management system may degrade because the statistics do not reflect the current state of the database. Hence, the cost of the access paths may not be accurately estimated, inefficient access paths may be chosen, and the amount of time to process queries may increase. Therefore, database administrators periodically re-collect the database statistics.

Database administrators typically collect nominal database statistics, such as single column cardinality, on all tables, columns of the tables and indexes. Collecting database statistics on all tables, columns and indexes can consume a large amount of time. However, database administrators typically do not have the time and/or expertise to analyze the queries to determine what tables, columns, column groups and indexes are most important and what database statistics would be most beneficial to improve performance.

Sometimes database statistics are collected for columns which have not been referenced in any SQL statement. When columns are not used as predicates or aggregates within a SQL statement, statistics on those columns are useless. Collecting database statistics that are not used wastes both processor and storage resources and consumes a large amount of processor time. Processor time is expensive and it is very expensive to spend valuable processor time collecting statistics rather than running business applications. Indeed, the expense of collecting database statistics for all columns and indexes often results in re-collecting statistics less frequently than would be advantageous to maintain desirable performance levels.

Various statistics collection tools examine real-time statistics to trigger re-collection. For example, one statistics collection tool examines the growth in table size to trigger re-collection. If the table grows by, for example, fifteen percent, then database statistics are re-collected. Another statistics collection tool monitors the number of INSERT, UPDATE and DELETE statements that were performed on the table. If the number of INSERT, UPDATE and DELETE statements exceeds a threshold, then re-collecting database statistics is recommended. Some statistics collection tools examine the system throughput and schedule database statistics re-collection at off-peak times with a very low scheduling priority. However, these statistics collection tools do not address what statistics to collect, and the statistics re-collection can remain inefficient because the re-collection consumes a large amount of time and ineffective because the re-collection may not be performed sufficiently often to reflect the state of the database.

Database management systems typically provide a command to collect statistics about the database for use by the query optimizer. As the database is used, the database statistics should be updated periodically to reflect the current state of the database. Typically, database administrators initially collect an initial set of all database statistics to provide a sound foundation of database statistics for the optimizer to accurately estimate the cost of the access paths for queries. Many database administrators will collect this complete set of statistics once, and then scale back the amount of statistics which are re-collected due to the central processing unit (CPU) cost of executing a utility to collect the database statistics.

The data stored in a database typically changes over time. If the database statistics are not re-collected, then the information they provide can be inaccurate and lead to selecting inefficient access paths. After a sound foundation of database statistics is collected, the database statistics should be re-collected periodically. Therefore, it would be desirable to determine when to re-collect the database statistics to ensure continued efficient performance.

Therefore, there is a need for an improved technique for managing statistics in a database management system. This technique should address when database statistics are re-collected.

SUMMARY OF THE INVENTION

To overcome the limitations in the prior art described above, and to overcome other limitations that will become apparent upon reading and understanding the present specification, various embodiments of a method, computer system and computer program product to manage statistics in a database management system are provided.

In various embodiments, a value of a volatility of a statistic is determined. A value of a staleness of the statistic is determined using the value of the volatility. A statistics collection task is generated in response to, at least in part, the value of the staleness exceeding a value of a staleness threshold. The statistics collection task is executed to collect an additional value of the statistic. The additional value of the statistic is stored.

In this way, a method, computer system and computer program product are provided to manage statistics in a database management system.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to manage statistics in a database management system. In various embodiments, a volatility of at least one statistic is determined. One or more statistics collection tasks are generated based on, at least in part, the volatility.

Figure 1:
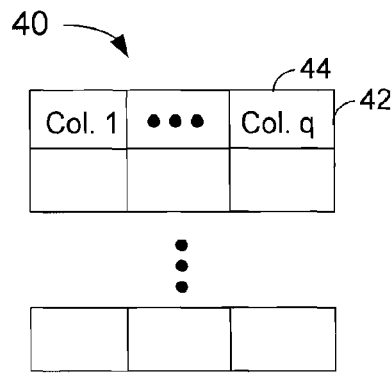
FIG. 1 depicts an exemplary table of a database management system.
Figure 2:
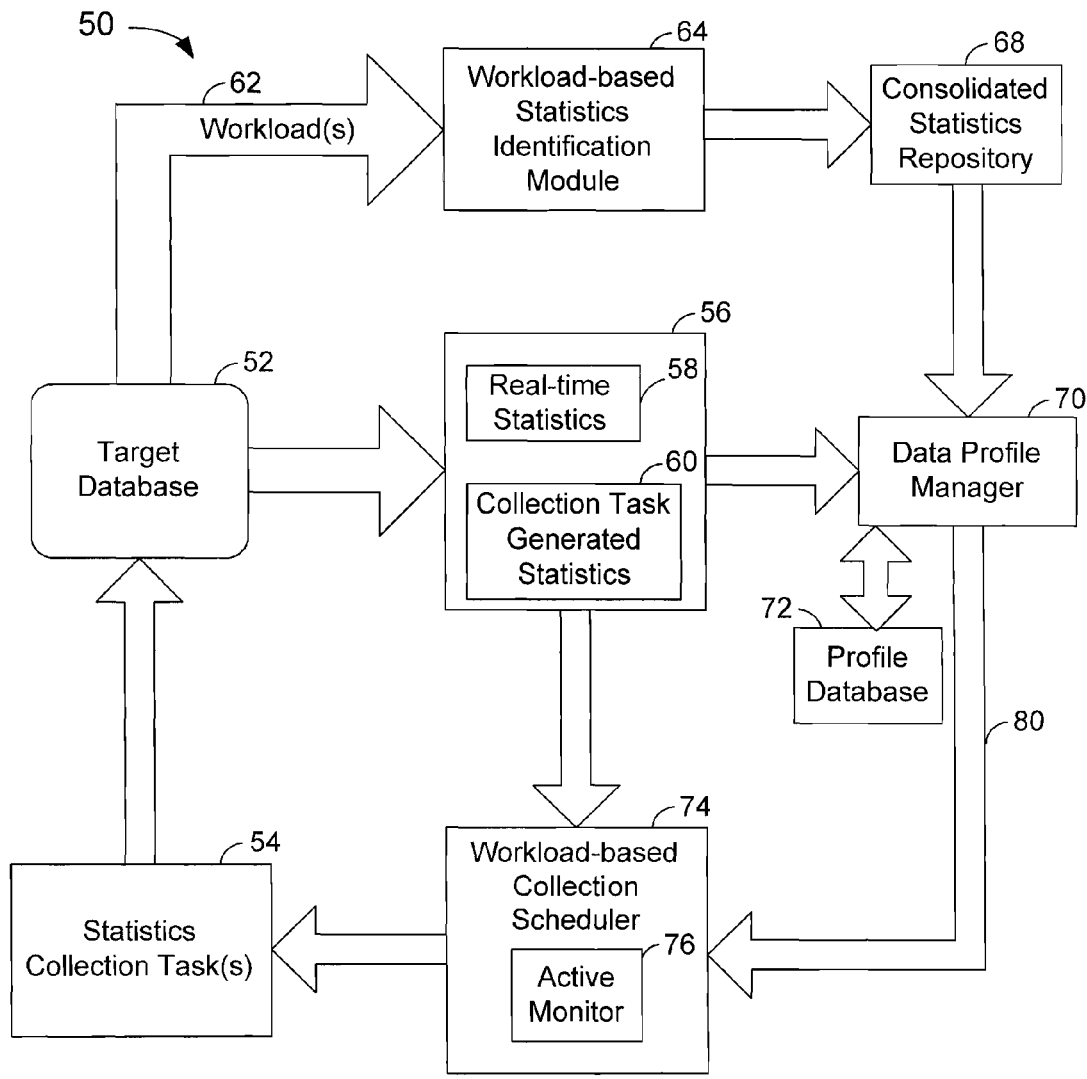
FIG. 2 depicts a block diagram of an embodiment of a statistics collection system.

FIG. 2 depicts a block diagram of an embodiment 50 of a statistics collection system. A target database 52 contains one or more collection objects. Depending on the embodiment, a collection object may contain a table, an index, or a table and an index. The target database 52 is the database for which the user is maintaining database statistics, also referred to as collection task generated statistics. In some embodiments, the target database is an International Business Machines Corporation (IBM) DB2 database management system. However, the invention is not meant to be limited to an IBM DB2 database management system, and other database management systems may be used.

The statistics collection tasks 54 comprise one or more commands which, when executed, collect one or more statistics describing the target database 52. In some embodiments, the statistics collection tasks 54 comprise one or more RUNSTATS commands. However, the statistics collection tasks 54 are not meant to be limited to RUNSTATS commands and other commands may be used.

A statistics database 56 comprises real-time statistics 58 and collection task generated statistics 60. In various embodiments, the real-time statistics 58 comprise one or more tables which store information describing the current state of the database. Typically, the database management system updates the real-time statistics.

The collection task generated statistics 60 comprise one or more snapshot statistics and one or more historical statistics which are typically stored in tables. The snapshot statistics are used by the query optimizer to estimate the cost of access paths. The snapshot statistics are stored in one or more snapshot tables. The historical statistics provide a history of one or more of the statistics describing the target database 52. In various embodiments, the historical statistics may comprise at least one of the same statistics as in the snapshot statistics. The historical statistics are stored in one or more historical tables. In various embodiments, the statistics collection task 54 updates the snapshot statistics in snapshot statistics tables, and in some embodiments, the historical statistics in historical statistics tables, based on the state of the target database 52 at the time the statistics collection task 54 is executed.

A workload 62 comprises a plurality of queries to the target database 52. A workload-based statistics identification module 64 receives a workload 62, analyzes the queries of the workload 62 to identify one or more statistics for one or more tables, indexes, columns and column groups referenced by the queries of the workload 62, consolidates and stores the statistics for the one or more tables, indexes, columns and column groups referenced in the workload in the consolidated statistics repository 68. In some embodiments, the workload-based statistics identification module 64 receives a plurality of workloads, and analyzes, consolidates and stores statistics for each workload.

In the consolidated statistics repository 68, the information associated with each workload 62 is associated with a distinct workload identifier. The consolidated statistics repository 68 comprises information for at least one or any combination of one or more table names, zero or more index names, zero or more column names and zero or more column group names of the target database 52 for which collection task generated statistics are to be re-collected. Various embodiments of the consolidated statistics repository 68 are described in U.S. patent application Ser. No. 10/824,856.

A data profile manager 70 maintains one or more data profiles in a profile database 72 for the tables, indexes, columns and column groups referenced by one or more workloads. The profile database 72 comprises one or more profile tables which store the data profiles. A data profile typically comprises one or more characteristics of at least one statistic such as the volatility of a statistic. In some embodiments, the profiles also contain one or more statistics. Typically, statistics contained in data profiles are different from the collection task generated statistics. In some embodiments, the statistics in the profile database are derived from the collection task generated statistics. The data profile manager 70 accesses the consolidated statistics in the consolidated statistics repository 74 and the historical statistics of the collection task generated statistics 60 to update the profile database 72.

In various embodiments, a workload-based collection scheduler (WBCS) 74 comprises an active monitor 76. Typically, the active monitor 76 periodically invokes the data profile manager 70 to determine whether to re-collect a collection task generated statistic. In some embodiments, the data profile manager 70 monitors one or more characteristics of the collection task generated statistics to determine whether to re-collect that statistic. For example, one characteristic of a statistic is the volatility of that statistic. In various embodiments, the data profile manager 70 monitors one or more characteristics of one or more statistics which are derived from the collection task generated statistics in the profile database to determine whether to re-collect the associated collection task generated statistic. For example, point skew and range skew are statistics which are derived from one or more collection task generated statistics. The workload-based collection scheduler 74 generates one or more statistics collection tasks 54 based on the characteristics of the statistics. Various tables, indexes, columns and column groups may be referenced by a plurality of different workloads. In some embodiments, when two or more workloads are being monitored, the data profile manager 70 does not duplicate statistics across the workloads; for example, the data profile manager stores a single table name in the profile database when that table is referenced in a plurality of workloads.

In various embodiments, the data profile manager 70 uses historical statistics to perform a trend analysis of one or more statistics of interest. Based on the trend analysis, the workload-based collection scheduler 74 generates one or more statistics collection tasks 54 to re-collect the snapshot statistics, and in various embodiments, to also collect historical statistics, in the collection task generated statistics 60. In some embodiments, the user may cause the statistics collection tasks 54 to be executed.

In some embodiments, the trend analysis indicates the volatility of one or more statistics, and the statistics collection tasks 54 are generated based on the volatility. In various embodiments, the trend analysis indicates the staleness of the statistics and statistics collection tasks 54 are generated based on the staleness.

The volatility is determined for one or more statistics. In various embodiments, for tables, the volatility of the table cardinality is determined. For indexes, the volatility of the full key cardinality is determined. For columns, the volatility of the column cardinality and Hl2key are determined. In various embodiments, for columns, the volatility of the point skew, and in some embodiments, the range skew, are also determined. For column groups, the volatility of the column group cardinality, hl2key and skew, both point skew and range skew, are determined.

At least a subset of the collection task generated statistics 58 for the target database 52 may be collected by periodically executing one or more statistics collection tasks 54. In various embodiments, the user can specify how often to collect statistics for one or more workloads, and in some embodiments when to collect the statistics. Alternately, the workload-based collection scheduler 76 determines when to collect one or more statistics and, in some embodiments, how often to collect one or more statistics.

In various embodiments, the collection task generated statistics 60 are collected on-demand. Throughput refers to a number of queries executed within a predetermined amount of time. On-demand means that the workload-based collection scheduler 74 monitors the database throughput and, in some embodiments, one or more real time statistics, and in response to the performance degrading below a predetermined threshold, or in response to a substantial change in at least one real-time statistic, in various embodiments, one or more statistics collection tasks 54 are generated for those statistics which are associated with one or more workloads and which have a volatility exceeding a predetermined threshold, and those statistics collection tasks 54 are executed.

Figure 3:
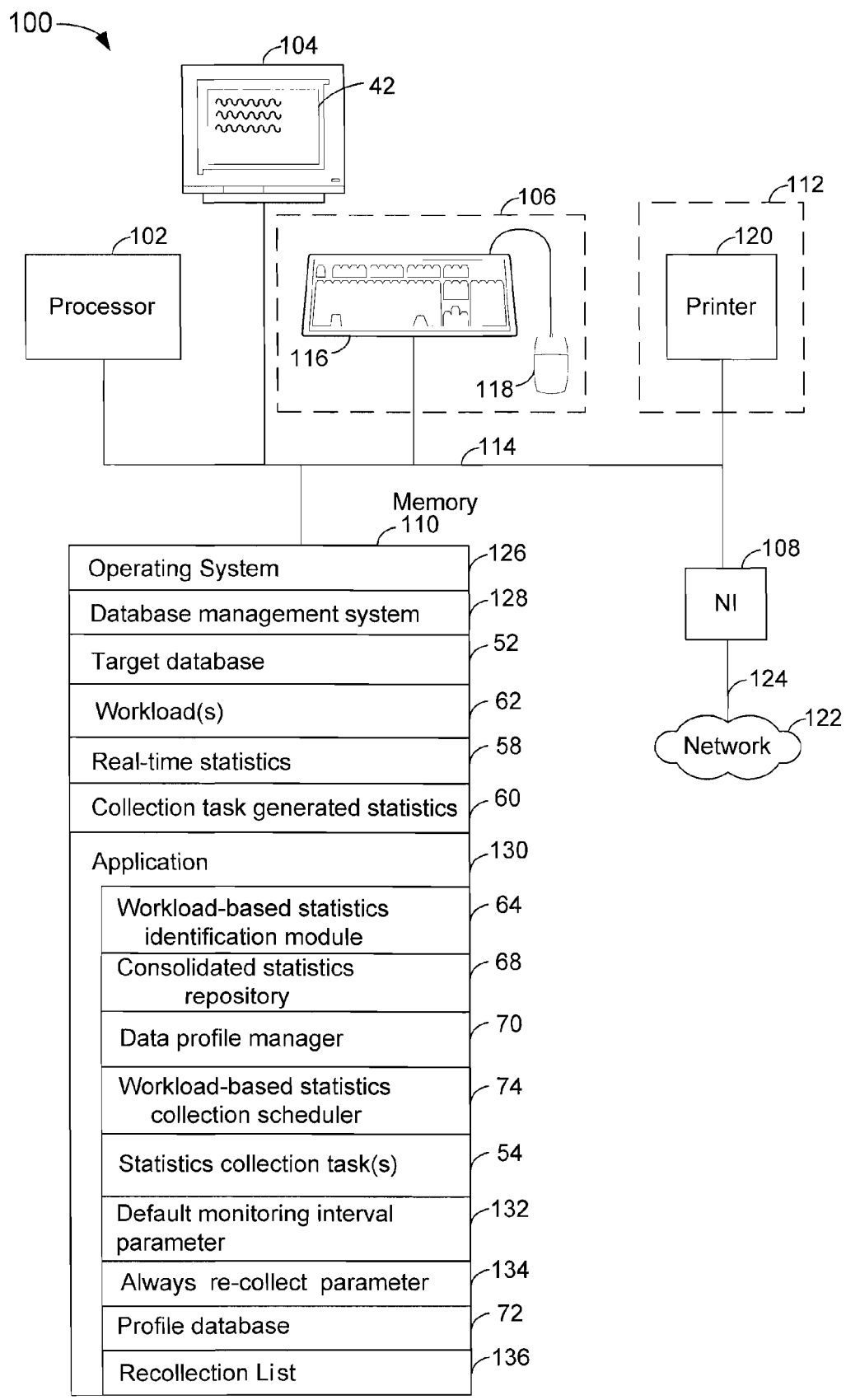
FIG. 3 depicts an illustrative computer system which uses various embodiments of the present invention.

FIG. 3 depicts an illustrative computer system 100 which uses various embodiments of the present invention. The computer system 100 comprises a processor 102, display 104, input interfaces (I/F) 106, communications interface 108, memory 110 and output interface(s) 112, all conventionally coupled by one or more buses 114. The input interfaces 106 comprise a keyboard 116 and a mouse 118. The output interface 112 comprises a printer 120. The communications interface 108 is a network interface (NI) that allows the computer 100 to communicate via a network 122. The communications interface 108 may be coupled to a transmission medium 124 such as, a network transmission line, for example twisted pair, coaxial cable or fiber optic cable. In another embodiment, the communications interface 108 provides a wireless interface, that is, the communications interface 108 uses a wireless transmission medium.

The memory 110 generally comprises different modalities, illustratively semiconductor memory, such as random access memory (RAM), and disk drives. In various embodiments, the memory 100 stores an operating system 126, a database management system 128, the target database 52, one or more workloads 62, real-time statistics 58, collection task generated statistics 60, and an application 130.

Typically, the application 130 comprises the workload based statistics identification module 64, the consolidated statistics repository 68, the data profile manager 70, the workload-based statistics collection scheduler 74, one or more statistics collection tasks 54, the profile database 72, a default monitoring interval parameter 132, an always re-collect parameter 134, and a recollection list 136.

In various embodiments, the specific software instructions, data structures and data that implement various embodiments of the present invention are typically incorporated in the application 130. Generally, an embodiment of the present invention is tangibly embodied in a computer-readable medium, for example, the memory 110 and is comprised of instructions which, when executed by the processor 102, cause the computer system 100 to utilize the present invention. The memory 110 may store the software instructions, data structures and data for any of the operating system 126, the database management system 128, the target database 52, one or more workloads 62, the real-time statistics 58, the collection task generated statistics 60, and the application 130 in semiconductor memory, in disk memory, or a combination thereof.

The operating system 126 may be implemented by any conventional operating system such as z/OS (Registered Trademark of International Business Machines Corporation), AIX® (Registered Trademark of International Business Machines Corporation), UNIX® (UNIX is a registered trademark of the Open Group in the United States and other countries), Windows® (Registered Trademark of Microsoft Corporation), Linux® (Registered Trademark of Linus Torvalds), Solaris® (Registered trademark of Sun Microsystems Inc.) and HP-UX® (Registered trademark of Hewlett-Packard Development Company, L.P.).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 3 is not intended to limit the present invention. Other alternative hardware environments may be used without departing from the scope of the present invention.

Figure 4:
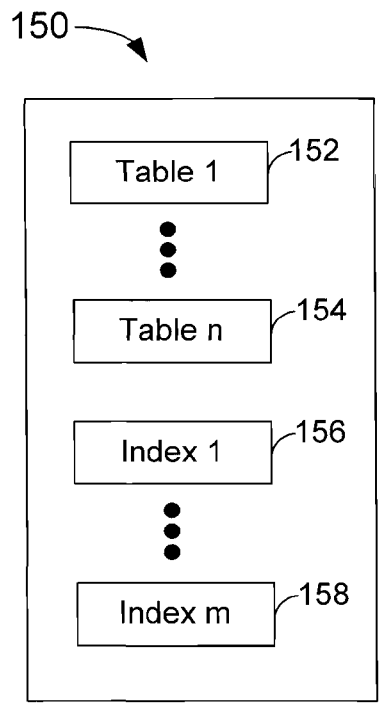
FIG. 4 depicts an embodiment of a collection object of the target database of FIG. 2.

FIG. 4 depicts an embodiment of a collection object 150 of the target database of FIG. 3. The collection object has one or more tables 152-154. In some embodiments, the collection object may have one or more indexes 156-168. In yet other embodiments, the collection object contains one or more tables 152-154 and one or more indexes 156-158. The target database may have one or more collection objects. In various embodiments, a collection objection contains one table or one index.

Figure 5:
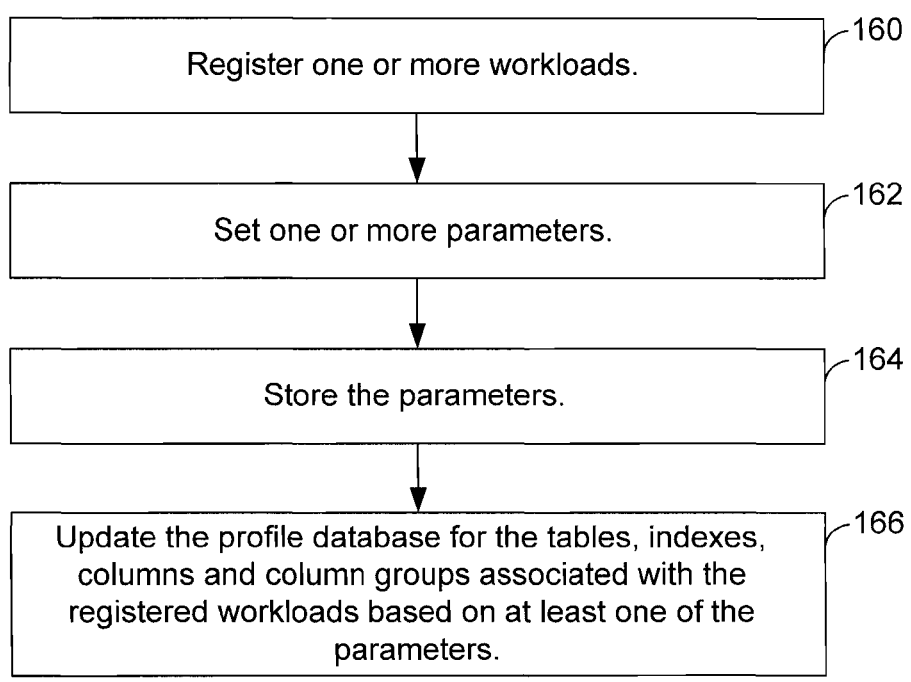
FIG. 5 depicts a flowchart of an embodiment of registering one or more workloads, setting one or more parameters and updating the profile database for the registered workloads.

FIG. 5 depicts a flowchart of an embodiment of registering one or more workloads, setting parameters and updating the profile database for the workloads. In step 160, one or more workloads are registered with the application. In various embodiments, the name of the file containing the workload and an associated workload identifier (id) are stored in a workload registry table in the profile database.

In step 162, one or more parameters are set. In various embodiments, a user sets parameters such as the default monitoring interval parameter 132 (FIG. 3) and the always re-collect parameter 134 (FIG. 3). In some embodiments, the user optionally sets one or more profile parameters, such as a volatility threshold and a staleness threshold for one or more of the statistics associated with the workload. In step 164, the one or more parameters are stored. In step 166, the profile database is updated for the tables, indexes, columns and column groups associated with the one or more workloads based on at least one of the profile parameters. The consolidated statistics repository is accessed based on the workload identifier to identify the tables, indexes, columns and column groups associated with the workload.

In various embodiments, the data in the target database changes over time, therefore the real-time statistics change. In various embodiments, the active monitor is designed to periodically determine if it is time to re-collect one or more of the collection task generated statistics associated with the registered workload(s) and makes a recommendation as to what collection task generated statistics to re-collect. The active monitor will prompt the user and ask the user to make the final decision as to whether to re-collect the recommended collection task generated statistics. If the user decides to re-collect, the application will generate one or more statistics collection tasks to re-collect the recommended collection task generated statistics, and then execute those statistics collection tasks. After re-collection, the workload-based statistics collection scheduler invokes the data profile manager to update the data profiles in the profile database based on the re-collected collection task generated statistics. The updated data in the profile database will be used for the next recommendation as to what statistics to re-collect.

In some embodiments, the application can be viewed as a self-learning loop. In various embodiments, a recommendation to re-collect one or more statistics is generated, at least in part, based on a determination of the volatility of one or more of the statistics in the historical table(s), and in some embodiments, an estimation of the staleness of one or more of the statistics in the historical table(s). In some embodiments, the recommendation to re-collect is generated based on a determination of the volatility, and in some embodiments, the staleness of one or more statistics in the profile database. In various embodiments, the recommendation to re-collect is based on the volatility of a statistic which is stored in the profile database. If the user chooses to execute the statistics collection tasks, new snapshot and historical statistics will be collected and the profile database is updated based on the newly-collected historical statistics. Since the newly-collected historical statistics will be used the next time that the application makes recommendations to re-collect, the accuracy of the next recommendation is typically expected to improve.

In various embodiments, users can assist in this self-learning loop by configuring profile parameters in the profile database and verifying the stability of one or more statistics.

Figure 6:
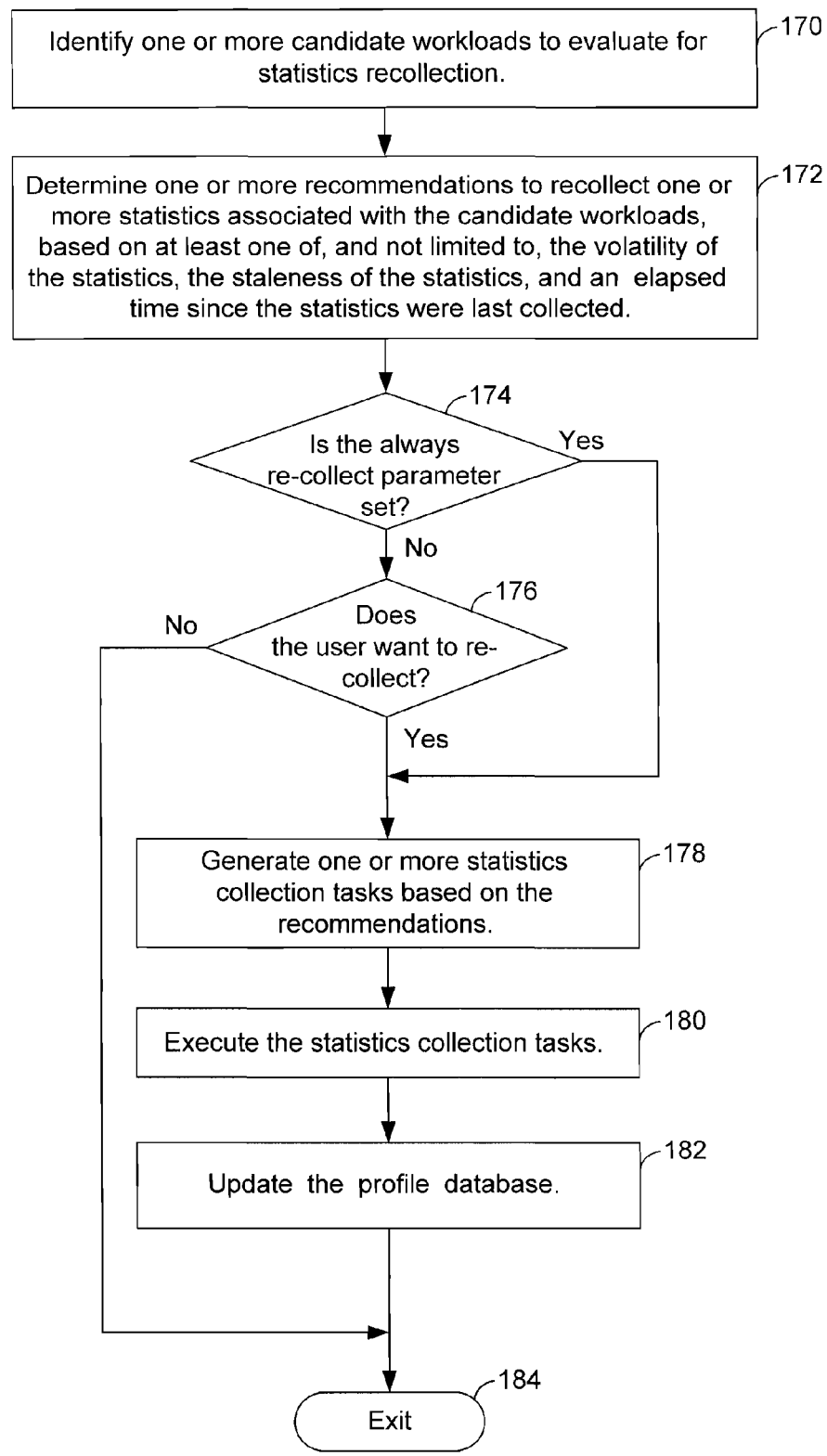
FIG. 6 depicts a high-level flowchart of an embodiment of generating statistics collection tasks for one or more candidate workloads, and executing the statistics collection tasks.

FIG. 6 depicts a high-level flowchart of an embodiment of generating statistics collection tasks for candidate workloads, and executing the statistics collection tasks. Typically the flowchart of FIG. 6 is performed during a pass of the self-learning loop. The application typically has a default monitoring interval parameter 132 (FIG. 3) which is set to a pre-determined value, and the flowchart of FIG. 6 is typically performed periodically based on the default monitoring interval parameter 132 (FIG. 3), for example, after an amount of time equal to the default monitoring interval parameter 132 (FIG. 3) has elapsed. The user can set the default monitoring interval parameter 132 (FIG. 3). In some embodiments, the flowchart of FIG. 6 is performed in response to a user request.

In step 170, one or more candidate workloads are identified to evaluate for statistics recollection. The candidate workloads are those workloads which were registered in step 160 of the flowchart of FIG. 5. The data for the candidate workloads was updated in the profile database during the registration process of FIG. 5. In step 172, one or more recommendations to re-collect one or more statistics associated with the candidate workloads are determined based on at least one of, and not limited to, the volatility of the statistics, the staleness of the statistics, and an elapsed time since the statistics were last collected. Step 174 determines whether the always re-collect parameter 134 (FIG. 3) is set to "Yes". In response to step 174 determining that the always re-collect parameter 132 (FIG. 3) is not set to "Yes", in step 176, the user is prompted as to whether the user wants to re-collect. In response to the user affirming recollection, in step 178, one or more statistics collection tasks are generated based on the recommendations. In step 180, the statistics collection tasks are executed. In step 182, the profile database is updated. In step 184, the flowchart exits.

In response to step 174 determining that the always re-collect parameter 134 (FIG. 3) is set to "Yes", step 174 proceeds to step 175 to generate one or more statistics collection tasks to re-collect the recommended statistics. In response to step 176 determining that the user does not want to re-collect, step 176 proceeds to step 184 to exit.

Figure 7:
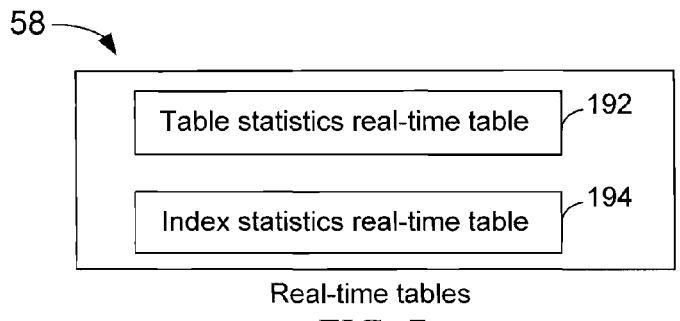
FIG. 7 depicts a block diagram of an embodiment of the real-time statistics tables of FIG. 3 which contain the real-time statistics.

FIG. 7 depicts a block diagram of an embodiment of the real-time statistics tables 58 of FIG. 3 which contain the real-time statistics. In various embodiments, the real-time statistics tables 58 comprise a table statistics real-time table 192 and an index statistics real-time table 194. In some embodiments, using the IBM DB2 database management system, the table statistics real-time table is the conventional TABLESPACESTATS table, and the index statistics real-time table is the conventional INDEXSPACESTATS table. However, the invention is not meant to be limited to the DB2 database management system and the TABLESPACESTATS and INDEXSPACESTATS tables, and other tables and formats for the tables may be used.

Table 1 below lists at least some of the columns of an exemplary table statistics real-time table 192 and a description of the column.

TABLE 1

| Table statistics real-time table | |
|---|---|
| Column | Description |
| Collection object name | The name of the collection object. |
| TotalRows | The total number of rows in all the tables in the collection object. |

The table statistics real-time table 192 has a column called collection object name which contains the name of the collection object. The table statistics real-time statistics table 192 also has a column called TotalRows which represents the number of rows in all the tables in the collection object. In various embodiments, a collection object contains only one table; therefore, TotalRows represents the number of rows in the table, which is the table cardinality. Alternately, the table statistics real-time table has columns which contain the table name and number of rows in the table.

The database management system typically has another table which associates the collection object names with the tables and indexes in the collection object. In this way, the tables contained in the collection object can be identified.

Table 2 below lists at least some of the columns of an exemplary index statistics real-time table 194 and a description of the column.

TABLE 2

| Index statistics real-time table | |
|---|---|
| Column | Description |
| Collection object name | The name of the collection object. |
| TotalEntries | The number of entries in the collection object. |

In various embodiments, a collection object contains only one index; therefore, TotalEntries represents the number of entries, that is, rows, in the index which is the index cardinality. In another embodiment, the index statistics real-time table has columns containing the index name and the number of entries in the index.

Figure 8:
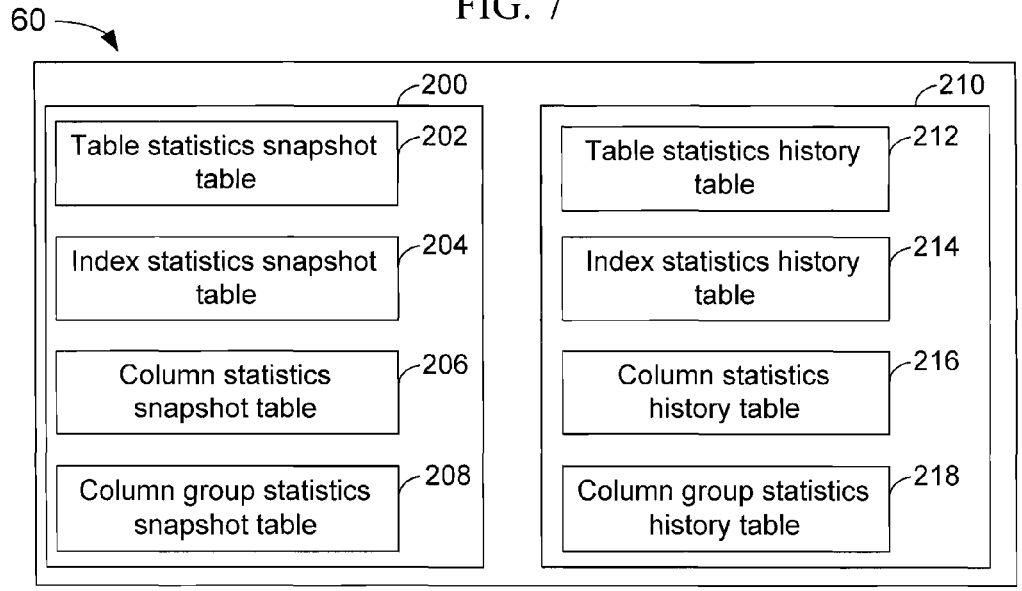
FIG. 8 depicts a block diagram of an embodiment of the collection task generated statistics tables of FIG. 3.

FIG. 8 depicts a block diagram of an embodiment of the collection task generated statistics tables 60 of FIG. 3. The collection task generated statistics tables 60 contain snapshot tables 200 and historical tables 210. In various embodiments, the snapshot tables 60 comprise a table statistics snapshot table 202, an index statistics snapshot table 204, a column statistics snapshot table 206, and a column group statistics snapshot table 208. In various embodiments, the historical tables 210 comprise a table statistics history table 212, an index statistics history table 214, a column statistics history table 216 and a column group statistics history table 218.

Various embodiments of at least a portion of the history tables 210 will now be described. Table 3 below lists at least some of the columns of an embodiment of the table statistics history table 212 and a description of the columns.

TABLE 3

| Table statistics history table | |
|---|---|
| Column | Description |
| Table name | The name of the table. |
| Creator | The name of the creator of the table. |
| Table cardinality | The number of rows in the table. |
| Statstime | The date and time, that is, a timestamp of, when the statistic, that is the table |

TABLE 3-continued

Table statistics history table

| Column | Description |
|---|---|
| | cardinality, was updated for the table. |

The table statistics history table 212 contains one or more rows, and each row contains the table name, the name of the creator of the table, a value of the table cardinality (Table cardinality) and statistics time (Statstime) to provide a history of the table cardinalities for the table. In some embodiments, a table is identified by the table name, and in other embodiments, a table is identified by the combination of the table name and creator.

Table 4 below lists at least some of the columns of an embodiment of the index statistics history table 214 and a description of the columns.

TABLE 4

Index statistics history table

| Column | Description |
|---|---|
| Index name | The name of the index. |
| Creator | The name of the creator of the index. |
| Table name | The name of the table for which the index was created. |
| FirstKeyCard | For the index, the number of distinct values of the first key column. |
| FullKeyCard | For the index, the number of distinct values of the key. |
| ClusterRatio | The percentage of rows that are in clustering order. The value is zero if statistics have not been gathered. |
| Statstime | The date and time, that is, a timestamp of, when the statistics were updated for the index. |

In some embodiments, the index name identifies an index. In other embodiments, a combination of the index name, creator and table name identify an index.

Table 5 below lists at least some of the columns of an exemplary column statistics history table 216 (FIG. 8) and a description of the columns.

TABLE 5

Column statistics history table

| Column | Description |
|---|---|
| Table name | The name of the table for which the index was created. |
| Creator | The name of the creator of the table. |
| Column Name | The name of the column of the table. |
| Column Number | The number of the column. |
| HighKey | The highest value of the column in the table. Is blank if statistics have not been gathered or the column is an indicator column. |
| High2Key | The second highest value of the column in the table. Is blank if statistics have not been gathered or if the column is an indicator column. |
| LowKey | The lowest value of the column in the table. Is blank if statistics have not been gathered or if the column is an indicator column. |
| Low2Key | The second lowest value of the column in the table. Is blank if statistics have not been gathered or if the column is an indicator column. |
| ColumnCardinality | The number of distinct values in the column. |
| Statstime | The date and time, that is, a timestamp of, when the statistics were updated for the column. |

In some embodiments, a combination of the creator, column name and table name is used to identify a column. In yet other embodiments, a combination of the creator, table name and column number is used to identify a column.

Table 6 below lists at least some of the columns of an exemplary column group statistics history table 218 (FIG. 8) and a description of the columns.

TABLE 6

Column group statistics history table

| Column | Description |
|---|---|
| Table name | The name of the table containing the column group. |
| Creator | The name of the creator of the table. |
| Column Name | The name of the first column of the column group. |
| ColValue | Contains a frequently occurring value of the column group. |
| Type | The type of statistics gathered: "C" indicates cardinality, "F" indicates frequency, and "H" indicates histogram. |
| Cardinality | Number of distinct values in the column group. |
| NumColumns | Identifies the number of columns associated with the statistics. |
| Column Group Column No | Identifies the set of columns associated with the statistic(s). If the statistics are only associated with a single column, the field contains a zero length; otherwise, the field contains an array of column numbers with a dimension equal to the value in NumColumns. |
| Frequency | Contains the percentage of rows in the column group with the value specified in ColValue when the number is multiplied by one hundred. For example, a value of one indicates one hundred percent. |
| Statstime | The date and time, that is, a timestamp of, when the statistics were updated for this column group. |

In various embodiments, a column group is identified by the table name, creator and column group column number.

The column group statistics history table 218 is also used for single columns.

In some embodiments, for example, for the IBM DB2 database management system, the history tables comprise the SYSIBM.SYSTABLES_HIST, SYSIBM.SYSCOLUMNS_HIST, SYSIBM.SYSINDEXES_HIST and SYSIBM.SYSCOLDIST_HIST. However, the invention is not meant to be limited to IBM DB2 and the tables enumerated above, and other tables and table formats may be used.

Embodiments of the snapshot tables 200 will now be described. In various embodiments, the table statistics snapshot table 202 contains the columns listed above in Table 3 for the table statistics history table 212. The index statistics snapshot table 204 contains the columns listed above in Table 4 for the index statistics history table 214. The column statistics snapshot table 216 contains the columns listed above in Table 5 for the column statistics history table 216. The column group statistics snapshot table 208 contains the columns listed above in Table 6 for the column group statistics history table 218. In various embodiments, the column group statistics snapshot table 208 (FIG. 8) is also used for single columns. Typically the snapshot tables 200 have a single row containing the most recent data gathered by a statistics collection task. In some embodiments, the column group snapshot table 200 contains multiple rows, for example, when more than one row is needed to represent the information associated with the statistic, such as frequency or histogram statistics.

Figure 9:
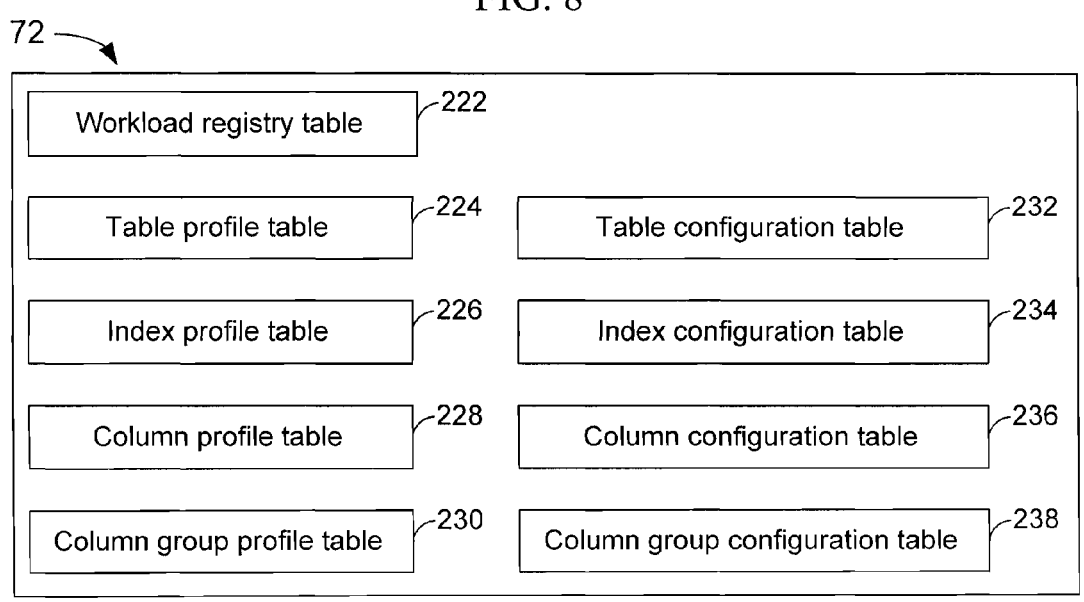
FIG. 9 depicts a block diagram of an embodiment of the profile database of FIG. 3.

FIG. 9 depicts a block diagram of an embodiment of the profile database 72 of FIG. 3. In various embodiments, the profile database 72 comprises a workload registry table 222, a table profile table 224, an index profile table 226, a column profile table 228, a column group profile table 230, a table configuration table 232, an index configuration table 234, a column configuration table 236 and a column group configuration table 238.

Various embodiments of the tables of the profile database 72 will now be described. The data profiles in the profile database 72 comprise one or more characteristics of the real-time and historical statistics, such as volatility. In various embodiments, the data profile manager provides a wrapper of one or more actions such as creating, accessing and updating the data profiles in the profile database 72.

Various embodiments of data profiles will now be described for each database object type. In one embodiment, the syntax of the definition of a data profile is as follows:

profile_name (element 1, element 2, . . . , element n)

Alternately other syntaxes for a data profile may be used.

The profile_name is the name of the data profile. One or more elements, element 1, element 2, . . . , element n, are defined to capture one or more characteristics of the statistics associated with a database object, such as a table, index, column, or column group. In some embodiments, in a general profile called stat_prof, the elements associated with a statistic are as follows:

stat_prof (Vstatus, Vconf, Vchangetime, V, Vthresh, Sthresh, Tcthresh, Tgrain, Tthresh)

The stat_prof profile has elements such as Vstatus, Vconf, Vchangetime, V, Vthresh, Sthresh, Tcthresh, Tgrain and Tthresh and the elements will be described below.

The volatility status, Vstatus, element contains a value which represents the state of the volatility of the statistic. In some embodiments, Vstatus has three values, "V," "S" and "U." "V" represents volatile; "S" represents static; and "U" represents unknown. A volatility status of "V" means that the value of the statistic fluctuates significantly over time. A volatility status of "S" means that the value of the statistic does not fluctuate significantly over time. A volatility status of "U" means that the volatility status of the statistic is not known.

The Vconf element contains a value that represents the confidence of stability of the statistic. The confidence of stability of the statistic ranges between zero and one, where a value of one means one hundred percent indicates that the statistic is stable and a value of zero indicates no confidence in the stability of the statistic.

The Vchangetime element contains a timestamp representing the date and time that the volatility status, Vstatus, changed.

The volatility, V, element contains a value representing the volatility of the statistic, that is, a quantified measurement or estimate of how much the value of the statistic fluctuates.

The volatility threshold, Vthresh, element contains a configurable volatility threshold which is used to determine the value of Vstatus for the statistic. If the volatility V is greater than or equal to Vthresh, Vstatus is assigned a value of "V," for volatile, and otherwise a value of "S" for static. In various embodiments, the volatility threshold, Vthresh, is predefined, and in some embodiments, the volatility threshold can also be set by a user.

The staleness threshold, Sthresh, element contains a configurable staleness threshold which is used to determine whether a statistic is stale. For volatile statistics, if the staleness is greater than or equal to the staleness threshold, Sthresh, the statistic is determined to be stale and recollection will be recommended.

The Tcthresh element contains a table cardinality threshold. For nonvolatile statistics, in some embodiments, recollection will be recommended if the change in table cardinality since the last collection is greater than or equal to Tcthresh.

The Tgrain element contains a time unit, that is, a time granularity, which is used to determine whether recollection is recommended. For example, if Tgrain is equal to one hour, then one whole day contains twenty-four time grains.

The Tthresh element contains a time threshold. For nonvolatile statistics, recollection will be recommended once a number of elapsed time grains since the last statistics collection is greater than or equal to Tthresh. The number of elapsed time grains is equal to the elapsed time divided by Tgrain.

In various embodiments, the data profile also contains an element, called Vstatstime, which contains a timestamp which indicates when the most recent historical statistic which is used to determine the volatility was collected.

In various embodiments, a data profile, called vtbcard, for a table is defined as follows: p1 vtbcard (Vstatus, Vconf, Vchangetime, V, Vthresh, Sthresh, Tcthresh, Tgrain, Tthresh)

The vtbcard data profile contains the volatility of the table cardinality statistic in V. The other elements, described above, are applied to the table cardinality statistic.

In various embodiments, at least a portion of the data profile for the table statistic is stored in the table profile table 224 as shown below in Table 7.

TABLE 7

Table profile table

| Column | Description |
| --- | --- |
| Table name | The name of the table. |
| Creator | The name of the creator of the table. |
| Vstatus | The volatility status. |
| Vconf | The confidence of stability of the table cardinality. |
| Vchangetime | The time that that volatility status, Vstatus, changed. |
| V | The volatility of the table cardinality. |
| Vstatstime | A timestamp associated with the most recent value of the historical table cardinality used to compute the volatility. |
| Defaultconfig | Specifies whether to use default or specific threshold and weights policy parameters. |

In various embodiments, for an index, a statistic referred to as the full key cardinality has a data profile. A data profile, called vfullkeycard, which contains the volatility of the full key cardinality for an index is defined as follows:

vfullkeycard (Vstatus, Vconf, Vchangetime, V, Vthresh, Sthresh, Tcthresh, Tgrain, Tthresh)

In this embodiment, the volatility element V contains the volatility of the full key cardinality for the index. The descriptions above for Vstatus, Vconf, Vchangetime, Vthresh, Sthresh, Tcthresh, Tgrain and Tthresh for the general profile called stat_prof also apply to the elements of the full key cardinality for an index.

In various embodiments, at least a portion of the data profile for the index statistics is stored in the index profile table 226 as shown below in Table 8.

TABLE 8

Index profile table

| Column | Description |
| --- | --- |
| Index name | The name of the index. |
| CreatorIndex | The creator of the index. |

TABLE 8-continued

Index profile table

| Column | Description |
| --- | --- |
| Table name | The name of the table associated with the index. |
| CreatorTable | The creator of the table. |
| Vstatus | The volatility status of the full key cardinality. |
| Vconf | The confidence of stability of the full key cardinality. |
| Vchangetime | The time that the volatility status, Vstatus, changed. |
| V | The volatility of the full key cardinality. |
| Vstatstime | A timestamp associated with the most recent value of the historical full key cardinality used to compute the volatility. |
| DefaultConfig | Indicates whether to use default or specific threshold parameters. |

In various embodiments, a data profile for a column, called vcolumn, comprises a volatility V1 of the column cardinality. The data profile, vcolcard, containing the volatility V1 of the column cardinality is as follows:

vcolumn (Vstatus1, Vconf1, Vchangetime1, V1, Vthresh1, Sthresh1, Tcthresh1, Tgrain, Tthresh)

The description above for Vstatus, Vconf, Vchangetime, Vthresh, Sthresh, Tcthresh, Tgrain and Tthresh for the general data profile, stat_prof, above, also applies to Vstatus1, Vconf1, Vchangetime1, Vthresh1, Sthresh1, Tcthresh1, Tgrain and Tthresh, respectively, of the column cardinality statistic.

Vhl2key is a statistic that represents a range, that is, the range of the high2key and how2key statistics for a column. Vhl2key represents the difference between high2key and low2key for the column.

In various embodiments, a data profile, called vhl2key, for a column comprises a volatility V2 of the hl2key statistic. The data profile of vhl2key is as follows:

vhl2key (Vstatus2, Vconf2, Vchangetime2, V2, Vthresh2, Sthresh2, Tcthresh2, Tgrain, Tthresh)

The description above for Vstatus, Vconf, Vchangetime, Vthresh, Sthresh, Tcthresh, Tgrain and Tthresh, for the general data profile, stat_prof, also applies to Vstatus2, Vconf2, Vchangetime2, Vthresh2, Sthresh2, Tcthresh2, Tgrain and Tthresh, respectively, for the hl2key statistic.

In some embodiments, the profile for a column also contains information describing a default literal value. This information is used by the application to extract the default literal information. The default literal statistics are associated with a type element and the literal element. The type has three values. A type of "B" is used when the default literal is blank; a type of "N" is used when the default literal is null; and a type of "O" represents other default literal. The literal element contains value of a literal if the type is other.

In various embodiments, at least a portion of the data profiles for the column statistics is stored in a column profile table 228 as shown below in Table 9.

TABLE 9

Column profile table

| Column | Description |
| --- | --- |
| Table name | The name of the table. |
| Creator | The name of the creator of the table. |
| Vstatus1 | The volatility status of the column cardinality. |
| Vconf1 | The confidence of stability of the column cardinality. |
| Vchangetime1 | The time that the volatility status, Vstatus1, changed. |
| V1 | The volatility of the column cardinality of the column. |
| Vstatstime1 | A timestamp associated with the most recent value of the historical column cardinality used to compute the volatility. |
| Vstatus2 | The volatility status of hl2key. |
| Vconf2 | The confidence of stability of hl2key. |
| Vchangetime2 | The time that the volatility status, Vstatus2, of hl2key changed. |
| V2 | The volatility of hl2key. |
| Vstatstime2 | A timestamp associated with the most recent value of the historical Hl2key used to compute the volatility. |
| Defaulttype | The type of default literal. |
| Defaultliteral | The default literal value. |
| DefaultConfig | Indicates whether to use a default or specific threshold parameters. |

Various embodiments of data profiles for a column group will now be described. Correlation is a value which represents the inter-dependency between columns in a column group. In some embodiments, the correlation of a column group has a data profile, called corr, as follows:

corr (Cstatus, C, Cstatstime, Cthresh).

The element, Cstatus, has three values: "C", "I" and "U." A value of "C" means that the columns in the column group are correlated. A value of "I" means that the columns in the column group are independent. A value of "U" means the correlation is unknown.

The element C contains a value of the correlation. In various embodiments, the correlation is a normalized correlation factor which has a range between zero and one. The normalized correlation factor is a quantified measurement of the degree of correlation of the column group. If a column group contains a single column, then the correlation is undefined.

The element Cstatstime is the time at which the status of the correlation C was determined.

The correlation threshold element Cthresh is a threshold to determine the value of Cstatus. If the value of the correlation C is greater than or equal to the correlation threshold, Cthresh, the correlation status, Cstatus, is assigned a value of "C" which means that the columns are correlated. If the value of the correlation, C, is less than the correlation threshold, Cthresh, Cstatus is assigned a value of "I" which means that the columns are independent.

The volatility V1 of the cardinality of the column group is also determined and stored in a profile. The volatility of the cardinality of the column group is contained in a profile, called vmcard, as follows:

vmcard (Vstatus1, Vconf1, Vchangetime1, V1, Vthresh1, Sthresh1, Tcthresh1, Tgrain, Tthresh)

The element V1 contains the volatility of the cardinality of the column group. The description above of the elements Vstatus, Vconf, Vchangetime, Vthresh, Sthresh, Tcthresh, Tgrain and Tthresh of the general profile also applies to Vstatus1, Vconf1, Vchangetime1, Vthresh1, Sthresh1, Tcthresh1, Tgrain and Tthresh, respectively, for the column cardinality statistic of the column group.

The point skew is another statistic which is associated with the column group. The point skew indicates whether the distribution of one or more values of the column group is skewed. In some embodiments, various elements associated with the point skew statistic of a column group are contained in a data profile for the column group. A profile, called pointskew, is defined as follows:

pointskew (Psstatus, Sizeofpskewset, Psthresh)

The element Psstatus contains the point skew status and has three values: "Y" for yes, "N" for no and "U" for unknown. A value of "Y" means that at least one of the column group values is point skewed. A value of "N" means that none of the column group values is point skewed. A value of "U" means that the point skew status, Psstatus, is not known.

The element called Sizeofpskewset contains a value indicating the number of column group values which are point skewed.

The element called Psthresh represents the point skew threshold, and is used to determine the value of the point skew status, Psstatus. If at least one column group value has a point skew greater than or equal to the point skew threshold, Psthresh, the point skew status, Psstatus, is set to "Y", otherwise the point skew status, Psstatus, is set to "N".

In some embodiments, a data profile, called pointskewset, is defined as follows:

pointskewset (Type, Colgroupval, Ps, Statstime).

The element called Type has two values: "M" and "L". "M" means that the most frequent column group values are collected, and "L" means that the least frequent column group values are collected.

The element called Colgroupval contains a value in the column group. The Colgroupval can be a most skewed value, a least skewed value or any other value contained in the column group.

The element called Ps contains the value of the point skew of the column group.

The element called Statstime is a timestamp containing the most recent value of the historical statistics used to determine the point skew.

In various embodiments, a data profile, vpointskew, contains the volatility V2 of the point skew of the column group as follows:

vpointskew (Vstatus2, Vconf2, Vchangetime2, V2, Vthresh, Sthresh, Tcthresh, Tgrain, Tthresh).

The descriptions above of Vstatus, Vconf, Vchangetime, Vthresh, Sthresh, Tcthresh, Tgrain and Tthresh of the elements of the general profile, stat_prof, also apply to the elements Vstatus2, Vconf2, Vchangetime2, Vthresh, Sthresh, Tcthresh, Tgrain and Tthresh, respectively, for the vpointskew profile of the column group.

A statistic called range skew indicates whether one or more ranges of values are more frequent than other ranges for a column group or column. In some embodiments, a data profile, called rangeskew, is defined as follows:

rangeskew (Rsstatus, Sizeofrskewset, Rsthresh).

The range skew status, Rsstatus, element has three values: "Y", "N" and "U". "Y", for yes, means that the column group values are range skewed. "N", for no, means that the column group values are not range-skewed. "U", for unknown, means that the range-skew is not yet known.

The element Sizeofrskewset contains the number of ranges that the column value space of the column group is divided into.

The element range skew threshold, Rsthresh, is a threshold which is used to determine the value of the range skew status, Rsstatus. If at least one of the ranges has a range skew, Rs, value which is greater than or equal to the range skew threshold, Rsthresh, the range skew status, Rsstatus is set to "Y" for yes, and otherwise "N" for no.

In some embodiments, a data profile, called rangeskewset, is defined as follows:

rangeskewset (Rangeid, Rs, Statstime).

In various embodiments, the rangeskewset profile indicates the set of ranges which are identified as highly range skewed. The element Rangeid contains an identifier of a range. The element called Rs contains the value of the range skew. The element Statstime contains a timestamp associated with the most recent historical statistic used to compute the range skew.

In some embodiments, histogram statistics are derived from frequency statistics. In various embodiments, histogram statistics are also stored. A histogram value, histval, contains the sum of frequencies of the collected frequency statistics of a range of values for a column group. In another embodiment, histogram statistics are collected and histogram statistics are not derived from frequency statistics.

In some embodiments, a profile called vrangeskew, for the volatility of the range skew V3 is defined as follows:

vrangeskew (Vstatus3, Vconf3, Vchangetime3, V3, Vthresh3, Sthresh3, Tcthresh3, Tgrain, Tthresh)

The descriptions above for the elements of the general profile, stat_prof, Vstatus, Vconf, Vchangetime, Vthresh, Sthresh, Tcthresh, Tgrain and Tthresh also apply to Vstatus3, Vconf3, Vchangetime3, Vthresh3, Sthresh3, Tcthresh3, Tgrain, Tthresh, respectively, for the range skew of a column group or column.

In various embodiments, at least a portion of one or more data profiles for the column group statistics are stored in the column group profile table 230 as shown below in Table 10.

TABLE 10

Column group profile table

| Column | Description |
| --- | --- |
| Column group name | The name of the column group. |
| Table name | The name of the table containing the column group. |
| Creator | The creator of the table containing the column group. |
| Column group column number | The column group number. |
| Number columns | The number of columns in the column group. |
| Cstatus | The correlation status. |
| C | The correlation. |
| Cstatstime | A time associated with the correlation. |
| Vstatus1 | The volatility status of the cardinality of the column group. |
| Vconf1 | The confidence of stability of the cardinality of the column group. |
| Vchangetime1 | The time that the volatility status of the cardinality of the column group changed. |
| V1 | The volatility of the cardinality of the column group. |
| Vstatstime1 | A timestamp associated with the most recent historical column cardinality used to compute the volatility. |
| Pstatus | The point skew status. |
| Colgroupval | The column value that is most skewed. |
| Ps | The value of the point skew. |
| Sizeofpskewset | The number of column group values which are determined to be point skewed. |
| Vstatus2 | The volatility status of the point skew. |
| Vconf2 | The confidence of stability of the point skew. |
| Vchangetime2 | The time that the volatility status of the point skew of the column group changed. |
| V2 | The volatility of the point skew. |

TABLE 10-continued

Column group profile table

| Column | Description |
| --- | --- |
| Vstatstime2 | A timestamp associated with the most recent point skew used to compute the volatility. |
| Rstatus | The range skew status. |
| Rs | The range skew, and in some embodiments, the maximum range skew of the column group. |
| Sizeofrskewset | The number of ranges that the column value set is divided into. |
| Vstatus3 | The volatility status of the range skew. |
| Vconf3 | The confidence of stability of the range skew. |
| Vchangetime3 | The time that the volatility status of the point skew of the column group changed. |
| V3 | The volatility of the range skew. |
| Vstatstime3 | A timestamp associated with the most recent range skew used to compute the volatility. |
| Vstatus4 | The volatility status of hl2key of the column group. |
| Vconf4 | The confidence of stability of hl2key of the column group. |
| Vchangtime4 | The time that the volatility status of hl2key of the column group changed. |
| V4 | The volatility of hl2key of the column group. |
| Vstatstime4 | A timestamp associated with the most recent high2key or low2key used to compute the volatility. |
| DefaultConfig | Indicates whether to use default or specific threshold values. |

In various embodiments, the column group profile table is also used for single columns. The DefaultConfig column indicates whether default or specific threshold values should be used to obtain the values of Sthresh and Vthresh.

In some embodiments, Colgroupval can contain any column value in the column group; and Ps contains the point skew associated with Colgroupval.

In an alternate embodiment, the column group profile table also contains entries for the volatility threshold, Vthresh, and the staleness threshold, Sthresh, one entry for each type of volatility contained in the table.

In various embodiments, the profile database 72 also has configuration tables. A workload registry table 222 contains information for workload. In one embodiment, table 11 contains the columns and a description of the columns of the workload registry table 222 as shown below:

TABLE 11

Workload registry table

| Column | Description |
| --- | --- |
| Workload ID | A workload identifier to identify a workload. |
| Alias | Indicates which database server that the workload comes from. |
| File | A file containing the queries of the workload. |
| Sthresh | The staleness threshold for the workload. |
| Autodetect | Indicates whether the workload is monitored to re-collect statistics on demand. |
| Recollection time | Time at which statistics were re-collected for the workload. |
| Tthresh | A time threshold for re-collecting statistics for the workload. |
| Tcthresh | A table cardinality threshold for the workload. |

In some embodiments, the table cardinality threshold Tcthresh may be stored in several places such as in a system configuration file for the computer executing the application, the workload registry table above, and the table configuration table. The precedence for selecting the table cardinality threshold Tcthresh is to first use a value from the table configuration table, then the workload registry table and then the value stored in the system configuration file.

In various embodiments, the table configuration table 232 contains various configuration parameters as shown in Table 12 below.

TABLE 12

Table configuration table

| Column | Description |
| --- | --- |
| Name | The table name. |
| Creator | The creator of the table. |
| Vthresh | The volatility threshold for the table. |
| Vconfthresh | The confidence of stability threshold for the table. |
| Numofdatapoints | Number of historical values of the table cardinality to use to determine the volatility. |
| Weightspolicy | Used to determine the weighting policy to determine the volatility. |
| Tgrain | The time granularity unit. |
| Tcthresh | A table cardinality threshold for the table name. |
| Tthresh | A time threshold for updating the table cardinality of the table. |

In some embodiments, when the table configuration table is created, predetermined default values are inserted into the table configuration table. The default values are used when no values are defined for a specific table.

The index configuration table 234 contains various configuration parameters as shown in Table 13 below.

TABLE 13

Index configuration table

| Column | Description |
| --- | --- |
| Index name | The index name. |
| Creator | The creator of the index. |
| Table name | The table for which the index was created. |
| Creator | The creator of the table specified by the table name. |
| Vthresh | The volatility threshold for the full key cardinality of the index. |
| Vconfthresh | The confidence of stability threshold of the index. |
| Numofdatapoints | Number of historical values of the full key cardinality to use to determine the volatility of the full key cardinality. |
| Weightspolicy | Used to determine the weighting policy to compute the volatility. |
| Tthresh | A time threshold for updating the full key cardinality of the index. |

When the index configuration table 234 is created predetermined default values are inserted into the index configuration table 234. The default values are used when values are not defined for a specific index.

In various embodiments, the column configuration table 236 contains configuration parameters as shown in Table 14 below.

TABLE 14

Column configuration table

| Column | Description |
| --- | --- |
| Column name | The column name. |
| Table name | The table for which the index was created. |
| Creator | The creator of the table. |
| Vthresh1 | The volatility threshold of the column cardinality of the column. |
| Vconfthresh1 | The confidence of stability threshold of the column cardinality of the column. |
| Numofdatapoints1 | Number of historical values of the column cardinality to use to determine the volatility. |
| Weightspolicy1 | The weighting policy for determining the volatility of the column cardinality. |
| Vthresh2 | The volatility threshold for the hl2key statistic. |
| Vconfthresh2 | The confidence of stability threshold for the hl2key statistic. |
| Numofdatapoints2 | Number of historical values of the hl2key statistic to use to determine the volatility. |
| Weightspolicy2 | The weighting policy of the hl2key statistic. |
| Tthresh | A time threshold for updating the statistics associated with the column. |

Although the column configuration table 236 contains a time threshold Tthresh for updating the statistics associated with the column, in some embodiments, a separate time threshold is provided for each statistic associated with the column. When the column configuration table 236 is created, predetermined default values are inserted into the column configuration table 236.

In various embodiments, the column group configuration table 238 contains various configuration parameters as shown in Table 15 below.

TABLE 15

Column group configuration table

| Column | Description |
| --- | --- |
| Column group name | The column group name. |
| Table name | The name of the table containing the column group. |
| Creator | The creator of the table. |
| Colgroupcolno | The column group column number. |
| Cthresh | The correlation threshold for the correlation statistic. |
| Vthresh1 | The volatility threshold of the cardinality of the column group. |
| Vconfthresh1 | The confidence of stability threshold of the cardinality of the column group. |
| Numofdatapoints1 | Number of historical values of the cardinality of the column group to use to determine the volatility. |
| Weightspolicy1 | The weights policy for the volatility of the cardinality of the column group. |
| Pthresh | The point skew threshold. |
| Vthresh2 | The volatility threshold for the point skew. |
| Vconfthresh2 | The confidence of stability threshold of the point skew. |
| Numofdatapoints2 | Number of historical values of the point skew to use to determine the volatility. |
| Weightspolicy2 | The weights policy for the volatility of the point skew for the column group. |
| Rthresh | The threshold for the range skew. |
| Vthresh3 | The volatility threshold for the range skew. |

TABLE 15-continued

Column group configuration table

| Column | Description |
| --- | --- |
| Vconfthresh3 | The confidence of stability threshold of the range skew. |
| Numofdatapoints3 | Number of historical values of the range skew to use to determine the volatility. |
| Weightspolicy3 | The weights policy for volatility of the range skew. |
| Vthresh4 | The volatility threshold for Hl2key. |
| Vconfthresh4 | The confidence of stability threshold of hl2key. |
| Numofdatapoints4 | Number of historical values of the hl2key to use to determine the volatility. |
| Weightspolicy4 | The weights policy for the volatility of hl2key. |
| Tthresh | A time threshold for updating the statistics of the column group. |
| Sizeofrskewset | The size of the range skew set to use. |

Although the column group configuration table 238 contains a time threshold Tthresh for updating the statistics associated with the column, in some embodiments, a separate time threshold is provided for each individual statistic such as the cardinality, point skew, range skew and hl2key of the column group. In some embodiments, when the column group configuration table 238 is created, predetermined default values are inserted into the column group configuration table 238.

The user can configure various parameters and thresholds of the data profiles. The user can also verify the stability of one or more statistics, such as the column cardinality of a column. In some embodiments, the user is provided with a graphical user interface to configure the various parameters and thresholds, and to verify the stability of the statistics.

Volatility of Statistics

The volatility of a statistic (VS) is determined based on the history of the statistic. In various embodiments, the volatility of a statistic is determined based on a trend analysis of the statistic. In some embodiments, the volatility is determined as follows:

Let $S_1, S_2, \ldots, S_n$ be the corresponding collected statistic values for a statistic S. In various embodiments, the collected statistic values are contained in the historical database 210 (FIG. 8). In some embodiments the values of one or more derived statistics, such as hl2key and skew, are contained in the profile database 72.

Let $T_1, T_2, \ldots, T_n$ be a series of times at which the statistic was collected. In various embodiments, the times are contained in a Statstime element in the historical database 210 (FIG. 8), or profile database 72.

Let $TC_1, TC_2, \ldots, TC_n$ be the corresponding table cardinality at $T_1, T_2, \ldots, T_n$ at the times the statistic S was collected. In various embodiments, the table cardinalities are contained in the table statistics history table 212 (FIG. 8) of the historical database 210 (FIG. 8). The number of data points n to use to determine volatility for the statistic S is retrieved from the Numofdatapoints column of the configuration table for the associated statistic of the profile database 72.

In various embodiments, the volatility V of a statistic S is determined as shown in relationship (1) below:

$$V = \sum_{i=1}^{n-1}\left(w_i \cdot \frac{|S_n - S_i|}{|TC_n - TC_i|} \cdot \frac{|S_n - S_i|}{S_i}\right) \quad (1)$$

where $w_i$ represents a weighting factor of the weighting policy satisfying:

$$\sum_{i=1}^{n-1} w_i = 1 \text{ and } w_i > 0 \quad (2)$$

For example, for a statistic $$S_i, V_i = \frac{|S_n - S_i|}{|TC_n - TC_i|} \cdot \frac{|S_n - S_i|}{S_i}$$

reflects the unweighted volatility of statistic $S_i$ for the range $[TC_{1-i}, TC_i]$.

In some embodiments, the weighting policy is uniformly weighted, that is, each $w_i$ is equal to $(1/(n-1))$. In other embodiments, the weighting policy is non-uniformly weighted. In some embodiments, the values of $w_i$ which closer to $w_n$, such as $w_{n-1}$, have greater values than those closer to $w_1$, such as $w_2$.

Determining the volatility is not meant to be limited to relationship (1) above. In other embodiments, other relationships may be used to determine the volatility.

The volatility status element, Vstatus, indicates whether a statistic is volatile or static. For example, Vstatus is determined to be volatile when the volatility of the statistic is greater than or equal to Vthresh. Vstatus is determined to be volatile when the volatility of the statistic is less than Vthresh. When the volatility of the statistic has not been determined, Vstatus is unknown.

In various embodiments, based on the value of the volatility status, Vstatus, different mechanisms are used to determine when to re-collect volatile and non-volatile statistics.

Staleness of Statistics

The staleness of statistics (SS) is an estimate of what fraction of a statistic has changed. The staleness is used to determine whether a volatile statistic will be recommended for recollection. At time $T_{n+1}$, the real-time table cardinality $TC_{n+1}$ is known. In some embodiments, since a collection object contains one table, and the table name is associated with the collection object name, the total number of rows in the collection object containing the table is retrieved from the total rows column of the table real-time statistics table 192 (FIG. 7) and used as the table cardinality $TC_{n+1}$. $TC_n$ and $S_n$ are the most recent values of the table cardinality and the statistic, respectively, from the historical table(s). In some embodiments, the value of the statistic $S_n$ is the most recent value of that statistic in the profile database 72 (FIG. 9). In some embodiments, the most recent historical value of Sn is computed from the most recent value of one or more historical statistics of the historical tables. In various embodiments, the staleness SS of the statistic $S_{n+1}$ at time $T_{n+1}$ is estimated as follows:

$$SS = \frac{S_{n+1} - S_n}{S_n} = \frac{\sqrt{V \cdot S_n \cdot (TC_{n+1} - TC_n)}}{S_n} \quad (3)$$

where V is the volatility of statistic S. The volatility V of the statistic S at time n is typically retrieved from the appropriate table in the profile database 72 (FIG. 9).

Figure 10:
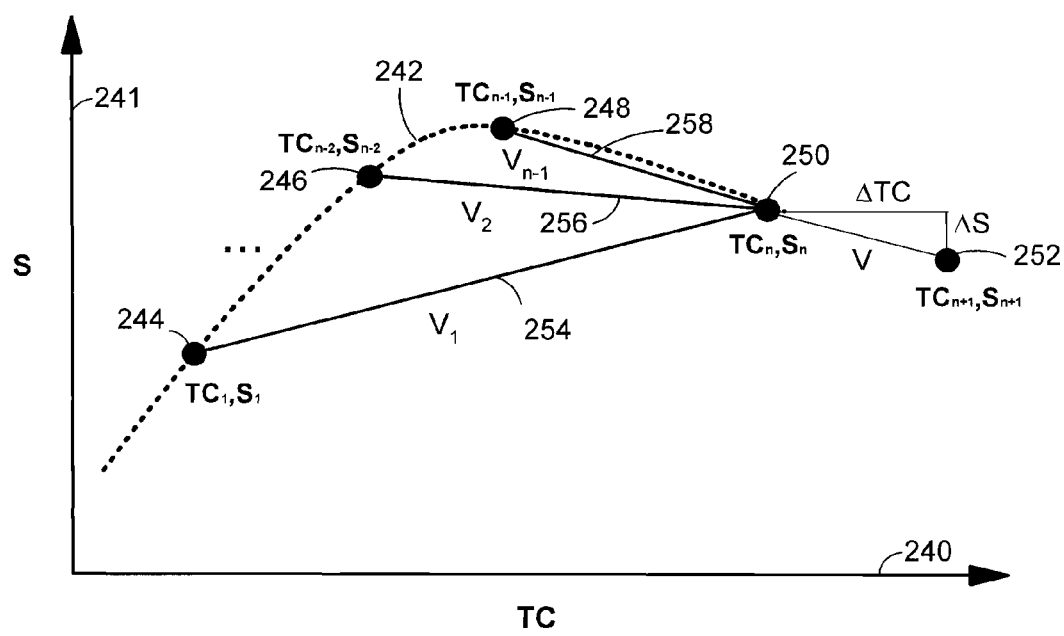
FIG. 10 depicts a graph illustrating the volatility of an exemplary statistic.

FIG. 10 depicts a graph illustrating the volatility of a statistic S. The x-axis 240 represents the table cardinality (TC). The y-axis 241 represents a statistic S. Various values of the table cardinality TC and the statistic S are illustrated at various points in time, time 1, 2, n−1, and n when the data profiles were updated. Dashed line 242 illustratively graphs the changing of statistic S and the table cardinality TC over time. Point 244 represents the value of the table cardinality $TC_1$ and statistic $S_1$ at a particular point in time, time 1 $T_1$. Point 246 represents the value of the table cardinality $TC_2$ and statistic $S_2$ at time 2 $T_2$. Point 248 represents the value of the table cardinality $TC_{n-1}$ and statistic $S_{n-1}$ at time n−1 $T_{n-1}$. Point 250 represents the value of the table cardinality $TC_n$ and statistic $S_n$ at time n $T_n$. Point 252 represents a next point in time, n+1 $T_{n+1}$, at which a value of statistic $S_{n+1}$ is estimated based on the table cardinality $TC_{n+1}$, the volatility V and the value of $S_n$. Relationship (3) above uses the estimated value $S_{n+1}$ to determine the staleness.

The unweighted volatility $V_1$, $V_2$ and $V_{n-1}$ between points 224, 246 and 248 and point 250, $TC_n$, $S_n$ is determined, at least in part, based on the slope as illustrated by lines 254, 256 and 258, respectively.

In FIG. 10, $$V_i = \frac{|S_n - S_i|}{|TC_n - TC_i|} \cdot \frac{|S_n - S_i|}{S_i}$$

represents the unweighted volatility for the range $[TC_{i-1}, TC_i]$. The factor, $$\frac{|S_n - S_i|}{|TC_n - TC_i|},$$

is the slope between the statistic S and the table cardinality TC at times n $T_n$ and i $T_i$. In various embodiments, the slope alone is not used to measure the volatility. At the same slope, the data having a smaller value of $S_i$ would appear to be more volatile than the data having a larger value of $S_i$. Therefore, in various embodiments, the volatility also comprises a normalization factor, $$\frac{|S_i|}{\,},$$

so that the volatility of the statistic $S_i$ at different points in time may be compared. In FIG. 10, the volatility at time n−1, $V_{n-1}$, captures the most local volatility, and $V_1$ captures the most global volatility. In various embodiments, the volatility V is a weighted average of the individual unweighted volatilities, $V_1, V_2, \ldots, V_{n-1}$.

Determining staleness is not meant to be limited to relationship (3) above. In other embodiments, other equations and relationships may be used to determine the staleness.

Confidence of Stability

When a statistic is volatile, as indicated by the volatility status, Vstatus, the staleness is also used to determine whether to re-collect that statistic, and in some embodiments, an associated statistic. When a statistic is nonvolatile, that is, the volatility status, Vstatus, is static or unknown, the decision to re-collect that statistic, and in some embodiments an associated statistic, is also based on the confidence of the stability (Vconf) of that statistic. In some embodiments, the confidence of the stability contains a value which ranges from zero to one. In various embodiments, one or more elements, such as user verification, unknown volatility status, table cardinality change ratio, elapsed timegrains and a stability ratio, are associated with the confidence of stability.

In another embodiment, the confidence of stability is associated with a multi-element vector, with each element describing an aspect affecting the confidence on the stability of statistics, such as:

Vconf < user_verification, unknown_vstatus,
tbcardchange_ratio, elapsed_timegrains, stability_ratio>

In this embodiment, the user verification (user_verification), unknown volatility status (unknown_vstatus), table cardinality change ratio (tbcardchange_ratio), elapsed timegrains (elapsed_timegrains) and a stability ratio (stability_ratio) are stored in the profile database for one or more statistics. In another embodiment, the value of one of the user verification, unknown volatility status, table cardinality change ratio, elapsed timegrains and stability ratio, is selected as the confidence of stability.

In response to a user verifying that a statistic is stable, the user verification user_verification contains a value of one. In various embodiments, if the user verification is equal to one, then the confidence of stability Vconf is set equal to one and recollection will not be recommended for the associated statistic.

If the user verification is not equal to one, then the volatility status, Vstatus, of the statistic is examined. If the volatility status, Vstatus, of the statistic is equal to "U" because it is unknown, the unknown_vstatus element is set equal to zero, and the confidence of stability, vconf, is set equal to zero. In this way, when the confidence of stability is set equal to zero, recollection will always be recommended.

If the volatility status is not unknown, a table cardinality change ratio tbcardchange_ratio (tcr) is determined as follows:

$$tcr = \frac{|TC_{n+1} - TC_n|}{TC_{n+1}}. \quad (4)$$

The value $TC_{n+1}$ is the table cardinality from the real-time statistics. $TC_n$ is the most recent value of the historical table cardinality. If the table cardinality change ratio tcr is greater than or equal to a table cardinality change threshold, Tcthresh, for the statistic, the confidence of stability is set equal to the table cardinality change ratio, and recollection will be recommended.

The elapsed timegrains, that is, elapsed_timegrains (tg), refers to an amount of time, in time grain units, that has elapsed since an associated statistic was collected. If the table cardinality ratio is less than the table cardinality change threshold, the elapsed_timegrains (tg) is determined as follows:

$$tg = \frac{|T_{n+1} - T_n|}{T_{unit}}. \quad (5)$$

$T_{n+1}$ refers to the current time. $T_n$ refers to the time at which the associated statistic was collected, such as Statstime. The time unit, Tunit, is the specified time unit. If the elapsed timegrains, tg, is greater than or equal to the time threshold, Tthresh, the confidence of stability Vconf is set equal to the elapsed timegrains, and recollection will be recommended.

If the elapsed timegrains, tg, is less than the time threshold, Tthresh, the stability ratio, stability_ratio (sr), is determined.

The stability ratio, sr, measures the stability of a statistic and is determined as follows. Suppose, at time $T_n$, the volatility status, Vstatus, is equal to "S" for static and the time that the volatility status changed, Vchangetime, is equal to $T_i$. In other words, at time $T_n$ the table cardinality is $TC_n$; the most recent change in the volatility status, Vstatus, occurred at time $T_i$; and $TC_i$ represents the table cardinality at time $T_i$. Hence, the stability ratio sr is determined as follows in accordance with relationship (6):

$$sr = \frac{|Tc_n - TC_i|}{|TC_n - TC_1|}. \quad (6)$$

If $$r = \frac{|TC_{n+1} - TC_i|}{|TC_{n+1} TC_n|}$$

is greater than or equal to the stability ratio sr, recollection will be recommended.

The stability ratio above was determined with respect to the table cardinality statistic, TC. In other embodiments, the stability ratio is determined with respect to a statistic S as follows:

$$sr = \frac{|S_n - S_i|}{|S_n - S_l|} \quad (7)$$

In various embodiments, the user can supply information indicating that a statistic is stable. If the user indicates that a statistic is stable, in some embodiments, 100% confidence is assumed and the confidence of stability for that statistic is set equal to one, to represent 100%. In various embodiments, when the confidence of stability is equal to 100%, recollection will not be recommended for that statistic.

Correlation

A Correlation Factor (CF) provides a quantified measure of a degree of correlation of a column group. In various embodiments, to determine the correlation factor, CF, the number of columns in a multi-column group is represented by n, where n>1. The cardinality of the column group is represented by MC. The column cardinality of the individual columns of the column group is represented by $CC_1, CC_2, \ldots, CC_n$. The correlation factor is determined in accordance with relationship (8) as follows:

$$CF = 1 - \frac{MC - \max(CC_1, CC_2, \ldots, CC_n)}{\prod_{i=1}^{n} CC_i - \max(CC_1, CC_2, \ldots, CC_n)} \quad (8)$$

where $\max(CC_1, CC_2, \ldots, CC_n)$ represents the lower bound of the cardinality of the column group and $$\prod_{i=1}^{n} CC_i$$

represents the upper bound of the cardinality of the column group. Therefore, the correlation factor CF is in a normalized form.

The correlation status, cstatus, is set equal to "Y" when the correlation factor (CF) is greater than or equal to the correlation threshold, cthresh. The correlation status, cstatus, is set equal to "N" when the correlation factor (CF) is less than the correlation threshold, cthresh. The correlation status, cstatus, is unknown when the correlation factor has not yet been determined, or if the correlation threshold, cthresh, has not been set.

Point Skew

The point skew, Ps or PS, provides a measure of the degree of skew of a value of a column or column group. The determination of the point skew for a single column will now be described. The frequency of the $i^{th}$ value of a column is represented by $F_i$, the column cardinality of that column is represented by CC, and the number of collected frequency statistics records in that column is represented by n. Therefore, there are n frequencies, $F_1, F_2, \ldots, F_n$. The point skew for the $i^{th}$ value is determined in accordance with relationship (9) as follows:

$$PS_i = \frac{Fi}{\frac{1}{CC}} \quad (9)$$

The determination of the point skew for a column group will now be described. The frequency of the $i^{th}$ value of the multi-column is represented by $F_i$. The column cardinality of that column group is represented by MC. The number of collected frequency statistics records for that column group is represented by n. Therefore, there are n frequencies, $F_1, F_2, \ldots, F_n$. The point skew, $PS_i$, for the $i^{th}$ value of the column group is determined in accordance with relationship (10) as follows:

$$PS_i = \frac{Fi}{\frac{1}{MC}} \quad (10)$$

The point skew status, Pstatus, indicates whether a column or column group is point skewed. The point skew status, Pstatus, is set equal to "Y", if there exists a value i of the column, or column group, such that the point skew for the value $PS_i$ is greater than or equal to the point skew threshold, Psthesh. The point skew status is set to "N", if for each value i of the column or column group, the point skew $PS_i$ is less than the point skew threshold, Psthesh. The point skew status, Pstatus, is set to "U", which indicates unknown if the point skew has not been determined.

Range Skew

The range skew, Rs or RS, is a statistic that indicates whether a range of values is skewed. The determination of the range skew for a single column will now be described. Suppose that the column value space of a single column, which ranges from low2key to high2key, is divided into n ranges and that $B_0, B_2, \ldots, B_n$ are the boundaries of the n ranges. A frequency f is collected for m column values. The m column values are represented by $cv_1, cv_2, \ldots, cv_m$, and the respective frequencies are represented by $f_1, f_2, \ldots, f_m$.

For the $i^{th}$ range, $[B_i, B_{i+1}]$, $cv'_1, cv'_2, \ldots, cv'_h$ represent the column values satisfying $B_i \leq cv'_j < B_{i+1}$, and $f'_1, f'_2, \ldots, f'_h$ represent the corresponding frequencies of the values in the $i^{th}$ range.

The range frequency of the $i^{th}$ value, $RF_i$, is equal to the sum of the frequency f of all column values located in the $i^{th}$ range. The range frequency for the $i^{th}$ range, $RF_i$ is determined in accordance with relationship (11) as follows:

$$RF_i = \left[\sum_{j=1}^{h} f'_j\right] + \left[\frac{\left(1 - \sum_{k=1}^{m} f_k\right)}{n}\right] \quad (11)$$

The range skew for the $i^{th}$ range $RS_i$ is determined in accordance with relationship (12) as follows:

$$RS_i = \frac{RF_i}{\frac{1}{n}} \quad (12)$$

The range skew status, Rstatus, is set to "Y" if there exists for a value of i a value of $RS_i$ greater than or equal to Rsthesh. The range skew status, Rstatus, is set to "N" if each value of $RS_i$ is less than Rsthesh. The range skew status, Rstatus, is set to "U", indicating unknown, if the range skew has not been determined, or if a range skew threshold has not been provided.

A workload typically comprises a plurality of queries. The queries reference one or more database objects such as tables, columns, indexes and column groups.

Figures 11, 11A:
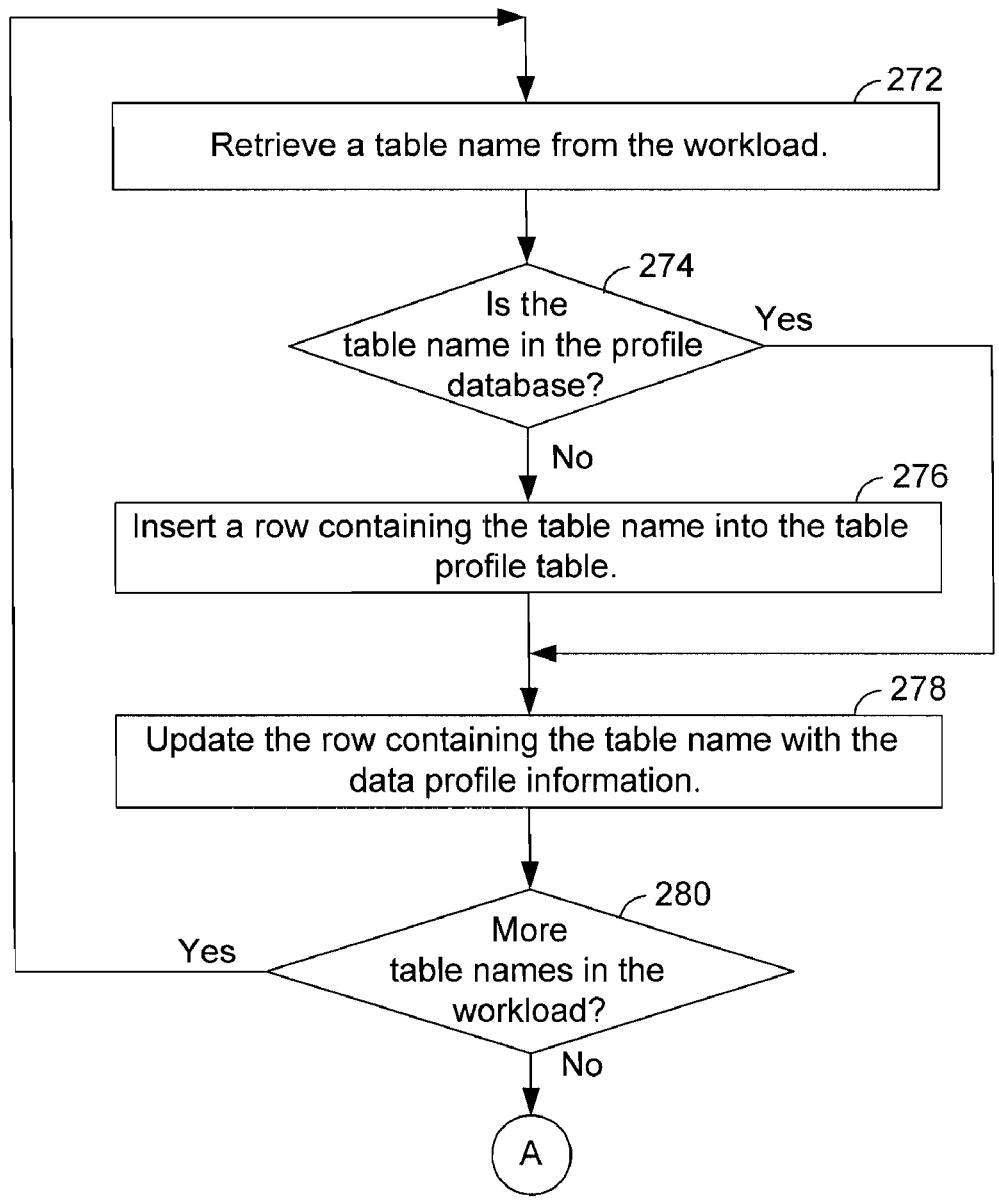
FIG. 11 comprises FIGS. 11A, 11B, 11C and 11D which collectively depict a flowchart an embodiment of the updating of the profile database of FIG. 5.

FIG. 11 comprises FIGS. 11A, 11B, 11C and 11D which collectively depict a flowchart of an embodiment of the updating of the profile database of FIG. 5. When two or more workloads are registered, the flowchart of FIG. 11 is performed for the database objects referenced by the queries of each workload.

In step 272, a table name is retrieved from the workload. The workload is associated with a workload identifier. The consolidated statistics repository associates the tables, indexes, columns and column groups referenced by a workload with a workload identifier. Various embodiments of a consolidated statistics repository are described in U.S. Patent Application titled "Query Workload Statistics Collection in a Database Management System," application Ser. No. 10/824, 856. In various embodiments, a table name is retrieved from the consolidated statistics repository based on the workload identifier. In some embodiments, step 272 also retrieves a creator of the table. Step 274 determines whether the table name is in the profile database. In particular, step 274 determines whether the table name is in the table profile table 224

(FIG. 9). Alternately, a table object is identified by the table name and creator, and step 274, determines whether the table name and creator are in a row of the table profile table.

In response to step 274 determining that the table name, or alternately, the table name and creator, is not in the profile database, in step 276, a row containing the table name is inserted into the table profile table. In step 278, the row containing the table name, or alternately, the table name and creator, is updated with the data profile information. The updating of the data profile information for a table will be described in further detail below with reference to FIG. 12.

Step 280 determines whether there are more table names, or alternately, table name and creator combinations, in the workload. If so, step 280 proceeds to step 272. If step 274 determines that the table name is not in the profile database, step 274 proceeds to step 278 to update the profile information in the row. If step 280 determines that there are no more additional table names in the workload, or alternately, table name and creator combinations, step 280 proceeds via Continuator A to step 282 of FIG. 11B.

In various embodiments, the combination of a table name and the table's creator is used to identify a table.

In another embodiment, if step 274 determines that the table name is in the table profile table of the profile database, step 274 proceeds to step 276 to insert another row into the table profile table of the profile database. In this embodiment, the volatility status time, Vstatstime, is also used to identify the row. Alternately, step 274 is omitted and a row is inserted into the table profile table each time the volatility is updated and the table name in combination with Vstatstime is used to identify the row. In another embodiment, steps 276 and 278 are combined.

Figure 11B:
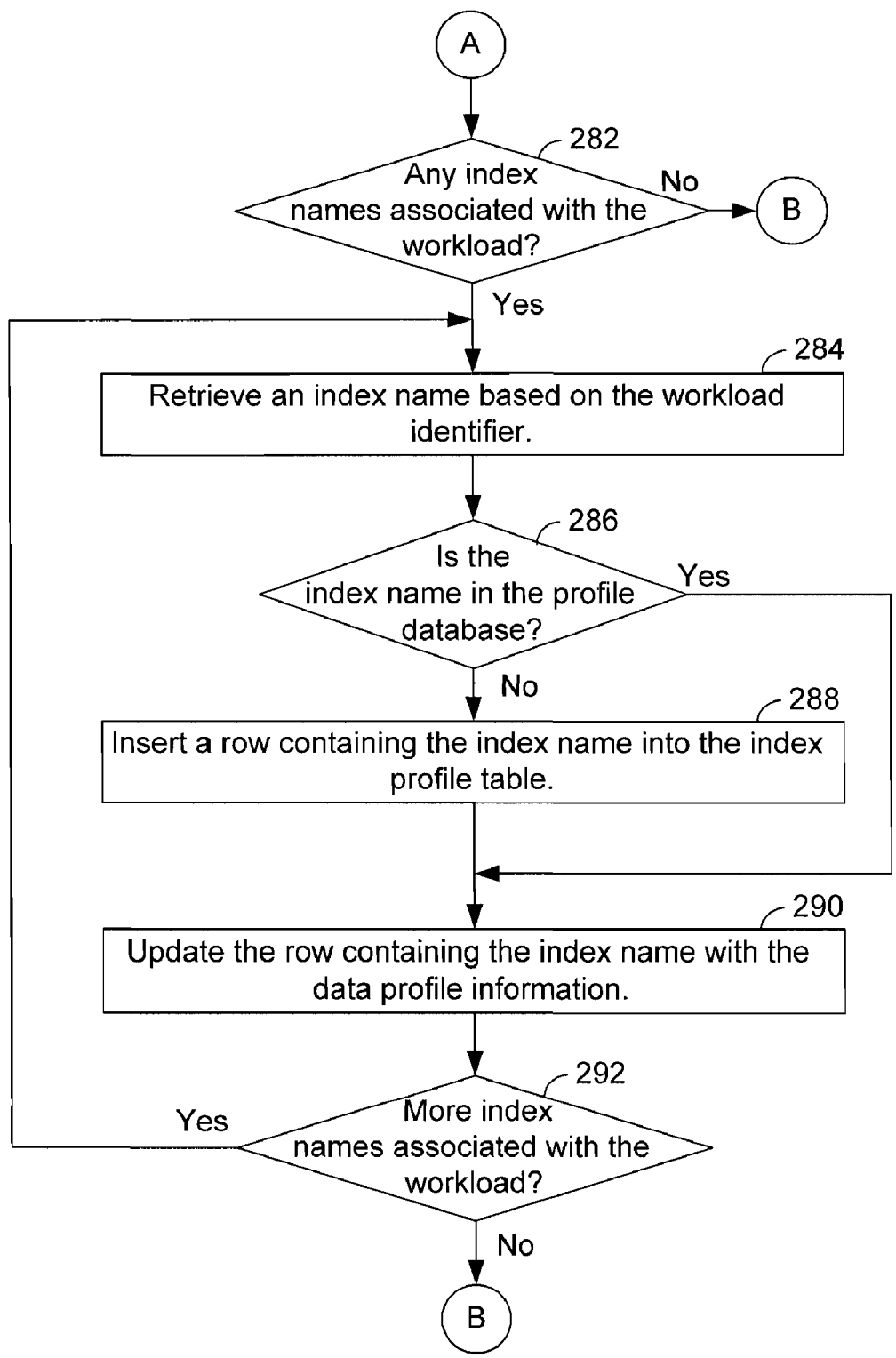

Step 282 of FIG. 11B determines whether there are any index names associated with the workload. If so, in step 284, the index name is retrieved based on the workload identifier. In various embodiments, an index name is retrieved from the consolidated statistics repository based on the workload identifier. In some embodiments, the combination of an index name, creator of the index and table name associated with the index is used to identify an index. Step 286 determines whether the index name is in the profile database. In various embodiments, step 286 determines whether the index name is in the index profile table. If not, in step 288, a row containing the index name is inserted into the index profile table. In step 290, the row containing the index name is updated with data profile information. The updating of the data profile information will be explained in further detail below with reference to FIG. 13. Step 292 determines whether there are more index names in the workload. If so, step 292 proceeds to step 294 to process another index name.

Figure 11C:
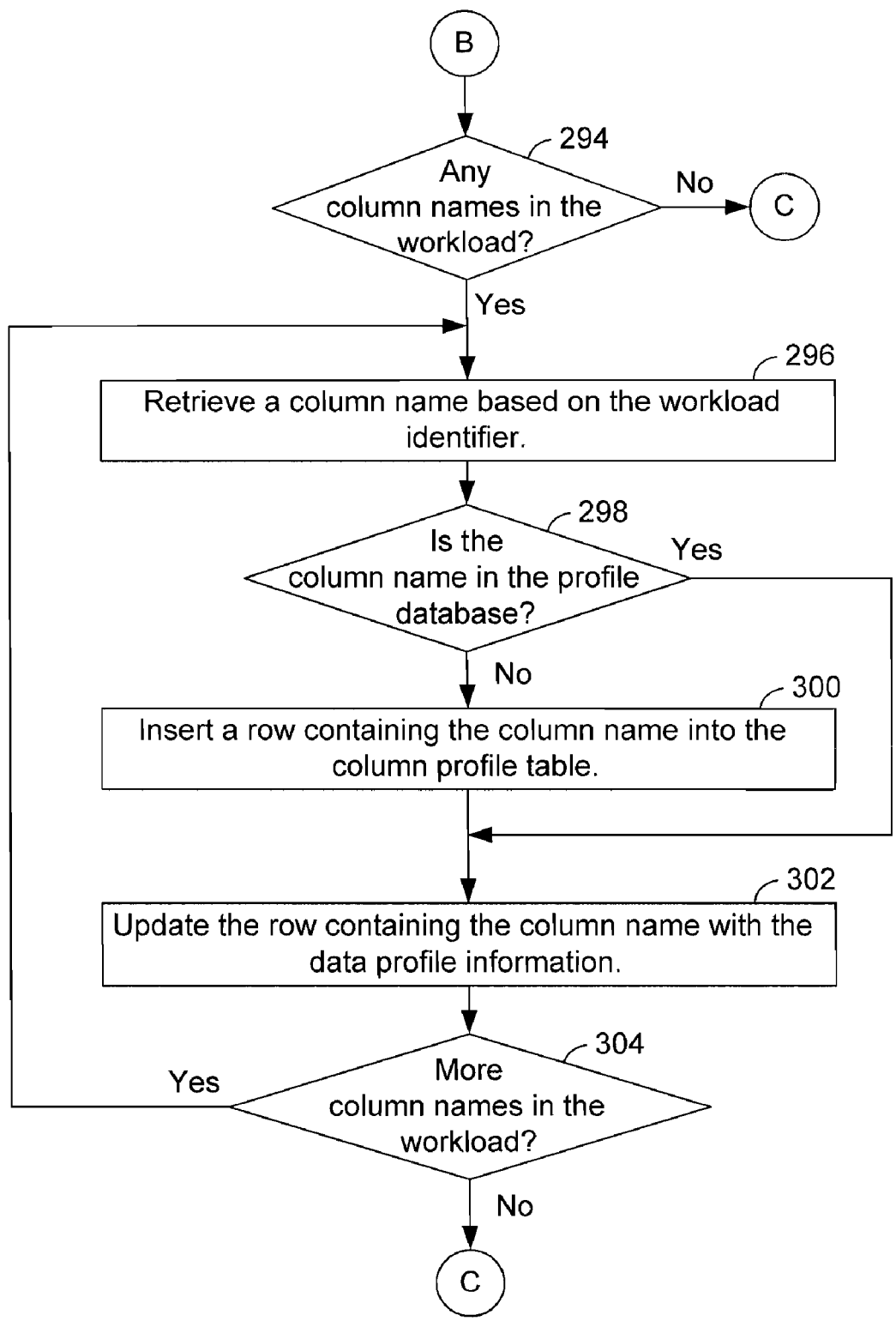

If step 292 determines that there are no more index names associated with the workload to process, step 292 proceeds via Continuator B to step 294 of FIG. 11C. If step 282, determines that there are no index names in the workload, step 282 proceeds via Continuator B to step 294 of FIG. 11C.

If step 286 determines that the index name is in the profile database, step 286 proceeds to step 290.

In another embodiment, step 286 is omitted and a row is inserted into the index profile table each time the volatility is updated and Vstatstime is also used to identify the row. In some embodiments, steps 228 and 290 are combined.

Step 294 of FIG. 11C determines if there are any column names in the workload. In various embodiments, step 294 accesses the consolidated statistics repository based on the workload identifier to determine if there are any column names in the workload. If so, in step 296, the column name is retrieved based on the workload identifier. In various embodiments, a column name is retrieved from the consolidated statistics repository based on the workload identifier. Step 298 determines whether the column name is in the profile database. In various embodiments, step 298 determines whether the column name is in the column profile table. If not, in step 300, a row containing the column name is inserted into the column profile table. In step 302, the row containing the column name is updated with the data profile information. The updating of the data profile information for a column will be described in further detail below with reference to FIG. 14.

If step 298 determines that the column name is in the profile database, step 298 proceeds to step 302.

Step 304 determines whether there are more column names in the workload. If step 304 determines that there are no more column names to process in the workload, step 304 proceeds via Continuator C to step 306 of FIG. 11D.

In another embodiment, step 298 is omitted and a row is inserted into the column profile table each time the volatility is updated and Vstatstime is used to identify the row. In some embodiments, steps 300 and 302 are combined.

In various embodiments, the table name associated with the column is also used to identify the column. In some embodiments, a combination of the creator, table name and column name is used to identify the column. Step 296 retrieves a column name and its associated table name from the consolidated statistics repository based on the workload identifier. Step 298 determines if the column and table name is in the profile database, and step 300 insets a row containing the column and table names in the column profile table. Step 302 updates the row containing the column and table names with the data profile information.

Figure 11D:
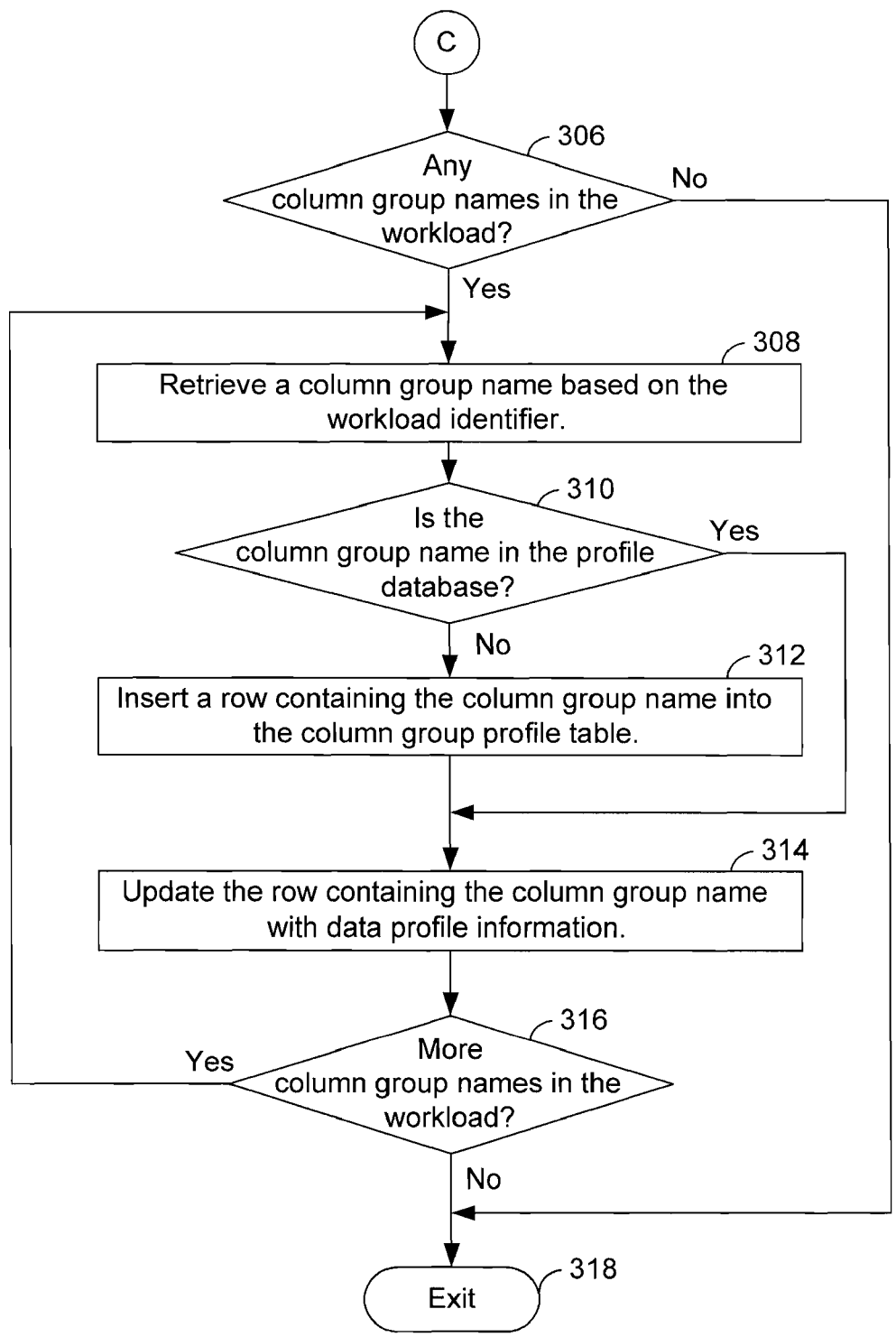

Step 306 of FIG. 11D determines whether there are any column group names in the workload. In various embodiments, step 306 accesses the consolidated statistics repository based on the workload identifier to determine if there are any column group names in the workload. If step 306 determines that at least one column group name is in the workload, in step 308, the column group name is retrieved based on the workload identifier. In various embodiments, a column group name is retrieved from the consolidated statistics repository based on the workload identifier. Step 310 determines whether the column group name is in the profile database. In some embodiments, step 310 determines whether the column group name is in the column profile table. If step 310 determine that the column group name is in the profile database, in step 312, a row is containing the column group name is inserted into the column group profile table. In step 314, the row containing the column group name is updated with the data profile information. The updating of the data profile information will be described below with reference to FIG. 15. Step 316 determines whether there are more column group names to process in the workload. If step 316 determines that there are more column group names to process in the workload, step 316 proceeds to step 308. If step 316 determines that there are no more column group names to process in the workload, in step 318, the flowchart exits.

If step 306 determines that there are no column group names to process in the workload, step 306 proceeds to step 318 to exit. If step 310 determines that the column group name is not in the profile database, step 310 proceeds to step 314.

In another embodiment, step 310 is omitted and a row is inserted into the column group profile table each time the volatility is updated and Vstatstime is also used to identify the row. In various embodiments, a combination of the creator, table name and column group name is used to identify a column group. In some embodiments, steps 312 and 314 are combined.

Figure 12:
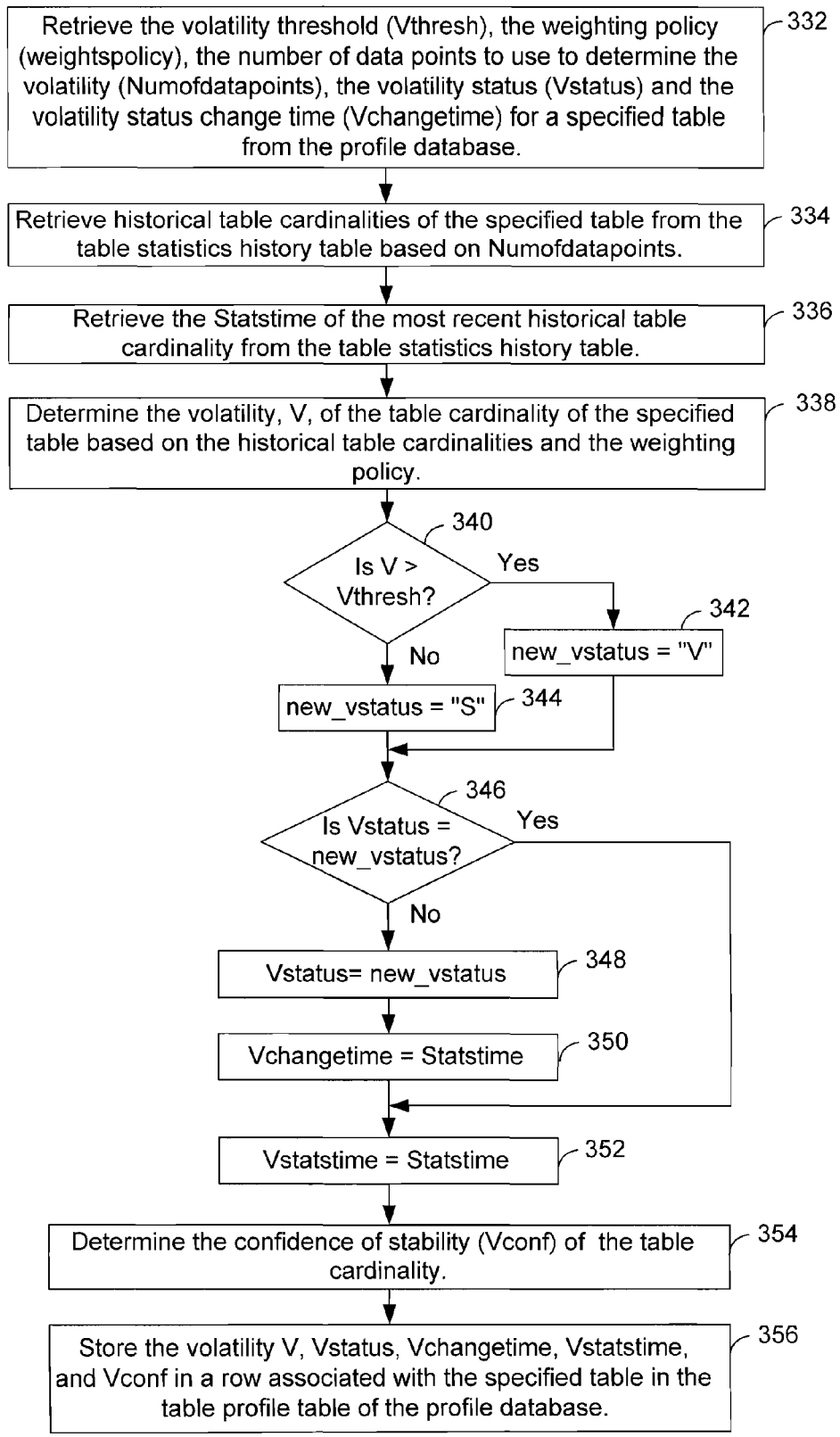
FIG. 12 depicts a flowchart of an embodiment of updating the table profile table of the profile database of FIG. 9.

FIG. 12 depicts a flowchart of an embodiment of step 278 of FIG. 11A of updating the data profile information for a specified table in the table profile table 224 (FIG. 9). In step 332, the volatility threshold (Vthresh), the weighting policy (Weightspolicy), number of data points to use to determine the volatility (Numofdatapoints), the volatility status (Vstatus) and the volatility status change time (Vchangetime) for a specified table are retrieved from the profile database. In some embodiments, the volatility threshold, the weighting policy, and number of data points for the specified table are retrieved from the table configuration table 232 (FIG. 9). If the specified table name is not in the table configuration table 232 (FIG. 9), default values are retrieved from the table configuration table 232 (FIG. 9). In some embodiments, the volatility status, Vstatus, and the volatility status change time, Vchangetime, of the specified table are retrieved from the table profile table 232 (FIG. 9).

In some embodiments, the weighting policy is causes an array w to be initialized such that each value $w_i$ of the array is a weighting factor as described above with reference to relationship (2). For example, if the Weightspolicy is equal to one, the weighting factors will be equal to 1/(Numofdatapoints-1).

In step 334, historical table cardinalities for the specified table are retrieved from the table statistics history table 212 (FIG. 8). In various embodiments, the number of historical table cardinalities, n, which are retrieved from the table statistics history table 212 (FIG. 8) is equal to the number of data points, Numofdatapoints. Typically the most recent historical table cardinalities are retrieved based on Statstime.

In step 336, the Statstime of the most recent historical table cardinality is retrieved from the table statistics history table.

In step 338, the volatility V of the table cardinality of the specified table is determined based on the historical table cardinalities and the weighting policy. In various embodiments, the volatility V is determined as described above with reference to relationship (1). The historical table cardinalities are $TC_1 \ldots TC_n$, where $TC_n$ is the most recent historical table cardinality and $TC_1$ is the oldest table cardinality of the n historical table cardinalities based on the associated value of the volatility status time, Vstatstime, of the table cardinalities. For a table, the collected statistics values $S_1, S_2, \ldots, S_n$ are the one or more historical table cardinalities, $TC_1, \ldots, TC_n$, associated with the volatility status time, Vstatstime, $T_1, T_2, \ldots, T_n$, respectively. The retrieved weighting policy for each statistic value i is contained in an array w.

Step 340 determines whether the volatility V is greater than or equal to the volatility threshold, Vthresh. If step 340 determines that the volatility V is greater than the volatility threshold, Vthresh, in step 342, a variable called new_vstatus is set equal to "V" for volatile, and step 342 proceeds to step 346. If step 340 determines that the volatility V is not greater than the volatility threshold, Vthresh, in step 344, new_vstatus is set equal to "S" for static.

Step 346 determines whether the volatility status, Vstatus, is equal to new_vstatus. If not, in step 348, Vstatus is set equal to new_vstatus. In step 350, the volatility status change time, Vchangetime, is set equal to the value of Statstime associated with the most recent historical table cardinality. In step 352, the volatility status time, Vstatstime, is set equal to the value of Statstime associated with the most recent historical table cardinality.

If step 346 determines that the volatility status, Vstatus, is equal to new_vstatus, step 346 proceeds to step 352.

In step 354, the confidence of stability (Vconf) of the table cardinality is determined as described above.

In step 356, the volatility V, volatility status Vstatus, volatility change time Vchangetime, volatility status time Vstatstime and confidence of stability Vconf are stored in the row containing the specified table name in the V column, Vstatus column, Vchangetime column, Vstatstime column and Vconf column, respectively, of the table profile table 224 (FIG. 9).

In some embodiments, the weighting policy is not used, and steps 334 and 338 omit the weighting policy.

Figure 13:
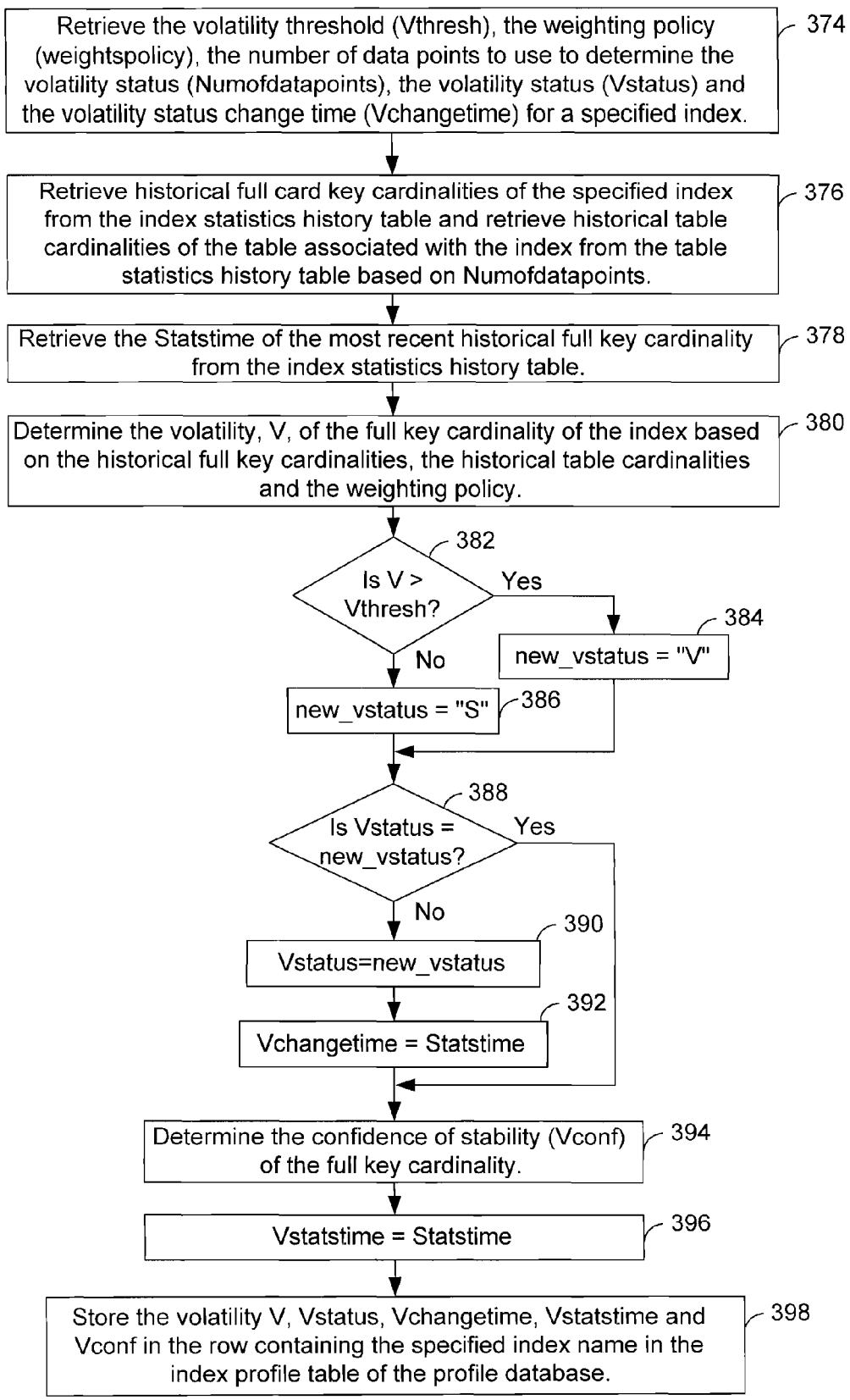
FIG. 13 depicts a flowchart of an embodiment of updating the index profile table of the profile database of FIG. 9.

FIG. 13 depicts a flowchart of an embodiment of step 290 of FIG. 11B of updating the data profile information in the index profile table 226 (FIG. 9). In step 374, the volatility threshold (Vthresh), the weighting policy (Weightspolicy), the number of data points to use to determine the volatility (Numofdatapoints), the volatility status (Vstatus) and the volatility status change time (Vchangetime) for a specified index are retrieved. The volatility threshold, Vthresh, of the full key cardinality, the weighting policy (Weightspolicy) and the number of data points (Numofdatapoints) are retrieved from the index configuration table 234 (FIG. 9). If the specified index name is not in the index configuration table 234 (FIG. 9), default values of the volatility threshold (Vthresh), the weighting policy (Weightspolicy) and the number of data points (Numofdatapoints) are retrieved from the index configuration table 234 (FIG. 9). The weighting policy is used to determine the weighting factors as described above with reference to FIG. 12. The volatility status, Vstatus, and the volatility status change time, Vchangetime, for the specified index are retrieved from the index profile table 226 (FIG. 9).

In step 376, historical statistics of the full key cardinality of the specified index are retrieved from the index statistics history table 214 (FIG. 8), and historical statistics of the table cardinality of the table associated with the index are retrieved from the table statistics history table 212 (FIG. 8). In various embodiments, the number of historical full key cardinalities, n, which are retrieved from the index statistics history table 214 (FIG. 8) is equal to Numofdatapoints, and the number of historical table cardinalities, n, which are retrieved from the table statistics history table 212 (FIG. 8) is equal to Numofdatapoints.

In step 378, the Statstime associated with the most recent historical full key cardinality of the index is retrieved from the index statistics history table.

In step 380, the volatility of the full key cardinality, V, of the index is determined based on the historical full key cardinalities, the historical table cardinalities and the weighting policy. Step 382 determines whether the volatility V of the full key cardinality is greater than the volatility threshold, Vthresh. If so, in step 384, new_vstatus is set equal to "V" for volatile; otherwise, in step 386, new_vstatus is set equal to "S" for static. Step 388 determines whether the volatility status, Vstatus, is equal to new_vstatus. If not, in step 390, the volatility status, Vstatus, is set equal to new_vstatus. In step 392, the volatility change time, Vchangetime, is set equal to Statstime. In step 394, the confidence of stability, Vconf, of the full key cardinality of the index is determined.

If step 388 determines that the volatility status, Vstatus, is not equal to new_vstatus, step 388 proceeds to step 394.

In step 396, the volatility status time, Vstatstime, is set equal to Statstime. In step 398, the volatility V, Vstatus, Vchangetime, Vstatstime and Vconf are stored in the row containing the specified index name in the index profile table 226 (FIG. 9) of the profile database 72 (FIG. 9).

Figure 14A:
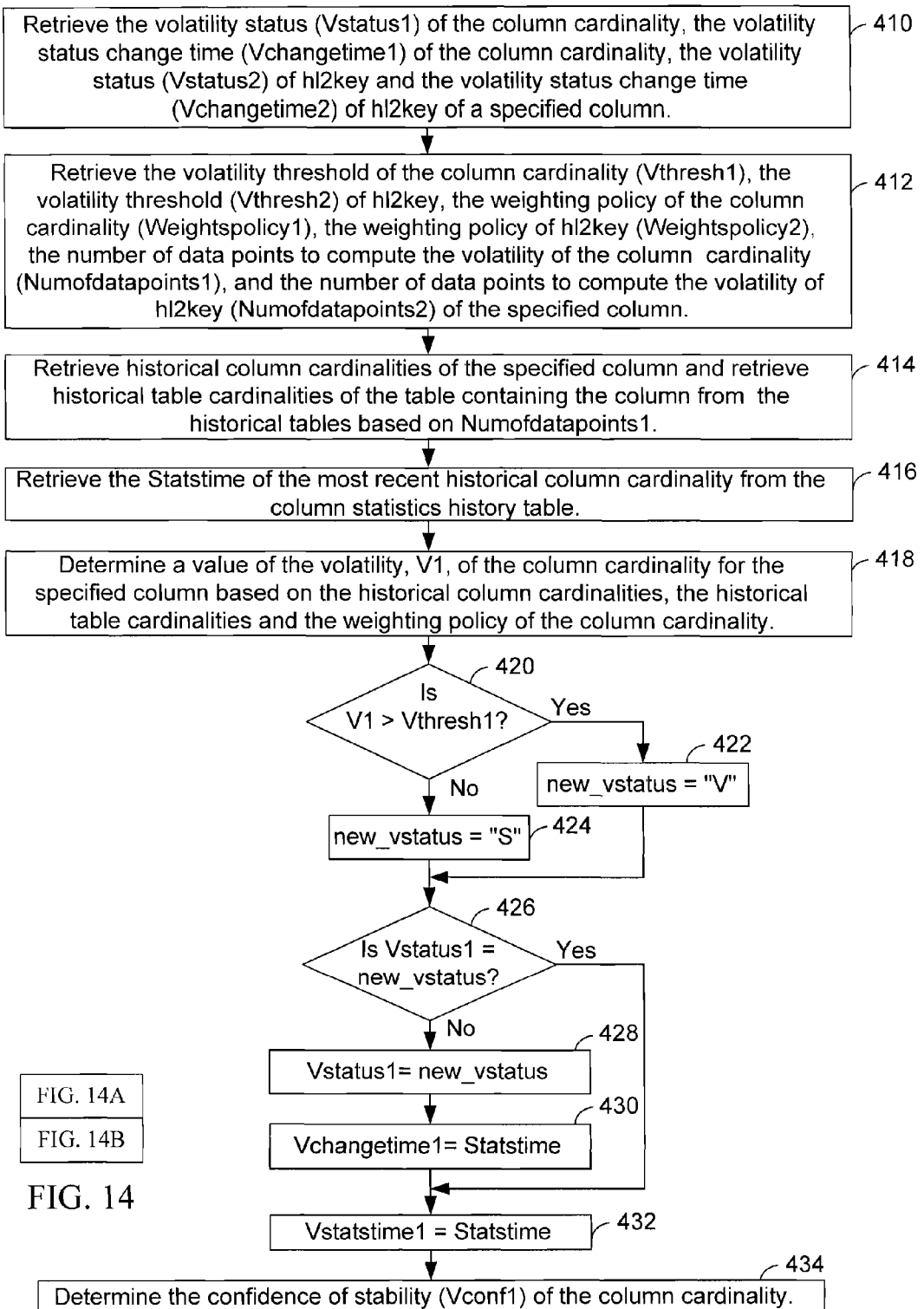
FIG. 14 comprises FIGS. 14A and 14B which collectively depict a flowchart of an embodiment of updating the column profile table of the profile database of FIG. 9.
Figure 14B:
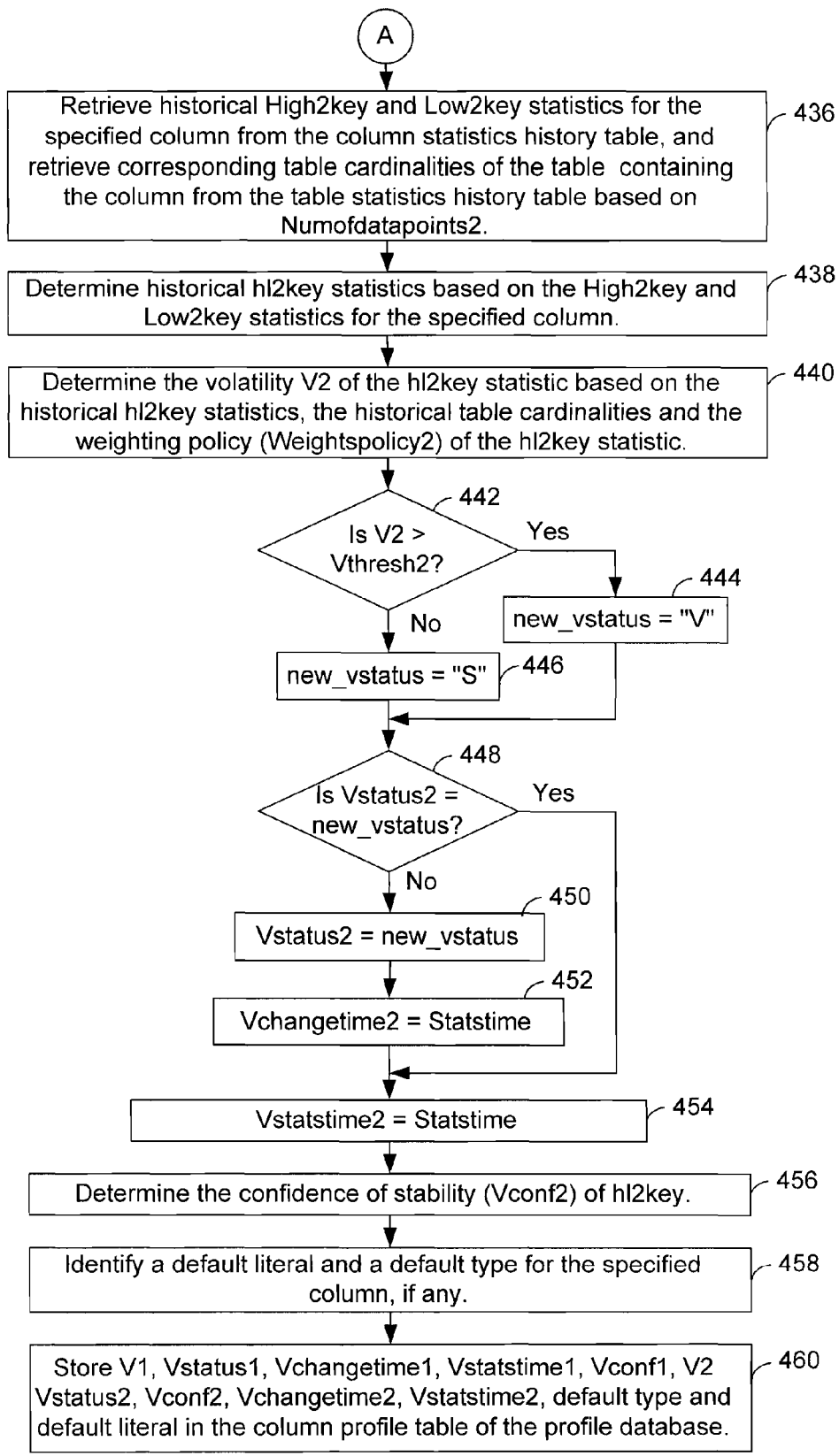

FIG. 14 comprises FIGS. 14A and 14B which collectively depict a flowchart of an embodiment of updating the data profile information in the column profile table 228 (FIG. 9).

The data profile of a column comprises volatility data for one or more statistics associated with the column. In various embodiments, the statistics associated with the column comprise the column cardinality and hl2key statistics. However, in other embodiments, other statistics may be stored in the data profile of the column.

In step 410, the volatility status, Vstatus1, of the column cardinality and the volatility status, Vstatus2, of hl2key of the specified column are retrieved from the column profile table.

In step 412, the volatility threshold of the column cardinality (Vthresh1), the volatility threshold of hl2key (Vthresh2), the weighting policy of the column cardinality (Weightspolicy1), the weighting policy of hl2key (Weightspolicy2), number of data points to compute the volatility of the column cardinality (Numdatapoints1) and the number of data points to compute the volatility of hl2key (Numofdatapoints2) are retrieved for the specified column from the column configuration table 236 (FIG. 9).

In step 414, historical column cardinalities for the specified column are retrieved from the column statistics history table and historical table cardinalities of the table containing the column are retrieved from the table statistics history table based on Numofdatapoints1. In various embodiments, the number of historical column cardinalities that are retrieved is equal to Numofdatapoints1 and the number of historical table cardinalities that are retrieved is also equal to Numofdatapoints1. The most recent historical column cardinalities and historical table cardinalities are typically retrieved.

In step 416, the Statstime of the most recent historical column cardinality is retrieved from the column statistics history table.

In step 418, a value of the volatility, V1, of the column cardinality of the specified column is determined based on the historical column cardinalities, the historical table cardinalities and the weighting policy of the column cardinality. Step 420 determines whether the volatility of the column cardinality, V1, is greater than the volatility threshold, Vthresh1, of the column cardinality for the column. If so, in step 422, new_vstatus is set equal to "V", indicating that the column cardinality statistic is volatile. If not, in step 424, new_status is set equal to "S," indicating that the column cardinality statistic is static.

Step 426 determines whether the volatility status of the column cardinality, Vstatus1, is equal to new_vstatus. If not, in step 428, the volatility status of the column cardinality, Vstatus1, is set equal to new_vstatus. In step 430, the time that the volatility status changed, Vchangetime1, is set equal to Statstime. In step 432, the time that the volatility of the column cardinality was determined, that is, the volatility status time, Vstatstime1, is set equal to Statstime.

If step 426 determines whether the volatility status of the column cardinality, Vstatus1, is equal to new_vstatus, step 426 proceeds to step 432. In step 434, the confidence of stability (Vconf1) of the column cardinality is determined. Step 434 proceeds via Continuator A to step 436 of FIG. 14B.

In step 436, historical High2key and Low2key statistics for the specified column are retrieved from the column statistics history table 216 (FIG. 8) based on Numofdatapoints2, and historical table cardinalities of the table containing the column are retrieved from the table statistics history table 212 (FIG. 8) based on Numofdatapoints2. A number of most recent historical High2key and Low2key statistics equal Numofdatapoints2 are retrieved; and a number of most recent historical table cardinalities equal to Numofdatapoints2 are also retrieved. In step 438, historical hl2key statistics for the specified column are determined based on the one or more historical High2key and Low2key statistics.

In step 440, the volatility, V2, of the hl2key statistic is determined based on the historical hl2key statistics, the historical table cardinalities and the weighting policy (Weightspolicy2) of the hl2key statistic.

Step 442 determines whether the volatility, V2, of the hl2key statistic is greater than the volatility threshold, Vthresh2, for the hl2key statistic. If so, in step 444, new_vstatus is set equal to "V", to indicate that the hl2key statistic is volatile. If not, in step 446, new_vstatus is set equal to "S", to indicate that the hl2key statistic is static.

Step 448 determines whether the volatility status of hl2key, Vstatus2, is equal to new_vstatus. If not, in step 450, volatility status of hl2key, Vstatus2, is set equal to new_vstatus. In step 452, the change time of the volatility status of hl2key, Vchangetime2, is set equal to Statstime, and step 452 proceeds to step 454. If step 448 determines that the volatility status of hl2key, Vstatus2, is equal to new_vstatus, step 448 proceeds to step 454.

In step 454, the time that the volatility of hl2key was determined, that is the volatility status time, Vstatstime2, is set equal to Statstime. In step 456, the confidence of stability (Vconf2) of hl2key is determined.

Step 458 identifies a default literal and a default type for the specified column, if any. In step 460, V1, Vstatus1, Vchangetime1, Vstatstime1, Vconf1, V2, Vstatus2, Vconf2, Vchangetime2, Vstatstime2, default type and default literal are stored in the V1 column, Vstatus1 column, Vchangetime1 column, Vstatstime1 column, Vconf1 column, V2 column, Vstatus2 column, Vconf2 column, Vchangetime2 column, Vstatstime2 column, default type column and default literal column of the column profile table 228 (FIG. 9) of the profile database.

FIG. 15 comprises FIGS. 15A, 15B, 15C, 15D, 15E, 15F and 15G which collectively depict a flowchart of an embodiment of updating the data profile information in the column group profile table for a specified column group. In various embodiments, the flowchart of FIG. 15 implements step 314 of FIG. 11D in which a row containing a specified column group is updated with data profile information. In some embodiments, a column group is specified by a column group name and a table name. In other embodiments, a column group is specified by a column group name, a table name, a table creator and a column group column number. In various embodiments, the data profile for the column group comprises at least one or any combination of the correlation data, the volatility of the cardinality of the column group, a point skew statistic, a volatility of the point skew statistic of the column group, a range skew statisic and a volatility of the range skew statistic of the column group.

Figure 15A:
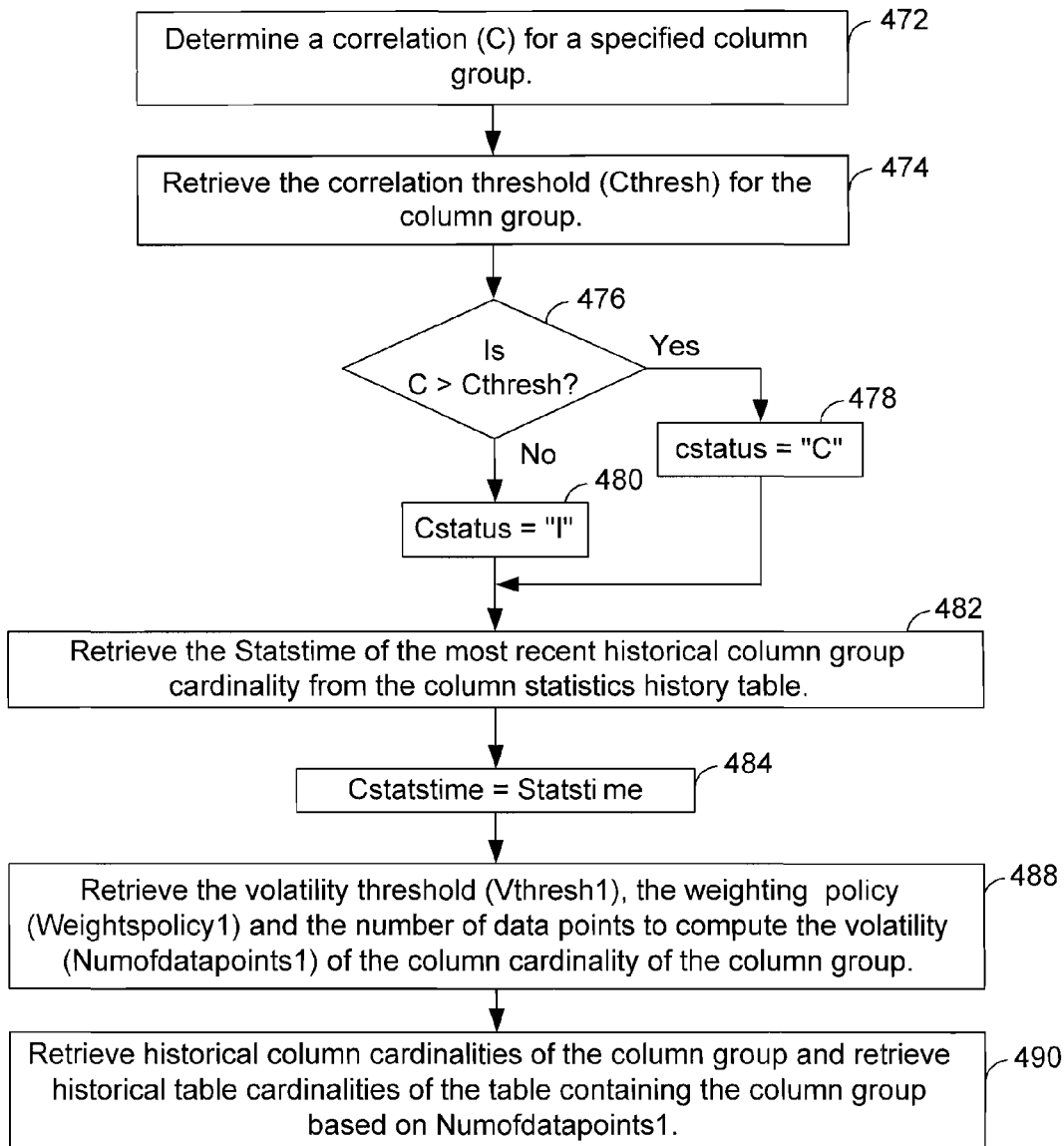
FIG. 15 comprises FIGS. 15A, 15B, 15C, 15D, 15E, 15F and 15G which collectively depict a flowchart of an embodiment of updating the column group profile table of the profile database of FIG. 9.

In step 472 of FIG. 15A, a correlation (C) for a specified column group is determined. In step 474, the correlation threshold (Cthresh) of the specified column group is retrieved. In some embodiments, the correlation threshold, Cthresh is retrieved from the column group configuration table 238 (FIG. 9). If the column group configuration table has a row containing the specified column, the specified value of Cthresh is retrieved; otherwise a default vale of Cthresh is retrieved.

Step 476 determines whether the correlation C is greater than the correlation threshold, Cthresh. If so, in step 478, the correlation status, Cstatus, is set equal to "C" to indicate that the column group is correlated. If not, in step 480, the correlation status, Cstatus, is set equal to "I" to indicate that the column group is independent. In step 482, the correlation status time, Cstatstime, is set equal to the current time.

In step 484, the volatility threshold, Vthresh1, of the cardinality of the column group, the weighting policy (Weightspolicy1) and number of data points to compute the volatility (Numofdatapoints1) are retrieved from the column group configuration table 238 (FIG. 9).

In step 488, the Statstime associated with the most recent cardinality of the column group is retrieved from the column group statistics history table.

In step 490, historical cardinalities of the column group are retrieved, and historical table cardinalities of the table containing the column group are retrieved based on Numofdatapoints1. In some embodiments, a number of most recent historical cardinalities of the column group equal to Numofdatapoints1 are retrieved from the column group configuration table 238 (FIG. 9). A number of most recent historical table of the table containing the column group equal to Numofdatapoints1 are retrieved from the column group configuration table 238 (FIG. 9). Step 490 proceeds via Continuator A to step 492 of FIG. 15B.

Figure 15B:
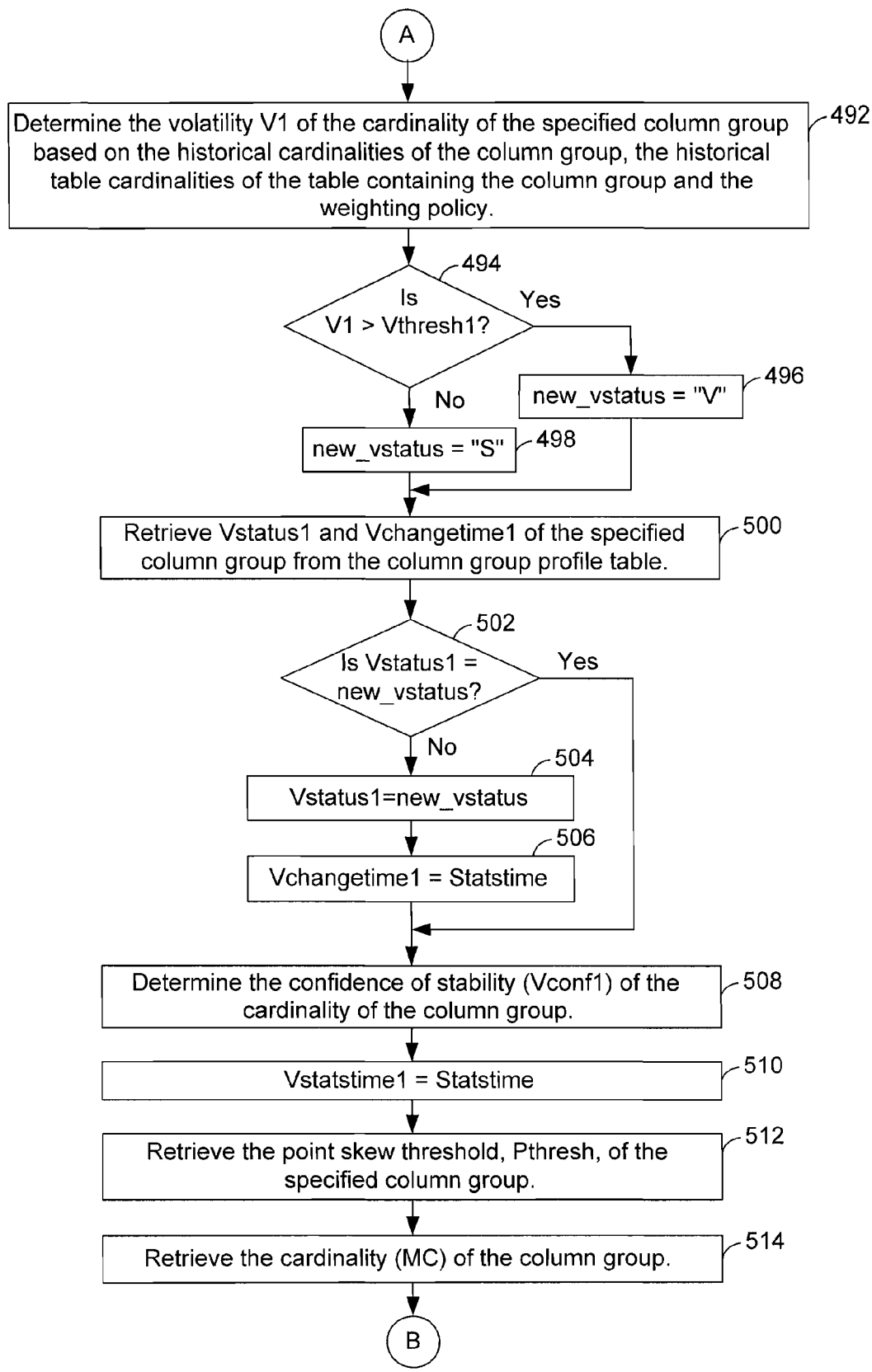

In step 492 of FIG. 15B, the volatility V1 of the cardinality of the specified column group is determined based on the historical cardinalities of the column group, the historical table cardinalities of the table containing the column group and the weighting policy, Weightspolicy1.

Step 494 determines whether the volatility V1 of the cardinality of the column group is greater than the volatility threshold Vthresh1. If so, in step 496, new_vstatus is set equal to "V" to indicate that the cardinality of the column group is volatile. If not, in step 498, new_vstatus is set equal to "S" to indicate that the cardinality of the column group is static.

In step 500, the volatility status, Vstatus1, and the volatility status change time, Vchangetime1, of the specified column group are retrieved from the column group profile table. Step 502 determines whether Vstatus1 is equal to new_vstatus. If not, in step 504, the volatility status of the cardinality of the specified column group, Vstatus1, is set equal to new_vstatus. In step 506, the volatility status change time, Vchangetime1 is set equal to Statstime, and proceeds to step 508. If step 502 determines that the volatility status, Vstatus1, is equal to new_vstatus, step 502 proceeds to step 508.

In step 508, the confidence of stability (Vconf1) of the cardinality of the column group is determined. In step 510, the volatility status time, Vstatstime1, is set equal to Statstime.

In step 512, the point skew threshold, Pthresh, of the specified column group is retrieved. In some embodiments, the point skew threshold, Pthresh, for the specified column group is retrieved from the column group configuration table. In step 514, the cardinality (MC) of the column group is retrieved. In some embodiments, the cardinality (MC) of the column group is retrieved from the column group statistics history table. The cardinality (MC) of the column group which is retrieved is the most recent cardinality of the column group. Step 514 proceeds via Continuator B to step 516 of FIG. 15C.

Figure 15C:
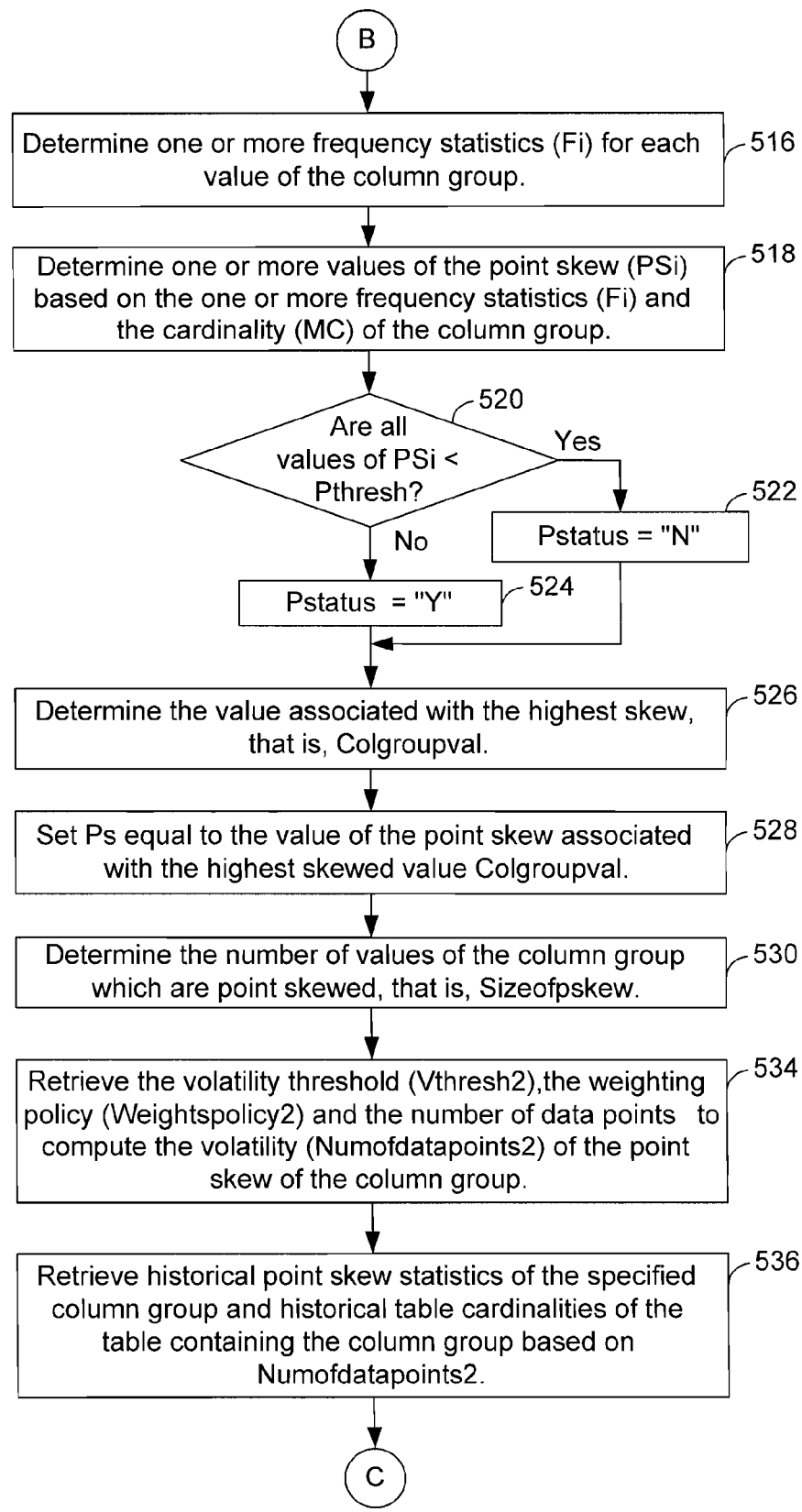

In step 516 of FIG. 15C, one or more frequency statistics (Fi) for each value of the column group are determined. In step 518, one or more values of the point skew (PSi) are determined based on the one or more frequency statistics (Fi) and the cardinality (MC) of the column group. Step 520 determines whether all values of the point skew PSi are less than Pthresh. If so, in step 522, the point skew status, Pstatus, is set equal to "N" to indicate that the column group is not point skewed. If not, in step 524, the point skew status, Pstatus, is set equal to "Y" to indicate that the column group is point skewed.

In step 526, the value associated with the highest skew, that is, a most skewed value, referred to as Colgroupval, is determined. In step 528, the point skew, Ps, is set equal to the value of the point skew associated with the value with the highest skew, Colgroupval. In an alternate embodiment, in step 526, a value other than the most skewed value is determined, and in step 528, Ps is set equal to the point skew associated with that value. In step 530, the number of values which are point skewed, that is, Sizeofpskew, is determined.

In step 534, the volatility threshold (Vthresh2), the weighting policy (Weightspolicy2), the number of data points to compute the volatility (Numofdatapoints2) of the point skew of the specified column group is retrieved. In some embodiments, the volatility threshold (Vthresh2), the weighting policy, (Weightspolicy2) and the number of data points to compute the volatility (Numofdatapoints2) of the point skew of the specified column group are retrieved from the column group configuration table.

In step 536, historical point skew statistics of the specified column group and historical table cardinalities of the table containing the column group are retrieved based on Numofdatapoints2. In some embodiments, the historical point skew statistics of the specified column group are retrieved from the column group profile table 230 (FIG. 9). In some embodiments, Numofdatapoints2-1 historical values of the points skew are retrieved, and the calculated point skew, Ps, is used as the $n^{th}$ point skew value. A number of historical table cardinalities equal to Numofdatapoints2 are retrieved. Step 536 proceeds via Continuator C to step 538 of FIG. 15D.

Figure 15D:
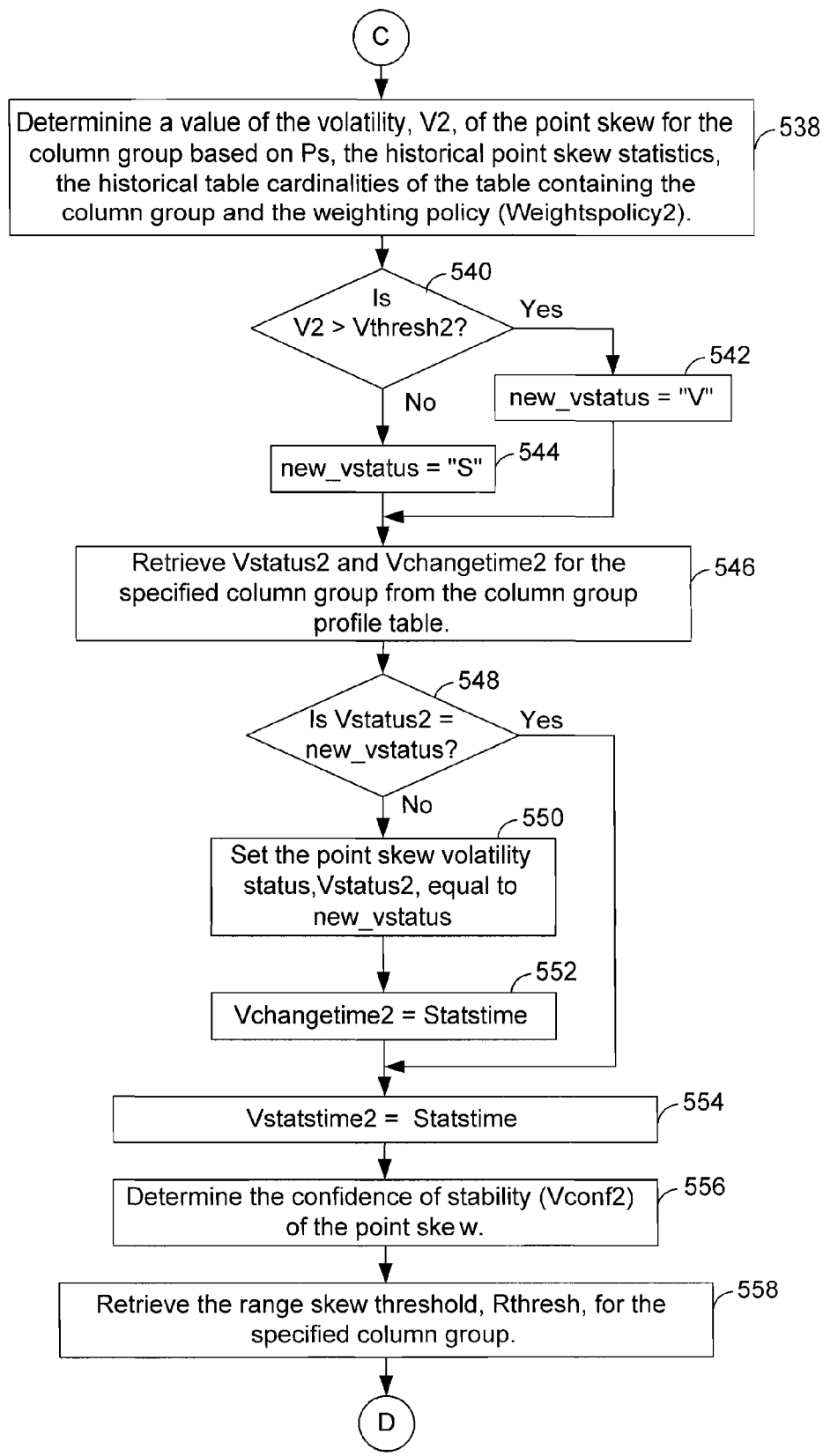

In step 538 of FIG. 15D, the volatility, V2, of the point skew of the column group is determined based on the value of the point skew, Ps, the historical point skew statistics, the historical table cardinalities of the table containing the column group, and the weighting policy (Weightspolicy2). Step 540 determines whether the volatility, V2, of the point skew is greater than the point skew volatility threshold, Vthresh2. If so, in step 542, new_vstatus is set equal to "V" to indicate that the point skew statistic for the column group is volatile. If not, in step 544, new_vstatus is set equal to "S" to indicate that the point skew statistic of the column group is static. In step 546, the volatility status, Vstatus2, and the time that the volatility status changed, Vchangetime2, for the specified column group are retrieved from the column group profile table.

Step 548 determines whether Vstatus2 is equal to new_vstatus. If not, in step 550, the point skew volatility status, Vstatus2, is set equal to new_vstatus. In step 552, the volatility status change time, Vchangetime2, is set equal to Statstime and step 552 proceeds to step 554. If step 548 determines that Vstatus2 is equal to new_vstatus, step 548 proceeds to step 554.

In step 554, the volatility status time, Vstatstime2, is set equal to Statstime. In step 556, the confidence of stability (Vconf2) of the point skew is determined. In step 558, the range skew threshold, Rthresh, is retrieved for the specified column group. In some embodiments, the range skew threshold, Rthresh, is retrieved from the column group configuration table. The range skew threshold may be a specific for the column group or a default value. Step 558 proceeds via Continuator D to step 560 of FIG. 15E.

Figure 15E:
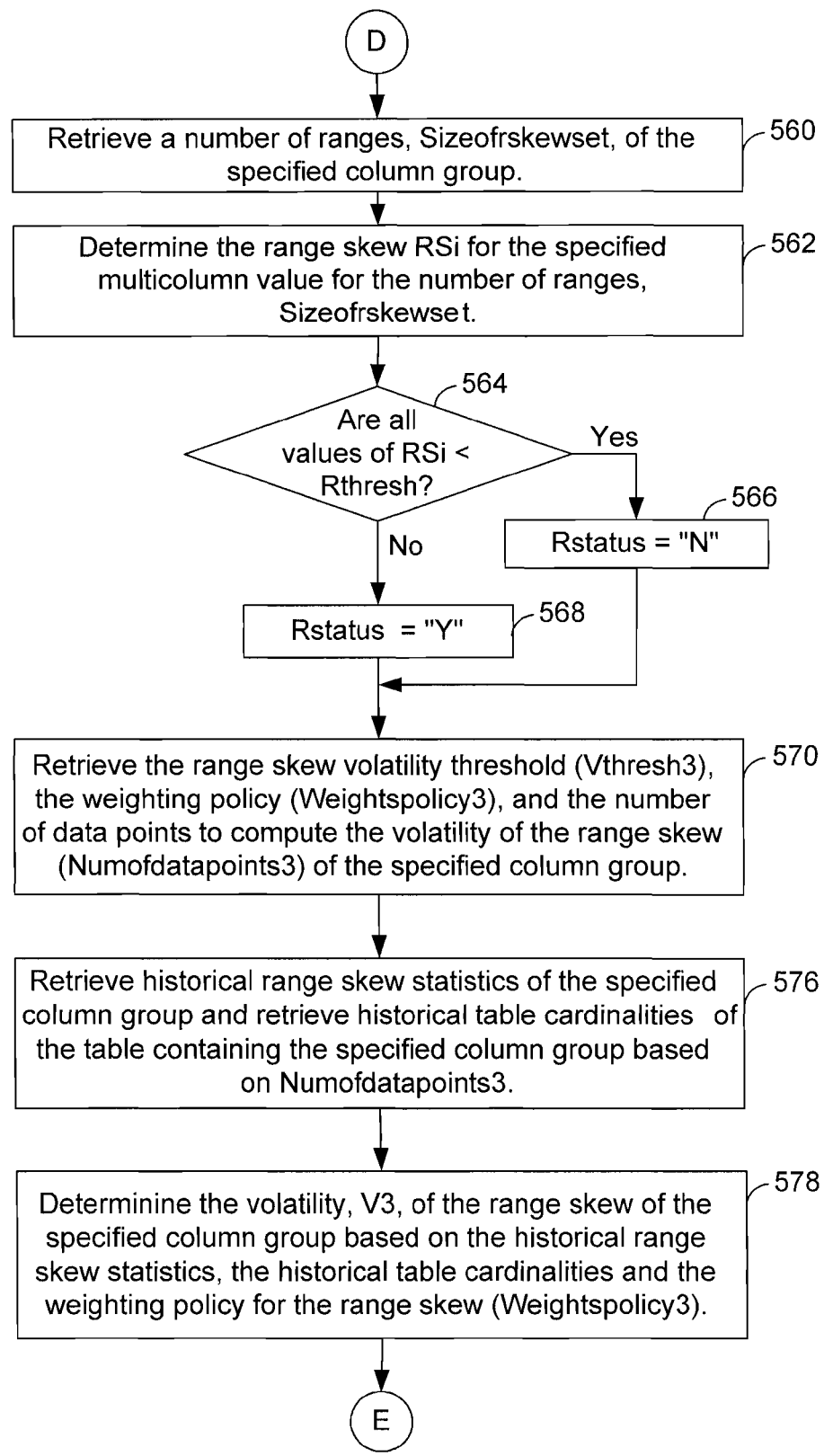
Figure 15F:
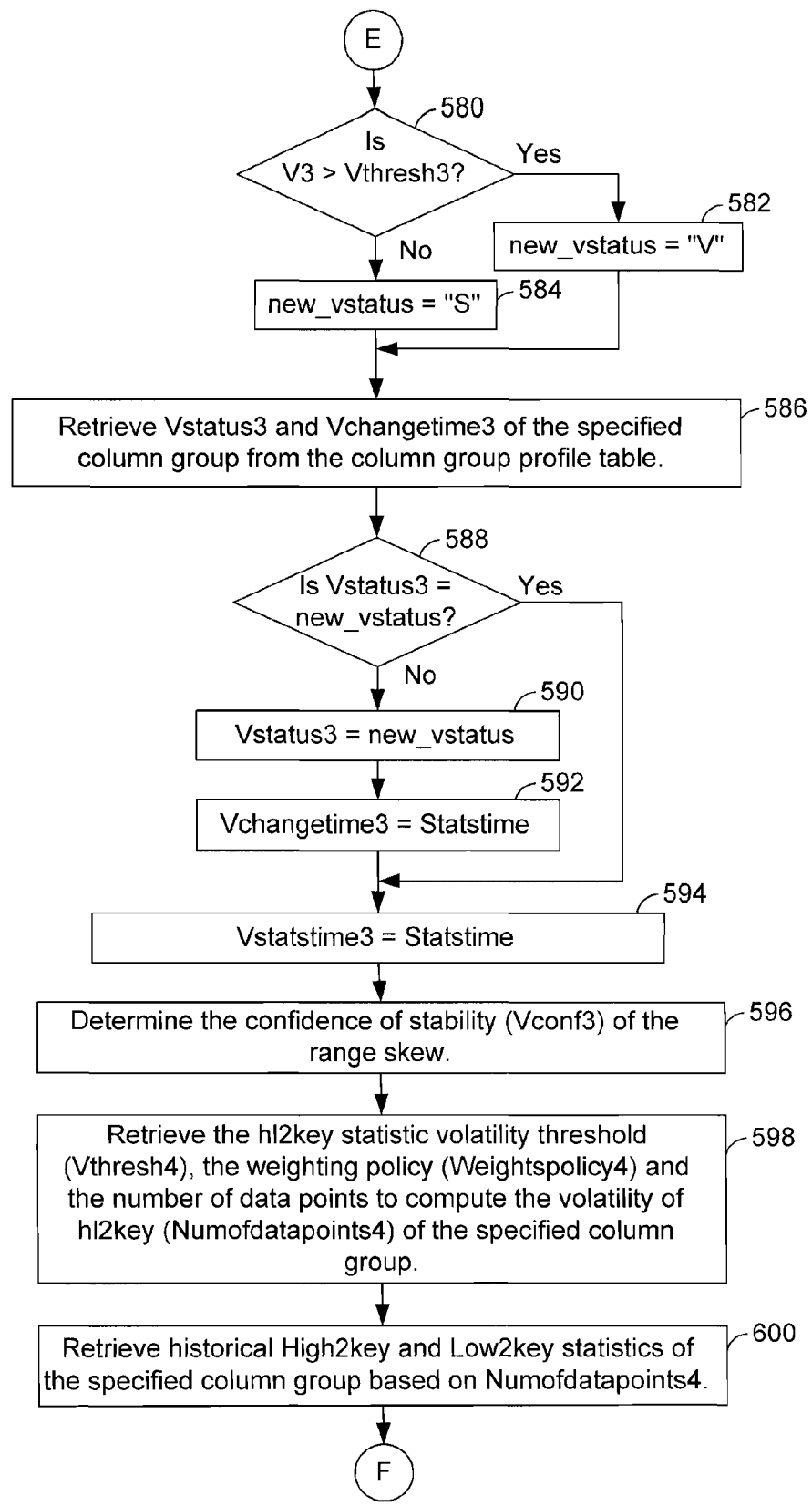
Figure 15G:
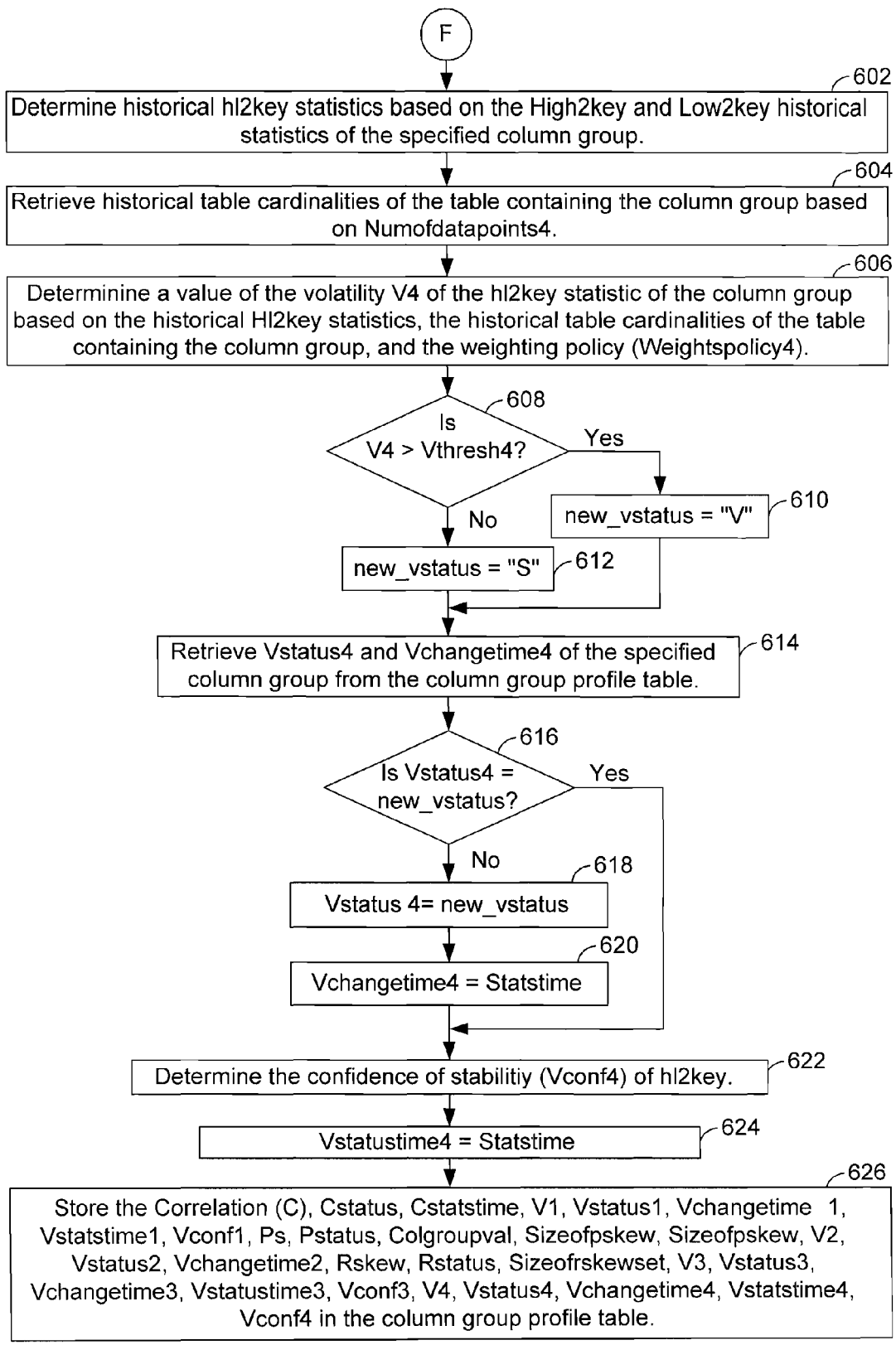

In step 560 of FIG. 15E, a number of ranges, Sizeofrskewset, of the specified column group is retrieved. In various embodiments, the size of the range skew set Sizeofrskewset is set by a user and stored in the column group configuration table. The value of Sizeofrskewset for the column group is retrieved from the column group configuration table. In step 562, the range skew RSi for the specified multicolumn value for the number of ranges, Sizeofrskewset, is determined.

Step 564 determines if all values of RSi are less than the range skew threshold, Rthresh. If so, in step 566, the range skew status, Rstatus, is set equal to "N" to indicate that the values of the column group are not range skewed. If not, in step 568, the range skew status, Rstatus, is set equal to "Y" to indicate that the values of the column group are range skewed.

In step 570, the range skew volatility threshold (Vthresh3), the number of data points to compute the volatility (Numofdatapoints3) and the weighting policy of the range skew (Weightspolicy3) of the specified column group are retrieved. In some embodiments, the range skew volatility threshold (Vthresh3), the number of data points to compute the volatility (Numofdatapoints3) and the weighting policy of the range skew (Weightspolicy3) of the specified column group are retrieved from the column group configuration table 238 (FIG. 9).

In step 576, historical range skew statistics of the specified column group are retrieved from the column group profile table 230 (FIG. 9) based on Numofdatapoints3, and historical table cardinalities of the table containing the specified column group are retrieved from the table history table based on Numofdatapoints3. Typically the most recent historical values are retrieved.

In step 578, the volatility, V3, of the range skew of the specified column group is determined based on the historical range skew statistics, the historical table cardinalities and the weighting policy for the range skew (Weightspolicy3). In some embodiments, the volatility V3 of the range skew is also determined based on the calculated range skew Rs. Step 578 proceeds via Continuator E to step 580 if FIG. 15F.

Step 580 determines whether the volatility V3 of the range skew is greater than the range skew volatility threshold, Vthresh3. If so, in step 582, new_vstatus is set equal to "V" to indicate that the range skew is volatile. If not, in step 584, new_vstatus is set equal to "S" to indicate that the range skew is static.

In step 586, the range skew volatility status, Vstatus3, and the range skew volatility status change time, Vchangetime3, for the specified column group are retrieved from the column group profile table 230 (FIG. 9).

Step 588 determines whether the range skew volatility status, Vstatus3, is equal to new_vstatus. If not, in step 590, Vstatus3 is set equal to new_vstatus. In step 592, the volatility status change time of the range skew, Vchangetime3 is set equal to Statstime, and step 592 proceeds to step 594. If step 588 determines whether the range skew volatility status, Vstatus3, is equal to new_vstatus, step 588 proceeds to step 594.

In step 594, the range skew volatility status time, Vstatstime3, is set equal to Statstime. In step 596, the confidence of stability (Vconf3) of the range skew is determined.

In step 598, the hl2key statistic volatility threshold (Vthresh4), the weighting policy of hl2key (Weightspolicy4) and the number of data points to compute the volatility of hl2key (Numofdatapoints4) of the specified column group are retrieved. In some embodiments, the hl2key statistic volatility threshold (Vthresh4), the weighting policy of hl2key (Weightspolicy4) and the number of data points to compute the volatility of hl2key (Numofdatapoints4) are retrieved from the column group configuration table 238 (FIG. 9).

In step 600, historical High2key and Low2key statistics of the specified column group are retrieved from the column group statistics history table 218 (FIG. 8) based on Numofdatapoints4. In various embodiments, the number of the most recent historical values of High2key and Low2key statistics which are retrieved is equal to Numofdatapoints4. Step 600 proceeds via Continuator F to step 602 of FIG. 15G.

In step 602, historical hl2key statistics are determined based on the historical High2key and Low2key statistics of the specified column group. In step 604, table cardinalities of the table containing the column group are retrieved based on Numofdatapoints4. In various embodiments, a number of the most recent table cardinalities equal to Numofdatapoints4 is retrieved. In step 606, a value of the volatility V4 of the hl2key statistic of the column group is determined based on the historical hl2key statistics, the historical table cardinalities statistics and the weighting policy (Weightspolicy4).

Step 608 determines whether the volatility of the hl2key statistic, V4, is greater than the volatility threshold, Vthresh4. If so, in step 610, new_vstatus is set equal to "V" to indicate that the hl2key statistic is volatile. If so, in step 612, new_vstatus is set equal to "S" to indicate that the hl2key statistic is static.

In step 614, the volatility status of hl2key, Vstatus4, and the volatility status change time, Vchangetime4, of the specified column group from the column group profile table are retrieved. Step 616 determines whether Vstatus4 is equal to new_vstatus. If not, in step 618, the hl2key volatility status, Vstatus4, is set equal to new_vstatus. In step 620, the volatility status change time, Vchangetime4, is set equal to Statstime, and step 620 proceeds to step 622. If step 616 determines that Vstatus4 is equal to new_vstatus, step 616 proceeds to step 622.

In step 622, the confidence of stability (Vconf4) of hl2key is determined. In step 624, the volatility status time, Vstatustime4, is set equal to Statstime. In step 626, the Correlation (C), Cstatus, Cstatstime, V1, Vstatus1, Vchangetime1, Vstatstime1, Vconf1, Ps, Pstatus, Colgroupval, Sizeof pskew, V2, Vstatus2, Vchangetime2, Rskew, Rstatus, Sizeofrskewset, V3, Vstatus3, Vchangetime3, Vstatustime3, Vconf3, V4, Vstatus4, Vchangetime4, Vstatstime4 and Vconf4 are stored in a row with the specified column group name and table name of the column group profile table 238 (FIG. 9).

FIG. 16 comprises FIGS. 16A, 16B, 16C and 16D which collectively depict a flowchart of an embodiment of the monitoring of one or more workloads. In some embodiments, the flowchart of FIG. 16 is performed by the workload-based collection scheduler 74 (FIG. 2) and active monitor 76 (FIG. 2), at an interval specified by the default monitoring interval parameter 132 (FIG. 3). For one or more registered workloads, the active monitor is invoked to determine whether a statistic should be re-collected.

In step 632, a table name of the workload is retrieved. In various embodiments, each workload is associated with a distinct workload identifier and the table name is retrieved from the consolidated statistics repository based on the workload identifier. Step 634 determines whether the table name is in the profile database. If so, in step 636, a determination of whether to re-collect one or more statistics associated with the table name is performed. Step 638 determines whether to re-collect one or more statistics for the table name based on the determination of step 636. If step 638 determines that statistics are to be re-collected for the table name, in step 640, the table name is added to a recollection list. In some embodiments, the type of statistics to be re-collected is also added to the recollection list. Typically, the type of statistics to re-collect is the table cardinality. Step 642 determines whether there are more table names in the workload. If so, step 642 proceeds to step 632. In some embodiments, steps 636 and 638 are combined.

If step 634 determines that the table name is not in the profile database, step 634 proceeds to step 642. If step 638 determines that statistics are not to be re-collected for the table name, step 638 proceeds to step 642. If step 642 determines that there are no more table names in the workload, step 642 proceeds via Continuator A to step 644 of FIG. 16B.

Figure 16A:
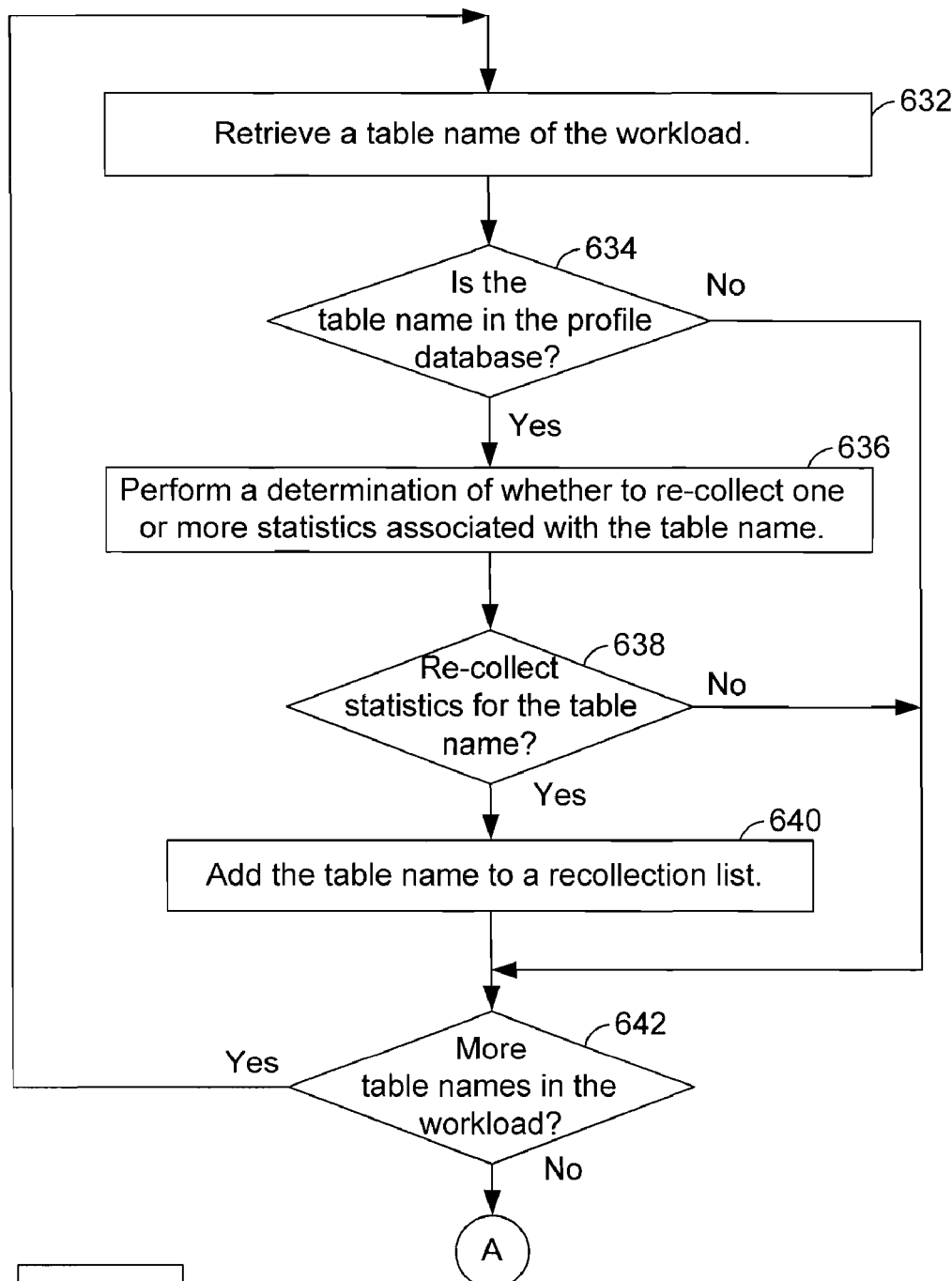
FIG. 16 comprises FIGS. 16A, 16B, 16C and 16D which collectively depict a flowchart of an embodiment of the monitoring of one or more workloads.
Figure 16B:
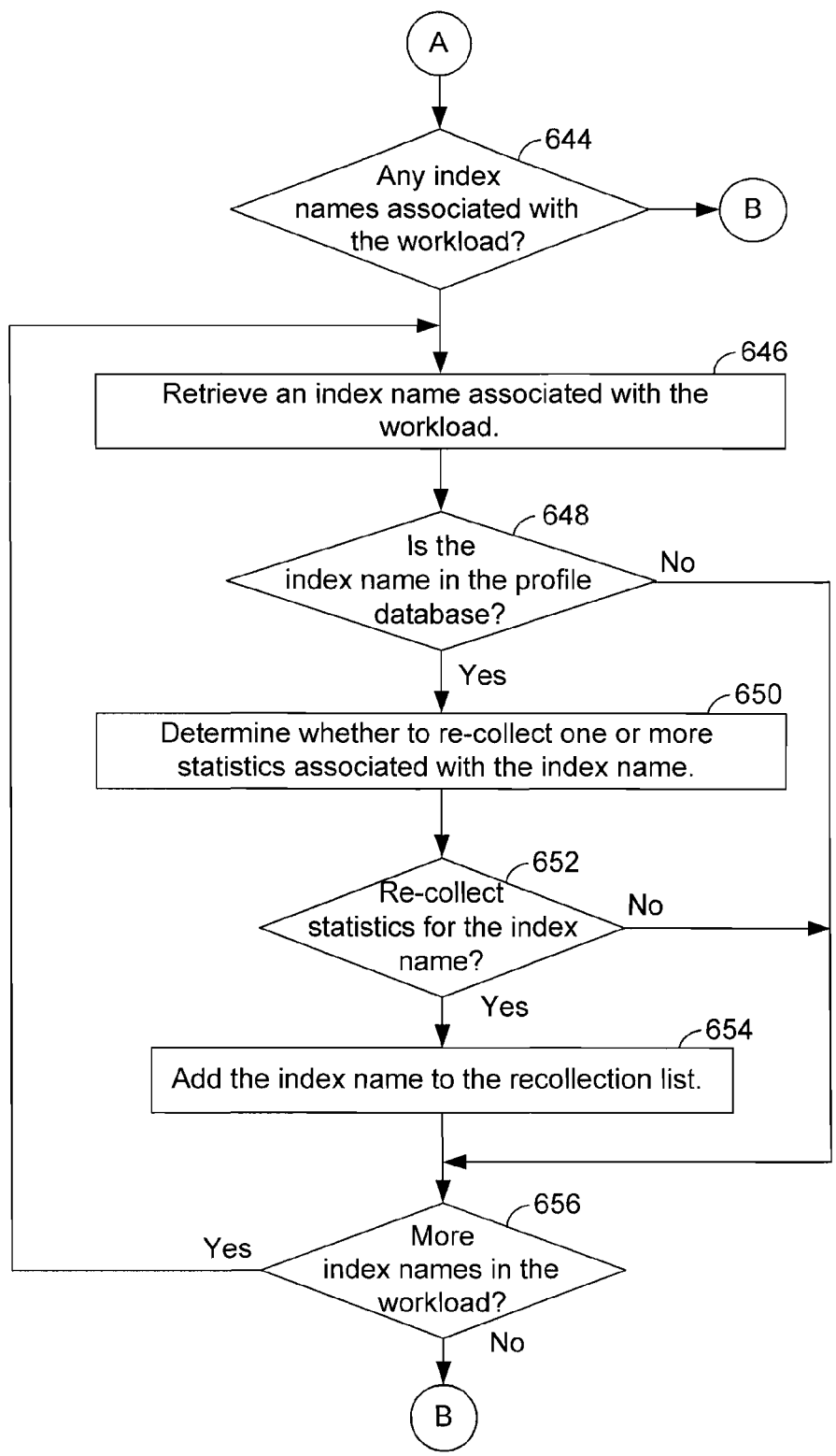

Step 644 of FIG. 16B determines if there are any index names associated with the workload. In various embodiments, the consolidated statistics repository is accessed based on the workload identifier to determine whether the workload is associated with any index names. If so, in step 646, an index name associated with the workload is retrieved. In various embodiments, the index name is retrieved from the consolidated statistics repository based on the workload identifier. Step 648 determines whether the index name is in the data profile. If so, in step 650, a determination of whether to re-collect one or more statistics associated with the index name is performed. Step 652 determines whether to re-collect one or more statistics associated with the index name based on the determination of step 650. If step 652 determines that statistics are to be re-collected for the index name, in step 654, the index name is added to the recollection list. In some embodiments, the type of statistic to be re-collected, such as the full key cardinality, is also added to the recollection list. Step 656 determines whether there are more index names in the workload. If so, step 656 proceeds to step 646.

Figure 16C:
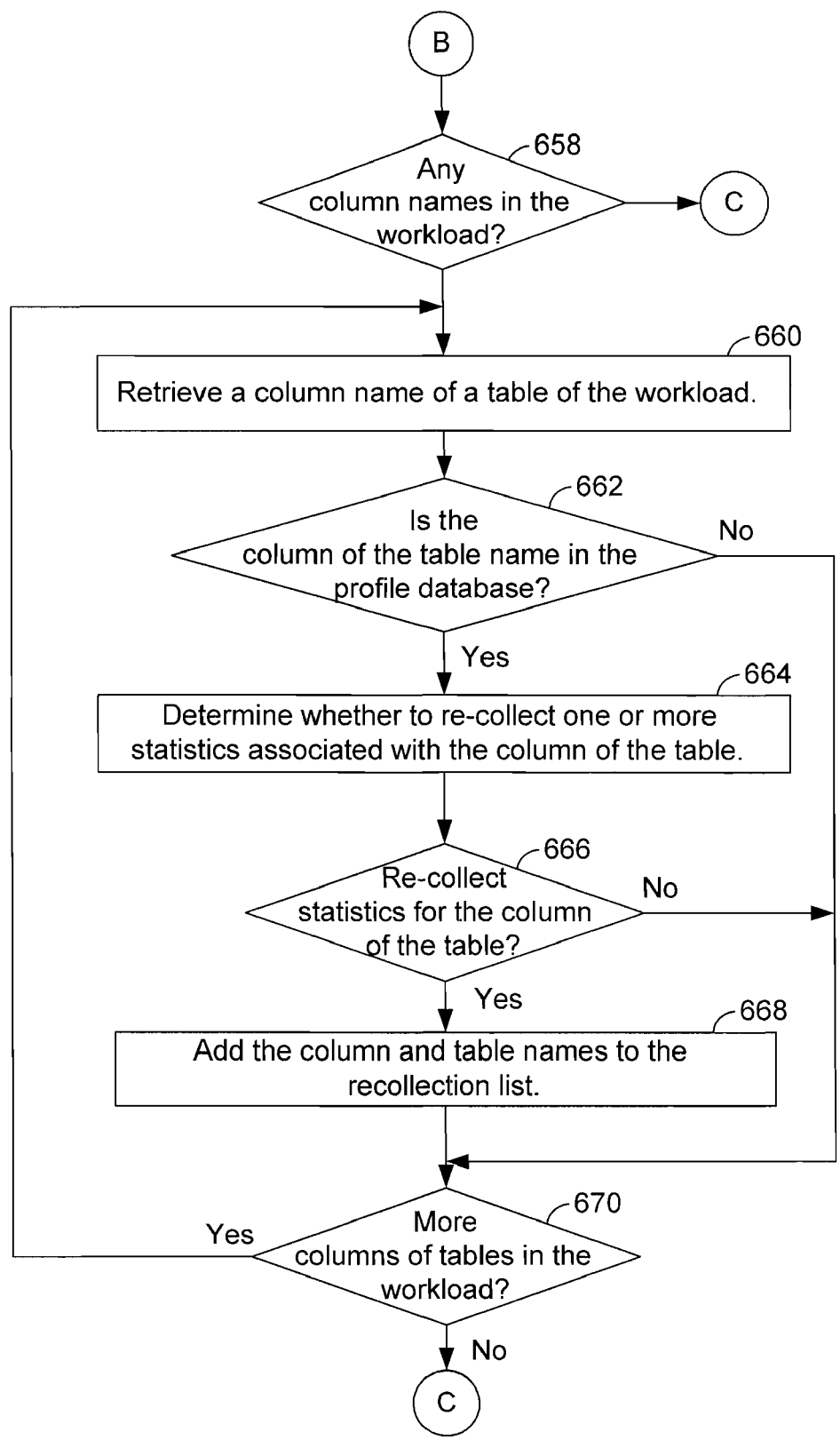

If step 644 determines that there are no index names in the workload, step 644 proceeds via Continuator B to step 658 of FIG. 16C. If step 648 determines that the index name is not in the data profile, step 634 proceeds to step 656. If step 652 determines that statistics are not to be re-collected for the index name, step 662 proceeds to step 656. If step 656 determines that there are no more index names in the workload, step 656 proceeds via Continuator B to step 658 of FIG. 16C. In some embodiments, steps 650 and 652 are combined.

Step 658 determines if there are any column names in the workload. In various embodiments, the consolidated statistics repository is accessed based on the workload identifier to determine with the workload has any column names. If step 658 determines that there is at least one column name in the workload, in step 660, a column name of a table of the workload is retrieved from the consolidated statistics repository. Step 662 determines whether the column name of the table is in the profile database. If so, in step 664, a determination of whether to re-collect one or more statistics associated with the column of the table is performed. Step 666 determines whether to re-collect one or more statistics associated with the column of the table based on the determination of step 664. If step 666 determines that one or more statistics are to be re-collected for the column name of the table, in step 668, the column and table names are added to the recollection list. In some embodiments, the type of statistic to be re-collected, such as the column cardinality, is also added to the recollection list. In some embodiments, when a statistics collection task collects a column cardinality, other statistics, such as High2key and Low2key will be also be collected for the column. Step 670 determines whether there are more columns of tables in the workload. If so, step 670 proceeds to step 660.

Figure 16D:
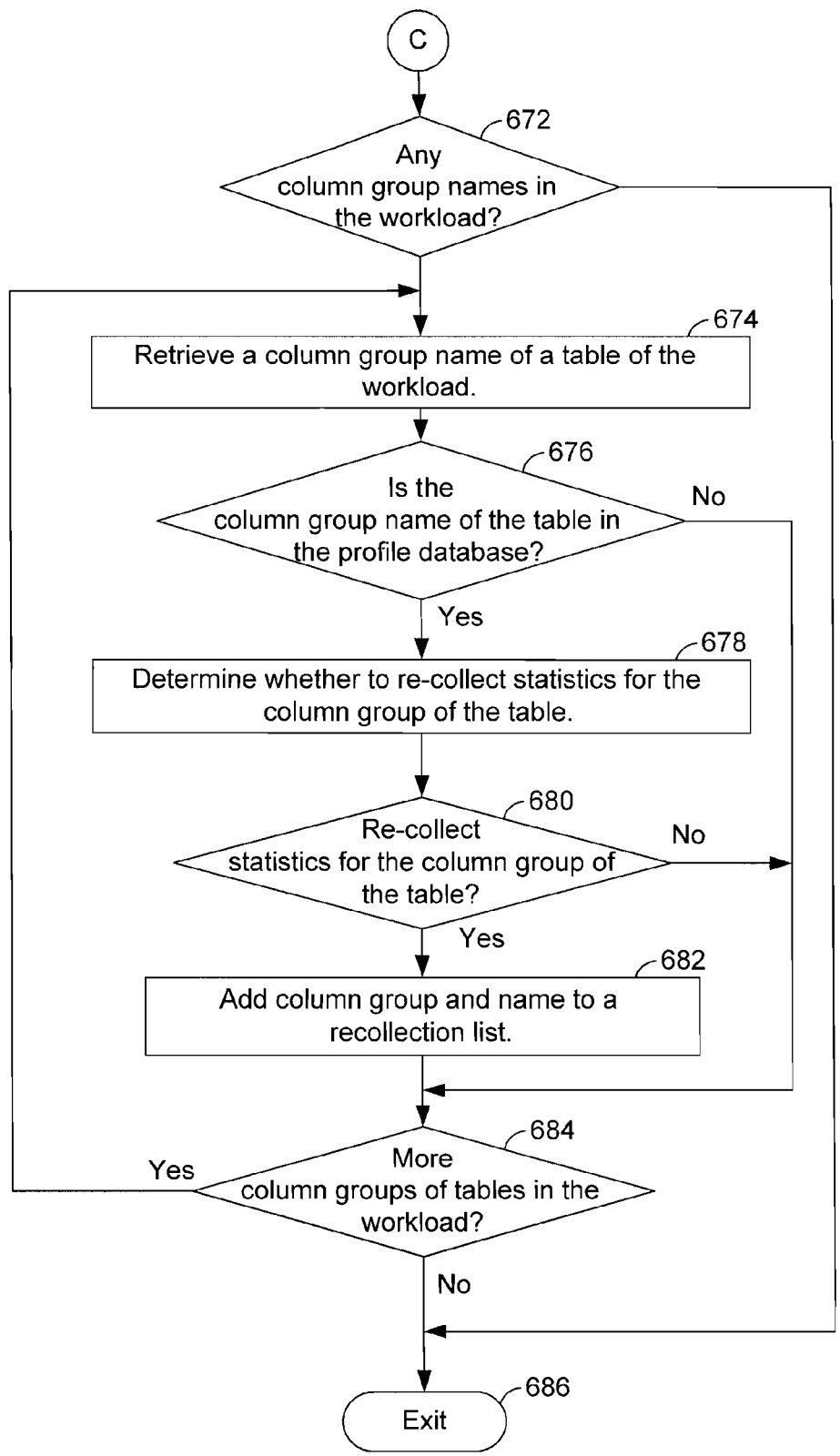

If step 658 determines that there are no column names in the workload, step 656 proceeds via Continuator C to step 652 of FIG. 16D. If step 662 determines that the column name of the table is not in the profile database, step 662 proceeds to step 670. If step 666 determines that statistics are not to be re-collected for the column name of the table, step 666 proceeds to step 670. If step 670 determines that there are no more columns in the workload, step 670 proceeds via Continuator C to step 672 of FIG. 16D.

Step 672 determines if there are any column group names in the workload. In various embodiments, the consolidated statistics repository is accessed to determine if the workload has any column group names. If so, in step 674, a column group name of a table of the workload is retrieved from the consolidated statistics repository. Step 676 determines whether the column name of the table is in the profile database. If so, in step 678, a determination of whether to re-collect one or more statistics associated with the column group name of the table is performed. Step 680 determines whether to re-collect one or more statistics associated with the column group of the table based on the determination of step 678. If step 680 determines that statistics are to be re-collected for the column group of the table, in step 682, the column group and table names are added to the recollection list. In some embodiments, the type of statistics to be re-collected, such as the cardinality and frequency, and in some embodiments, a histogram, is also added to the recollection list. For example, for a column group, if a recollection determination is based on the point skew statistic, then column group cardinality and frequency statistics will be collected for the column group. If the recollection recommendation is based on range skew, then the column cardinality and frequency statistics will also be collected for the column group. Alternately, if the recollection recommendation is based on range skew, then column cardinality and histogram statistics will be collected for the column group. Step 684 determines whether there are more column groups of tables in the workload. If so, step 684 proceeds to step 674.

If step 672 determines that there are no column group names in the workload, step 672 proceeds to step 686 to exit. If step 676 determines that the column group name of the table is not in the profile database, step 676 proceeds to step 684. If step 680 determines that one or more statistics are not to be re-collected for the column group name of the table, step 680 proceeds to step 684. If step 684 determines that there are no more column groups of tables in the workload, step 684 proceeds to step 686 to exit.

FIG. 17 comprises FIGS. 17A, 17B, 17C and 17D which collectively depict a flowchart of an embodiment of determining whether recollection is recommended based on a statistic of interest. In various embodiments, the flowchart of FIG. 17 is performed as part of steps 636, 650, 664 and 678 of FIG. 16. In some embodiments, the flowchart of FIG. 17 is implemented in the active monitor 76 (FIG. 3). Prior to performing the flowchart of FIG. 17, various parameters are determined. The change in the cardinality of the table associated with the statistic of interest, deltaTableCard, is determined. The current table cardinality $T_{n+1}$ associated with the statistic of interest is retrieved from the table statistics real-time table. The most recent historical table cardinality $T_n$ associated with the statistic of interest is retrieved from the table statistics history table. The change in the cardinality of the table associated with the statistic of interest, deltaTableCard, is determined as follows: deltaTableCard=$T_{n+1}-T_n$. The staleness threshold (Sthresh) of the statistic of interest is retrieved from the workload registry table for the associated workload for the statistic of interest. The table cardinality threshold, Tcthresh, for the table associated with the statistic of interest is retrieved. The table cardinality change threshold (Tcthresh) may be retrieved from several sources as described above. The time threshold (Tthresh), for the statistic of interest is retrieved from the associated configuration table in the profile database. Alternately, the time threshold, Tthresh, for the statistic of interest is retrieved from the workload registry table based on the workload identifier. The time granularity, Tgrain, for the statistic of interest is retrieved from the table configuration table for the table associated with the statistic of interest.

Step 692 determines whether the data profile in the profile database for the statistic of interest is up-to-date. Statistics collection tasks may be performed outside the application. For example, a database administrator may invoke a statistics collection task for a particular collection object. In some embodiments, to use the most recent historical data for the statistic of interest, the statistics time of the most recent historical statistic of interest (Statstime) is retrieved from the historical statistics, and the volatility statistics time, Vstatstime, associated with the most recent volatility of the statistic of interest in the profile database are retrieved. If Vstatstime is less than, that is, prior to, Statstime, the data profile for the statistic of interest is determined to not be up-to-date.

If the data profile for the statistic of interest is determined to not be up-to-date, in step 694, the data profile for the statistic of interest is updated. The volatility of the statistic V, the associated volatility status Vstatus, the volatility status time Vstatstime, the volatility status change time Vchangetime, and the confidence of stability (Vconf) are updated in the profile database for the statistic of interest as described above.

If step 692 determines that the data profile in the profile database is up-to-date, step 692 proceeds to step 696.

In an alternate embodiment, step 692 is omitted and step 694 is always performed before evaluating the statistic-of-interest for recollection. In yet another alternate embodiment, steps 692 and 694 are omitted.

Step 696 determines whether the statistic of interest is verified to be static by the user. In various embodiments, the confidence of stability (Vconf) of the statistic of interest is retrieved from the profile database. When the confidence of stability of the statistic of interest is equal to one, indicating one hundred percent confidence, the statistic of interest is determined to be verified by the user to be static. If step 696 determines that the statistic of interest is verified to be static by the user, in step 698, the flowchart exits with a return value of "No" to indicate recollection is not recommended.

If step 696 determines that the statistic of interest is not verified to be static by the user, in step 700, the most recent volatility status, Vstatus, of the statistic of interest is retrieved from the profile database. Step 702 determines whether the most recent volatility status, Vstatus, is equal to "U." If so, in step 704, the flowchart exits with a return value of "Yes" to indicate that recollection is recommended.

Figure 17A:
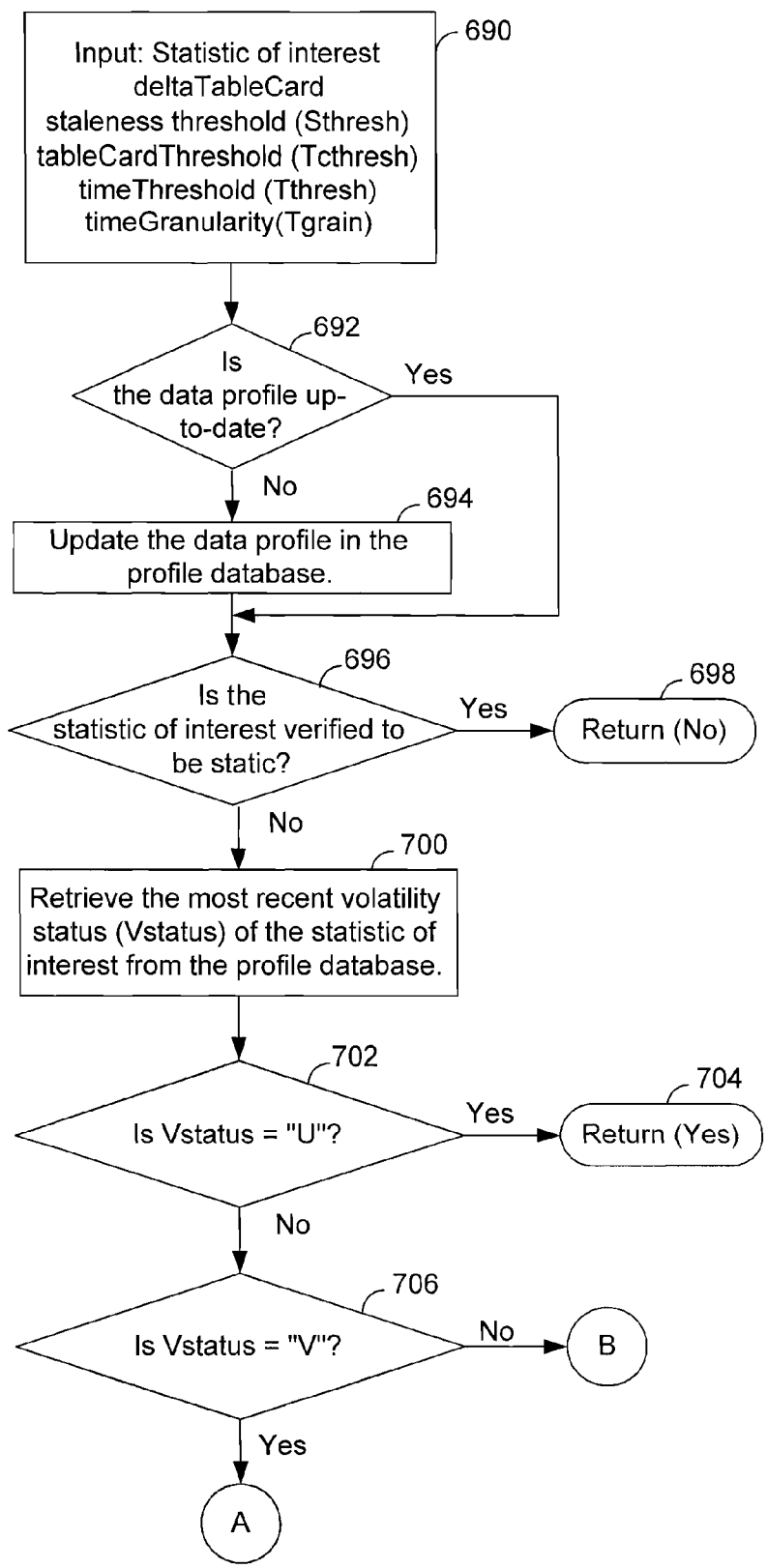
FIG. 17 comprises FIGS. 17A, 17B, 17C and 17D which collectively depict a flowchart of an embodiment of determining whether recollection is recommended based on a statistic of interest.
Figure 17B:
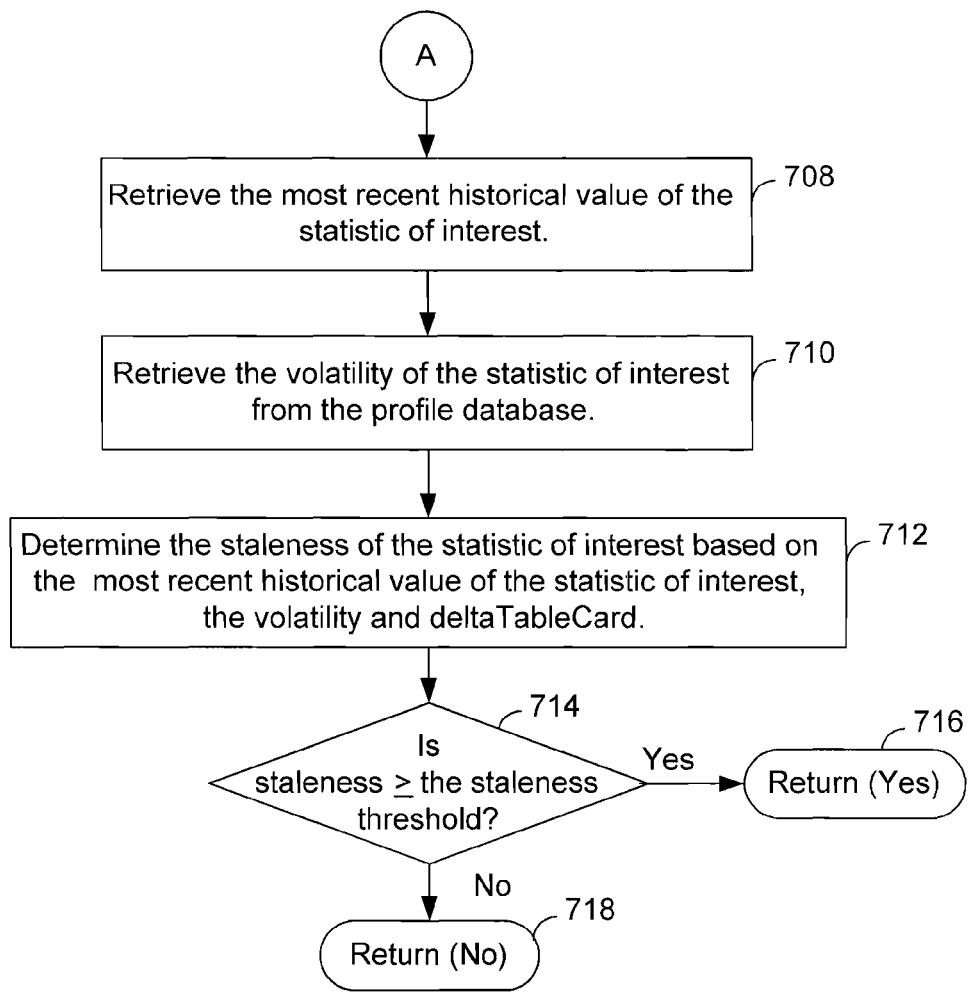
Figure 17C:
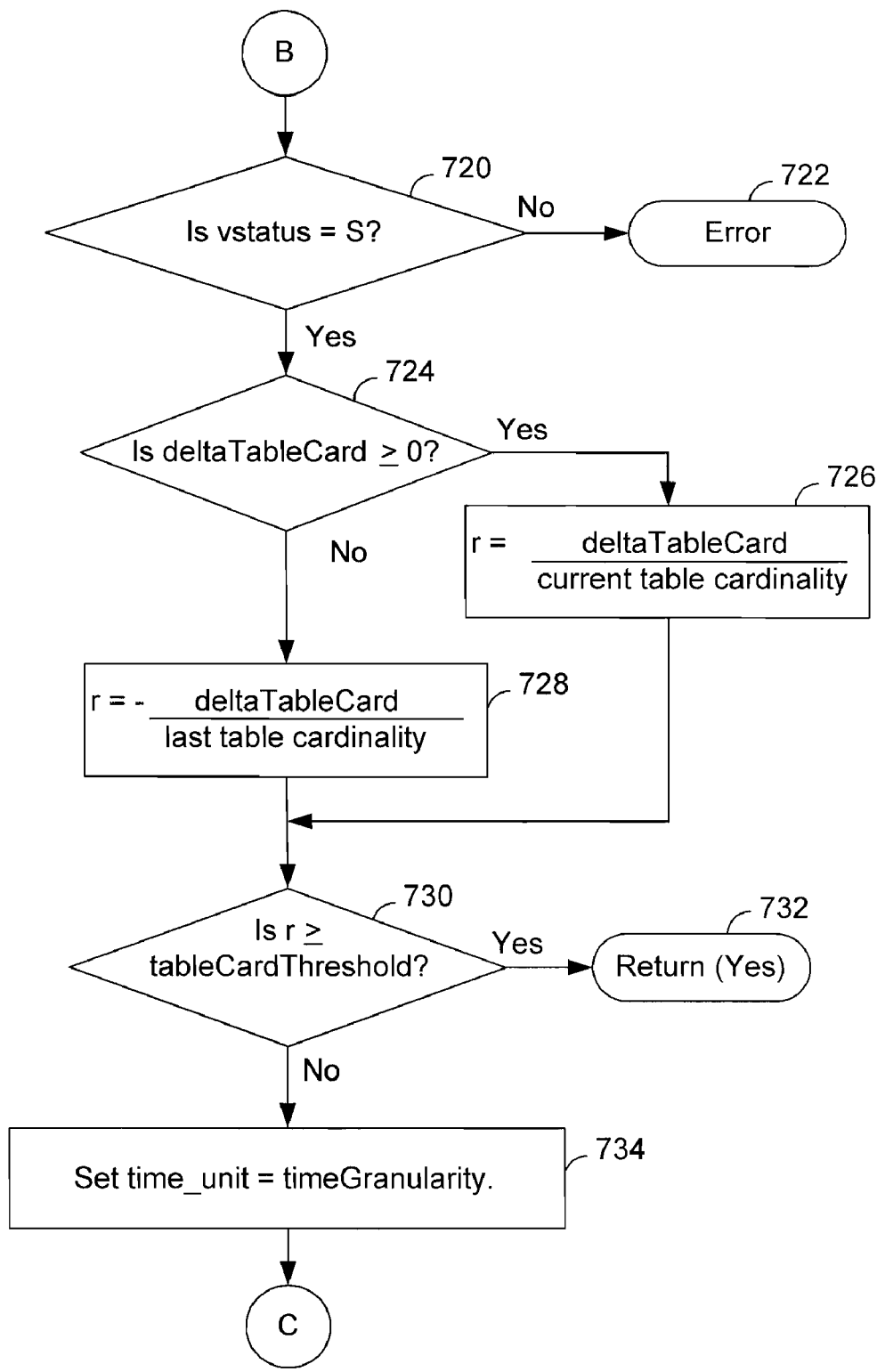

If step 702 determines whether the most recent volatility status, Vstatus is not equal to "U", step 706 determines whether the current volatility status, Vstatus is equal to "V." If so, the statistic of interest is volatile and step 706 proceeds via Continuator A to step 708 of FIG. 17B.

In step 708 of FIG. 17B, the most recent value of the statistic of interest is retrieved. Depending on the statistic of interest, the most recent value may be retrieved from the historical database or from the profile database. In step 710, the volatility of the statistic of interest is retrieved from the profile database. In step 712, the staleness of the statistic of interest is determined based on the most recent value of the statistic of interest, the volatility and deltaTableCard in accordance with relationship (3) above.

Step 714 determines whether the staleness is greater than or equal to the staleness threshold. Alternately, step 714 determines whether the staleness is greater than the staleness threshold. If so, in step 716, the flowchart exits and returns a value of "Yes" to indicate that recollection is recommended. If not, in step 718, the flowchart exits and returns a value of "No" to indicate that recollection is not recommended.

If step 706 of FIG. 17A determines that the volatility status Vstatus is not equal to "V", other factors are analyzed to determine whether recollection is recommended. Step 706 proceeds to step 720 of FIG. 17C.

Step 720 determines whether the volatility status of the statistic of interest, Vstatus, is equal to "S". If not, in step 722, the flowchart exits with a return code of "Error." If so, step 724 determines whether deltaTBcard is greater than or equal to zero. If so, in step 726, a ratio, r, is determined as follows: r=deltaTBcard/current table cardinality. The current table cardinality is equal to $TC_{n+1}$, which is the real-time table cardinality of the table associated with the statistic of interest. If step 724 determines that deltaTBcard is not greater than or equal to zero, in step 728, a ratio, r, is determined as follows: r=−deltaTBcard/last table cardinality. The last table cardinality is equal to $TC_n$, which is the most recent table cardinality for the table associated with the statistic of interest in the table history table.

Step 730 determines whether r is greater than or equal to the table cardinality threshold, Tcthresh. If so, in step 732, the flowchart exits and returns a value of "Yes" to indicate that recollection is recommended. If not, in step 734, the time_unit variable is set equal to Tgrain. Step 734 proceeds via Continuator C to step 736 of FIG. 17D.

Figure 17D:
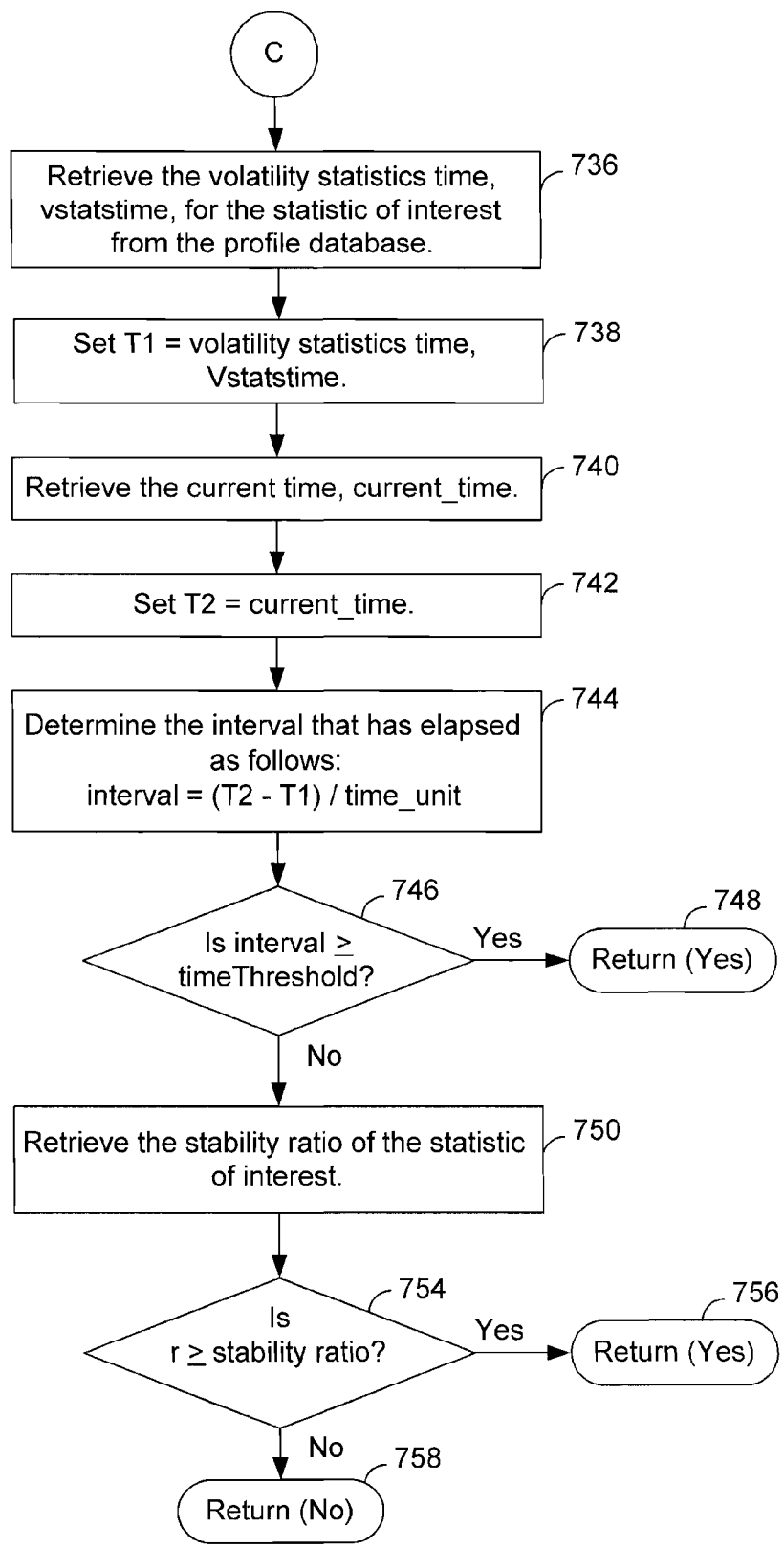

In step 736 of FIG. 17D, the volatility statistics time, Vstatstime, for the statistic of interest is retrieved from the profile database. In step 738, T1 is set equal to the volatility statistics time, Vstatstime. In step 740, the current time is retrieved. In step 742, T2 is set equal to the current_time. In step 744, the interval that has elapsed is determined as follows: interval= (T2−T1)/time_unit.

Step 746 determines whether interval is greater than or equal to the time threshold, timeThreshold. If so, in step 748, the flowchart exits and returns a value of "Yes" to indicate that recollection is recommended. If not, in step 750, the most recent value of the confidence of stability Vconf is retrieved from the profile database for the statistic of interest and used as the stability ratio. Alternately, the most recent value of the stability ratio for the statistic of interest is retrieved from the profile database.

Step 752 determines whether the ratio r is greater than the stability ratio. If so, in step 756, the flowchart exits and returns a value of "Yes" to indicate that recollection is recommended. If not, in step 758, the flowchart exits and returns a value of "No" to indicate that recollection is not recommended.

Figure 18:
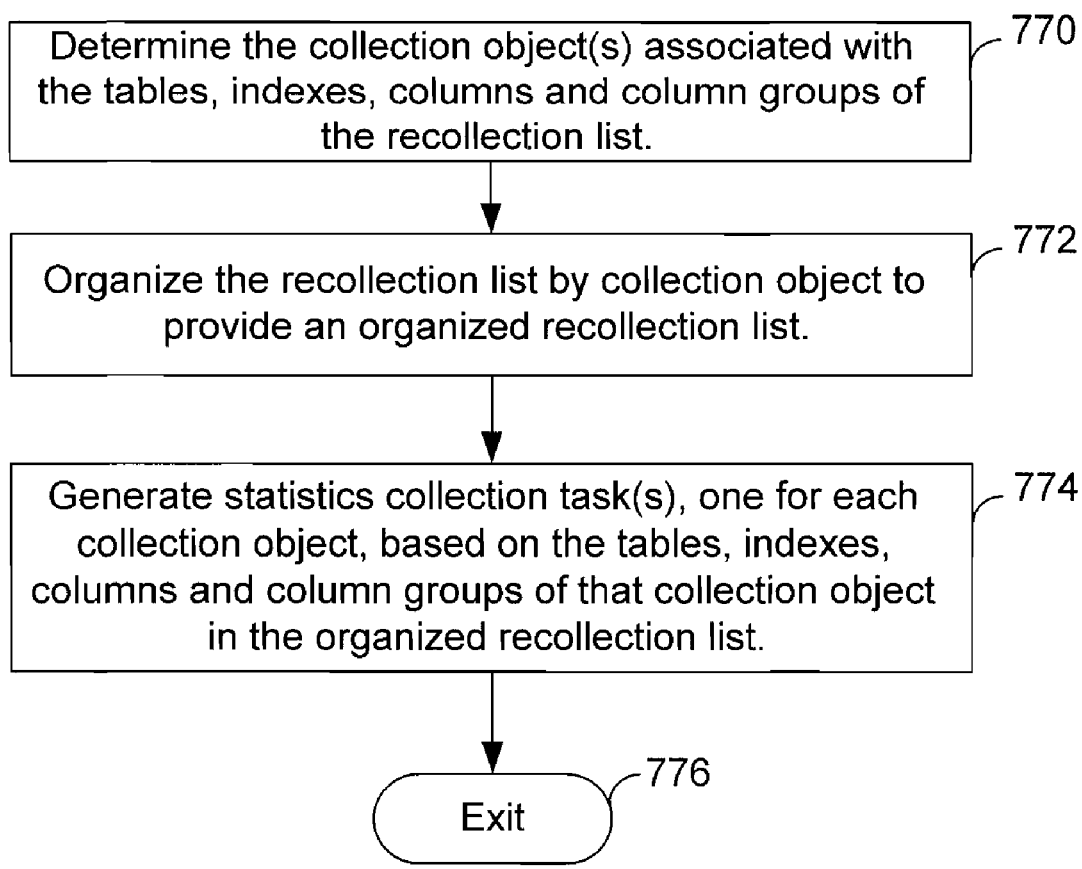
FIG. 18 depicts a high-level flowchart of an embodiment of generating one or more statistics collection tasks based on recollection recommendations.

FIG. 18 depicts a high-level flowchart of an embodiment of generating one or more statistics collection tasks based on results from the active monitor. In step 770, the collection object(s) associated with the tables, indexes, columns and column groups of the recollection list. The tables, indexes, columns and column groups of the recollection list are associated with one or more collection objects.

In step 772, the recollection list is organized by collection object to provide an organized recollection list. The collection object of each database object in the recollection list is identified, and the collection object name is added to the organized recollection list. Alternately a source list is generated based on the recollection list. An exemplary organized recollection list, or alternately a source list, is shown below.

```
<?xml version="1.0" encoding="UTF-8"?>
<critstat appname="app" appversion="1.0"
db2platform="db2zos"
    db2version="8" state="unchecked" timestamp="2004-09-15
11:20:15.729">
        <source location="v14.abc.def.com" name="c:\temp"
        id="Test1"></source>
    <tablespace name="TMP" dbname="DSNDB01">
        <table name="TMP" creator="USER1" rank="2">
            <colgroup cardinality="Y" frequency="N" rank="2">
                <column name="GENDER"></column>
            </colgroup>
            <colgroup cardinality="Y" frequency="N" rank="2">
                <column name="LASTNAME"></column>
            </colgroup>
            <colgroup cardinality="Y" frequency="Y" rank="2">
                <column name="DEPARTMENT"></column>
            </colgroup>
            <colgroup cardinality="Y" frequency="N" rank="2">
```

```
            <column name="DEPARTMENT"></column>
            <column name="EDUCATIONLEVEL"></column>
        </colgroup>
    </table>
   </tablespace>
</critstat>
```

The organized recollection list contains a collection object, such as a tablespace, and lists the table and the columns and column group associated with that table for which statistics are to be collected. In the example above, a statistics collection task will be generated to collect the table cardinality of the table named "TMP", and to collect the column group cardinality for each column group, to collect frequency statistics for the column group having a column name of "DEPARTMENT."

In the exemplary organized recollection list above, a rank is shown. In some embodiments, the rank corresponds to a score for database object associated with the statistic of interest. Generating a score for a database object associated with a statistic of interest is described in U.S. patent application Ser. No. 10/824,856. In other embodiments, the rank or score is not used.

The exemplary organized recollection list is for a DB2 database management system. In other embodiments, the organized recollection list is generated for other database management systems.

In step 774, statistics collection task(s), one for each collection object, are generated for the tables, indexes, columns and column groups of that collection object based on the organized recollection list.

Figure 19:
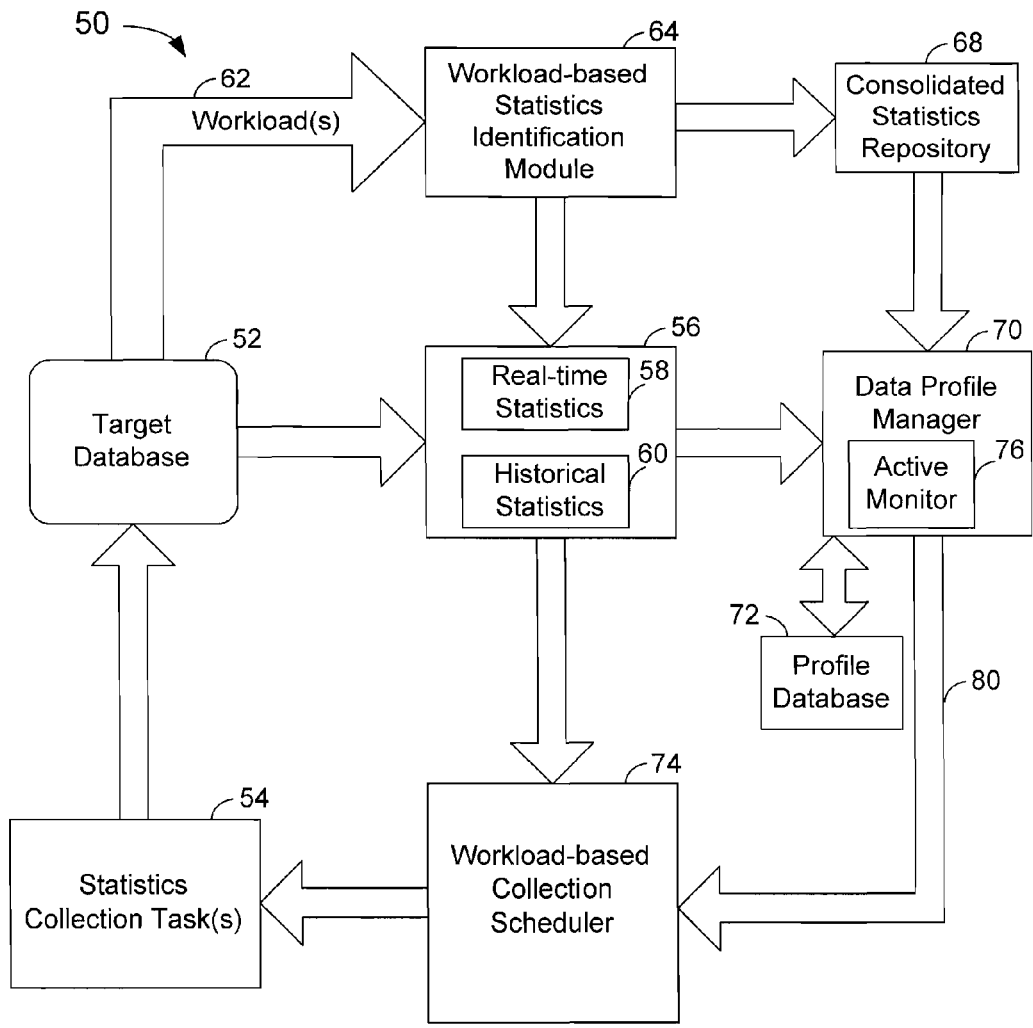
FIG. 19 depicts a block diagram of another embodiment of a statistics collection system.

FIG. 19 depicts a block diagram of another embodiment of a statistics collection system. In this embodiment, the active monitor 76 is in the data profile manager 70 rather than the workload-based collection scheduler 74.

In various embodiments, the application 130 (FIG. 3) optimizes the process of statistics collection by focusing statistics collection and recollection on those statistics deemed to be useful for optimization, and focusing the recollection on the smaller subset of useful statistics which are volatile. The result is the database has an increasingly sound foundation of useful statistics which are automatically re-collected.

The user is typically the final decision maker unless the user chooses an option to always execute the generated statistics collection tasks, by setting the always re-collect parameter 134 (FIG. 3). In some embodiments, the user can also specify how often the active monitor is invoked using the default monitoring interval parameter 132 (FIG. 3) to monitor the registered workloads.

In some embodiments, an Adjusting Factor to Staleness Threshold (AF) is specified for each workload. For example, if AF=0.1 for workload A and AF=−0.1 for workload B, then all the Staleness Thresholds defined in the profile database will be increased by 10% for workload A and decreased by 10% for workload B when determining whether a statistic in workload A or B is stale. The effect is that it is easier for a statistic in workload B to become stale and it is more difficult for a statistic in workload A to become stale. Thus the adjusting factor to staleness threshold adjusts the recollection frequencies for different workloads.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method of managing statistics in at least one computer comprising at least one processor and at least one storage medium, said at least one storage medium storing a database management system, comprising:

causing said at least one processor to determine a value of a volatility of at least one statistic of a table, wherein said at least one statistic has values $S_1$ to $S_n$; wherein an $S_i$ represents an $i^{th}$ value of said $S_1$ to $S_n$; wherein said $S_1$ is older than said $S_n$; wherein a table cardinality indicates a total number of rows in said table; wherein said table cardinality comprises values $TC_1$ to $TC_n$; wherein a $TC_i$ represents an $i^{th}$ value of said $TC_1$ to $TC_n$; wherein said $TC_1$ is older than said $TC_n$, said at least one statistic not being said table cardinality;

causing said at least one processor to compute a value of a staleness of said at least one statistic based on, at least in part, multiplying said value of said volatility by a value of said at least one statistic and by a change in said table cardinality; said change in said table cardinality being a difference between another value of said table cardinality of said table and said $TC_n$; said $TC_n$ being older than said another value of said table cardinality;

causing said at least one processor to generate at least one statistics collection task in response to, at least in part, said value of said staleness exceeding a value of a staleness threshold; and causing said at least one processor to execute said at least one statistics collection task to collect an additional value of said at least one statistic, wherein said at least one processor is caused to store said additional value of said at least one statistic in said at least one storage medium.

2. The method of claim 1 wherein said at least one statistic is associated with at least one workload.

3. The method of claim 2 wherein said value of said staleness is computed based on a trend analysis of said at least one statistic.

4. The method of claim 1 wherein said causing said at least one processor to compute said value of said staleness is performed in response to said value of said volatility exceeding a value of a volatility threshold.

5. The method of claim 1 wherein said causing said at least one processor to compute said value of said staleness also applies an adjusting factor.

6. The method of claim 1 further comprising:

in response to said value of said volatility being less than a volatility threshold, causing said at least one processor to determine a value of a table cardinality change ratio; and wherein said causing said at least one processor to generate generates, at least in part, said at least one statistics collection task also in response to said value of said table cardinality change ratio exceeding a value of a table cardinality change threshold.

7. The method of claim 1 further comprising:

causing said at least one processor to determine a value of a table cardinality change ratio;

causing said at least one processor to determine a value of a stability ratio; and wherein said causing said at least one processor to generate generates, at least in part, said at least one statistics collection task also in response to said value of said table cardinality change ratio exceeding said value of said stability ratio.

8. The method of claim 1 wherein said causing said at least one processor to generate generates, at least in part, said one statistics collection task based on an elapsed time since a previous collection of said at least one statistic.

9. The method of claim 1 wherein said at least one statistic is associated with at least one or any combination of a table, index, column and a column group.

10. The method of claim 1 wherein said value of said volatility is determined based on a trend analysis of said at least one statistic.

11. The method of claim 1 further comprising:
causing said at least one processor to repeat said causing said at least one processor to determine said value of said volatility, said causing said at least one processor to compute said value of said staleness, said causing said at least one processor to generate and said causing said at least one processor to execute.

12. The method of claim 1 wherein said multiplying said value of said volatility by said value of said at least one statistic and by said change in said table cardinality produces a product; wherein said value of said staleness is equal to a square root of said product divided by said value of said at least one statistic.

13. The method of claim 1 wherein $w_i$ represents an $i^{th}$ value of a weighting factor; and wherein said value of said volatility (V) is determined in accordance with:

$$V = \sum_{i=1}^{n-1} \left( w_i \cdot \frac{|S_n - S_i|}{|TC_n - TC_i|} \cdot \frac{|S_n - S_i|}{S_i} \right)$$

wherein said $S_i$ is not equal to zero, wherein said $|TC_n-TC_i|$ is not equal to zero.

14. The method of claim 13 wherein a sum of said $w_i$ from said i=1 to i=n−1 is equal to 1.

15. A computer program product for managing statistics in a database management system, said computer program product comprising: a computer readable storage medium having computer readable program code embodied therewith, said computer readable program code comprising:
computer readable program code configured to determine a value of a volatility of at least one statistic of a table, wherein said at least one statistic has values $S_1$ to $S_n$; wherein an $S_i$ represents an $i^{th}$ value of said $S_i$ to $S_n$; wherein said $S_1$ is older than said $S_n$; wherein a table cardinality indicates a total number of rows in said table; wherein said table cardinality comprises values $TC_1$ to $TC_n$; wherein a $TC_i$ represents an $i^{th}$ value of said $TC_1$ to $TC_n$; wherein said $TC_1$ is older than said $TC_n$, said at least one statistic not being said table cardinality;
computer readable program code configured to compute a value of a staleness of said at least one statistic based on, at least in part, multiplying said value of said volatility by a value of said at least one statistic and by a change in said table cardinality; said change in said table cardinality being a difference between another value of said table cardinality of said table and said $TC_n$; said $TC_n$ being older than said another value of said table cardinality;
computer readable program code configured to generate at least one statistics collection task in response to, at least in part, said value of said staleness exceeding a value of a staleness threshold; and
computer readable program code configured to execute said at least one statistics collection task to collect an additional value of said at least one statistic, wherein said additional value of said at least one statistic is stored in a memory.

16. The computer program product of claim 15 wherein said at least one statistic is associated with at least one workload.

17. The computer program product of claim 15 wherein said computer readable program code configured to compute said value of said staleness is executed in response to said value of said volatility exceeding a value of a volatility threshold.

18. The computer program product of claim 15 wherein said computer readable program code configured to compute said value of said staleness also applies an adjusting factor.

19. The computer program product of claim 15 further comprising:
computer readable program code configured to determine a value of a table cardinality change ratio in response to said value of said volatility being less than a value of a volatility threshold; and
wherein said computer readable program code configured to generate said at least one statistics collection task also generates, at least in part, said at least one statistics collection task in response to said value of said table cardinality change ratio exceeding a value of a table cardinality change threshold.

20. The computer program product of claim 15 further comprising:
computer readable program code configured to determine a value of a table cardinality change ratio;
computer readable program code to determine a value of a stability ratio; and
wherein said computer readable program code configured to generate said at least one statistics collection task also generates, at least in part, said at least one statistics collection task in response to said value of said table cardinality change ratio exceeding said value of said stability ratio.

21. The computer program product of claim 15 wherein said computer readable program code configured to generate said at least one statistics collection task generates, at least in part, said at least one statistics collection task in response to an elapsed time since a previous collection of said at least one statistic.

22. The computer program product of claim 15 wherein said at least one statistic is associated with at least one or any combination of a table, index, column and a column group.

23. The computer program product of claim 15 wherein said value of said volatility is determined based on a trend analysis of said at least one statistic.

24. The computer program product of claim 15 wherein said value of said staleness is computed based on a trend analysis of said at least one statistic.

25. The computer program product of claim 15 further comprising:
computer readable program code to repeat said computer readable program code configured to determine said value of said volatility, said computer readable program code configured to compute said value of said staleness, said computer readable program code configured to generate said at least one statistics collection task and said computer readable program code to execute said at least one statistics collection task.

26. A computer system for managing statistics in a database management system, comprising:

a processor; and a memory storing instructions that are executable by said processor to:

determine a value of a volatility of at least one statistic of a table, wherein said at least one statistic has values $S_1$ to $S_n$; wherein an $S_i$ represents an $i^{th}$ value of said $S_1$ to $S_n$; wherein said $S_1$ is older than said $S_n$; wherein a table cardinality indicates a total number of rows in said table; wherein said table cardinality comprises values $TC_1$ to $TC_n$; wherein a $TC_i$ represents an $i^{th}$ value of said $TC_1$ to $TC_n$; wherein said $TC_1$ is older than said $TC_n$, said at least one statistic not being said table cardinality;

compute a value of a staleness of said at least one statistic based on, at least in part, multiplying said value of said volatility by a value of said at least one statistic and by a change in said table cardinality; said change in said table cardinality being a difference between another value of said table cardinality of said table and said $TC_n$; said $TC_n$ being older than said another value of said table cardinality;

generate at least one statistics collection task in response to, at least in part, said value of said staleness exceeding a value of a staleness threshold; and execute said at least one statistics collection task to collect an additional value of said at least one statistic, wherein said additional value of said at least one statistic is stored in said memory.

27. The computer system of claim 26 further comprising instructions to:

determine a value of a table cardinality change ratio; and wherein said at least one statistics collection task is also generated based on said value of said table cardinality change ratio.

28. The computer system of claim 26 further comprising instructions to:

determine a value of a stability ratio; and wherein said at least one statistics collection task is generated based on, at least in part, said value of said stability ratio.

29. The computer system of claim 26 wherein said value of said volatility is determined based on a trend analysis of said at least one statistic.

30. The computer system of claim 26 wherein said value of said staleness is computed based on a trend analysis of said at least one statistic.

31. The computer system of claim 26 further comprising:

instructions to determine an elapsed time since a previous statistics collection task; and wherein said at least one statistics collection task is also generated in response to said elapsed time.

32. The computer system of claim 26 further comprising:

an adjusting factor to staleness; and wherein said value of said staleness is also computed using said adjusting factor to staleness.

* * * * *